US012538153B2

(12) United States Patent
Elshafie et al.

(10) Patent No.: US 12,538,153 B2
(45) Date of Patent: Jan. 27, 2026

(54) CHANNEL STATE INFORMATION REPORTING OF CODE BLOCK GROUP BASED TRANSPORT BLOCKS

(71) Applicant: QUALCOMM Incorporated, San Diego, CA (US)

(72) Inventors: Ahmed Elshafie, San Diego, CA (US); Yi Huang, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 459 days.

(21) Appl. No.: 17/479,160

(22) Filed: Sep. 20, 2021

(65) Prior Publication Data

US 2023/0089599 A1    Mar. 23, 2023

(51) Int. Cl.
*H04W 24/10* (2009.01)
(52) U.S. Cl.
CPC .................................. *H04W 24/10* (2013.01)
(58) Field of Classification Search
CPC .................................................... H04W 24/10
See application file for complete search history.

(56) References Cited

U.S. PATENT DOCUMENTS

| 11,201,706 B2* | 12/2021 | Yerramalli | .......... H04B 7/0626 |
| 2010/0103920 A1 | 4/2010 | Damnjanovic et al. | |
| 2019/0191486 A1* | 6/2019 | Myung | ................ H04L 5/0044 |
| 2021/0336728 A1* | 10/2021 | Selvanesan | .......... H04L 1/1854 |
| 2022/0272673 A1 | 8/2022 | Yang et al. | |

FOREIGN PATENT DOCUMENTS

| EP | 3664348 A1 | 6/2020 | |
| EP | 3923664 A1 | 12/2021 | |
| EP | 3952421 A1 * | 2/2022 | ............. H04L 5/005 |
| GB | 2516941 A * | 2/2015 | ............. H04B 7/155 |
| WO | WO-2020204489 A1 | 10/2020 | |
| WO | WO-2020230008 A1 * | 11/2020 | ............... H04L 1/08 |
| WO | WO-2021015520 A1 * | 1/2021 | ........... H04L 1/1671 |

OTHER PUBLICATIONS

Ericsson: "CSI Feedback Enhancements for IIoT/URLLC", 3GPP TSG-RAN WG1 Meeting #106-e, R1-2106679, 3rd Generation Partnership Project, Mobile Competence Centre, 650, Route Des Lucioles, F-06921 Sophia-Antipolis Cedex, France, vol. RAN WG1, No. e-Meeting, Aug. 16, 2021-Aug. 27, 2021, Aug. 7, 2021, 10 Pages, XP052037960, Section 2.
International Search Report and Written Opinion—PCT/US2022/075271—ISA/EPO—Nov. 25, 2022.

* cited by examiner

*Primary Examiner* — Yemane Mesfin
*Assistant Examiner* — Jia Hao Deng
(74) *Attorney, Agent, or Firm* — Holland & Hart LLP

(57) ABSTRACT

Methods, systems, and devices for wireless communications are described. A user equipment (UE) may receive, from a base station, control signaling identifying a configuration for reporting channel metrics for transport blocks that each include a plurality of code block group. The UE may receive a first transport block that includes a first plurality of code block groups. The UE may transmit a report indicating a channel metric for one or more code block groups of the first plurality of code block groups of the first transport block in accordance with the configuration for reporting channel metrics. In some cases, the UE may report a differential channel metric, based in part on a reference metric. Additionally or alternatively, the UE may report compressed feedback for a group CBGs.

30 Claims, 23 Drawing Sheets

| L=1 Table 705 ||
| --- | --- |
| Differential CQI 720 | CQI Offset 725 |
| 0 | <= 0 |
| 1 | >= 1 |

| L=2 Table 710 ||
| --- | --- |
| Differential CQI 720 | CQI Offset 725 |
| 0 | 0 |
| 1 | >= 1 |
| 2 | -1 |
| 3 | <= -2 |

| L=3 Table 715 ||
| --- | --- |
| Differential CQI 720 | CQI Offset 725 |
| 0 | 0 |
| 1 | 1 |
| 2 | 2 |
| 3 | >= 3 |
| 4 | <= -4 |
| 5 | -1 |
| 6 | -2 |
| 7 | -3 |

| L=1 Table 805 ||
|---|---|
| Differential MCS 820 | MCS Offset 825 |
| 0 | 0 |
| 1 | >= 1 |

| L=2 Table 810 ||
|---|---|
| Differential MCS 820 | MCS Offset 825 |
| 0 | 0 |
| 1 | >= 1 |
| 2 | -1 |
| 3 | <= -2 |

| L=3 Table 815 ||
|---|---|
| Differential MCS 820 | MCS Offset 825 |
| 0 | 0 |
| 1 | 1 |
| 2 | 2 |
| 3 | >= 3 |
| 4 | <= -4 |
| 5 | -1 |
| 6 | -2 |
| 7 | -3 |

800

CHANNEL STATE INFORMATION REPORTING OF CODE BLOCK GROUP BASED TRANSPORT BLOCKS

FIELD OF TECHNOLOGY

The present disclosure relates to wireless communications, including channel state information reporting of code block group based transport blocks.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM). A wireless multiple-access communications system may include one or more base stations or one or more network access nodes, each simultaneously supporting communication for multiple communication devices, which may be otherwise known as user equipment (UE).

In some wireless communication systems, a wireless device may report channel information (e.g., a channel state information (CSI) report) indicating a quality of the channel, which may enable the devices in the system to improve communications efficiency, reliability, or both. However, current techniques for reporting channel information may be deficient.

SUMMARY

The described techniques relate to improved methods, systems, devices, and apparatuses that support channel state information reporting of code block group (CBG) based transport blocks. Generally, the described techniques provide for enhanced channel information reporting, including, but not limited to channel state information (CSI) reporting, modulation and coding scheme (MCS) reporting, or channel quality information (CQI) information, among other examples of reporting channel information. For example, a base station may send data to a user equipment (UE), and the UE may provide feedback for the data transmission to the base station. The base station may, for example, communicate a transport block to the UE, and the transport block may include one or more CBGs. In some examples, the UE may report channel information feedback (e.g., channel metrics) associated with multiple CBGs of the transport block, such as an average metric or a threshold metric corresponding to the multiple CBGs (e.g., all of the CBGs in the transport block may correspond to a single metric). In some examples, the UE may report channel information feedback for each CBG included in a transport block. For example, the UE may report an average metric or a threshold metric across code blocks for each CBG. In some examples, the UE may report channel information feedback using a differential metric or based on a grouping of one or more CBGs of the plurality of CBGs. In some cases, the UE may report channel information feedback based on a quantity of CBGs associated with negative acknowledgements (NACKs).

A method for wireless communications at a user equipment (UE) is described. The method may include receiving, from a base station, control signaling identifying a configuration for reporting channel metrics for transport blocks that each include a set of multiple code block groups, receiving a first transport block that includes a first set of multiple code block groups, and transmitting a report indicating a channel metric for one or more code block groups of the first set of multiple code block groups of the first transport block in accordance with the configuration for reporting channel metrics.

An apparatus for wireless communications at a UE is described. The apparatus may include a processor, memory coupled with the processor, and instructions stored in the memory. The instructions may be executable by the processor to cause the apparatus to receive, from a base station, control signaling identifying a configuration for reporting channel metrics for transport blocks that each include a set of multiple code block groups, receive a first transport block that includes a first set of multiple code block groups, and transmit a report indicating a channel metric for one or more code block groups of the first set of multiple code block groups of the first transport block in accordance with the configuration for reporting channel metrics.

Another apparatus for wireless communications at a UE is described. The apparatus may include means for receiving, from a base station, control signaling identifying a configuration for reporting channel metrics for transport blocks that each include a set of multiple code block groups, means for receiving a first transport block that includes a first set of multiple code block groups, and means for transmitting a report indicating a channel metric for one or more code block groups of the first set of multiple code block groups of the first transport block in accordance with the configuration for reporting channel metrics.

A non-transitory computer-readable medium storing code for wireless communications at a UE is described. The code may include instructions executable by a processor to receive, from a base station, control signaling identifying a configuration for reporting channel metrics for transport blocks that each include a set of multiple code block groups, receive a first transport block that includes a first set of multiple code block groups, and transmit a report indicating a channel metric for one or more code block groups of the first set of multiple code block groups of the first transport block in accordance with the configuration for reporting channel metrics.

In some examples of the method, apparatuses, and non-transitory computer-readable medium described herein, receiving the control signaling identifying the configuration may include operations, features, means, or instructions for receiving the control signaling identifying the configuration, the configuration indicating for the UE to report a single value of the channel metric for the first transport block, the reporting indicating the single value of the channel metric for the first set of multiple code block groups of the first transport block.

In some examples of the method, apparatuses, and non-transitory computer-readable medium described herein, receiving the control signaling identifying the configuration may include operations, features, means, or instructions for receiving the control signaling identifying the configuration, the configuration indicating for the UE to report a value of channel metric for each code block group of the first set of multiple code block groups of the first transport block, the reporting indicating the value of the channel metric for each code block group of the first transport block.

In some examples of the method, apparatuses, and non-transitory computer-readable medium described herein, transmitting the report indicating the channel metric may include operations, features, means, or instructions for transmitting the report, where the report includes a difference value between a reference channel metric and the channel metric associated with the one or more code block groups.

In some examples of the method, apparatuses, and non-transitory computer-readable medium described herein, transmitting the report indicating the channel metric may include operations, features, means, or instructions for transmitting the report, where the report includes the channel metric for each set of one or more sets of code block groups of the first set of multiple code block groups in accordance with the configuration.

In some examples of the method, apparatuses, and non-transitory computer-readable medium described herein, transmitting the report indicating the channel metric may include operations, features, means, or instructions for transmitting the report, where the report includes an average metric for the first set of multiple code block groups, or a threshold metric for one code block group of the first set of multiple code block groups, or any combination thereof, where the threshold metric for the code block group may be selected from a set of channel metrics based on the threshold metric satisfying a threshold value, each channel metric of the set of channel metrics corresponding to a respective code block group of the first set of multiple code block groups.

In some examples of the method, apparatuses, and non-transitory computer-readable medium described herein, transmitting the report indicating the channel metric may include operations, features, means, or instructions for transmitting the report, where the report includes an average metric for each code block group of the first set of multiple code block groups, or a threshold metric for one code block from each code block group of the first set of multiple code block groups, or any combination thereof, where the threshold metric for each code block group may be selected from a set of channel metrics based on the threshold metric satisfying a threshold value, each channel metric of the set of channel metrics corresponding to a respective code block of a set of code blocks for each code block group of the first set of multiple code block groups.

Some examples of the method, apparatuses, and non-transitory computer-readable medium described herein may further include operations, features, means, or instructions for identifying a reference channel metric for determining a difference between the channel metric and the reference channel metric, where the reference channel metric includes a scheduled modulation and coding scheme, an average modulation and coding scheme associated with the first set of multiple code block groups, or a metric indicated by the control signaling.

Some examples of the method, apparatuses, and non-transitory computer-readable medium described herein may further include operations, features, means, or instructions for transmitting, to the base station, an indication of the identified reference channel metric.

In some examples of the method, apparatuses, and non-transitory computer-readable medium described herein, the reference channel metric includes a channel quality indicator and the channel quality indicator may be indicated by the control signaling, or the channel quality indicator may be indicated by a mapping identified by the configuration that maps the scheduled modulation and coding scheme to the channel quality indicator.

In some examples of the method, apparatuses, and non-transitory computer-readable medium described herein, the control signaling includes a bitmap indicating the one or more code block groups associated with the channel metric, the one or more code block groups including code block groups associated with a negative acknowledgment or each of the first set of multiple code block groups.

Some examples of the method, apparatuses, and non-transitory computer-readable medium described herein may further include operations, features, means, or instructions for comparing a quantity of code block groups associated with negative acknowledgements to a threshold, where the report indicates the channel metric corresponding to the first transport block or a set of channel metrics corresponding to each code block group of the first set of multiple code block groups based on whether the quantity of code block groups associated with the negative acknowledgements satisfies the threshold.

In some examples of the method, apparatuses, and non-transitory computer-readable medium described herein, the control signaling indicates one or more valid quantities of bits per code block group of the first set of multiple code block groups based on a type of the channel metric, a type of the configuration, or both.

In some examples of the method, apparatuses, and non-transitory computer-readable medium described herein, the channel metric includes a modulation and coding scheme for the first transport block, a channel quality indicator for the first transport block, a set of modulation and coding schemes each of which may be associated with a respective code block group of the first set of multiple code block groups, a set of channel quality indicators each of which may be associated with a respective code block group of the first set of multiple code block groups, or any combination thereof.

A method for wireless communications at a base station is described. The method may include transmitting, to a UE, control signaling identifying a configuration for reporting channel metrics for transport blocks that each include a set of multiple code block groups, transmitting a first transport block that includes a first set of multiple code block groups, and receiving a report indicating a channel metric for one or more code block groups of the first set of multiple code block groups of the first transport block in accordance with the configuration for reporting channel metrics.

An apparatus for wireless communications at a base station is described. The apparatus may include a processor, memory coupled with the processor, and instructions stored in the memory. The instructions may be executable by the processor to cause the apparatus to transmit, to a UE, control signaling identifying a configuration for reporting channel metrics for transport blocks that each include a set of multiple code block groups, transmit a first transport block that includes a first set of multiple code block groups, and receive a report indicating a channel metric for one or more code block groups of the first set of multiple code block groups of the first transport block in accordance with the configuration for reporting channel metrics.

Another apparatus for wireless communications at a base station is described. The apparatus may include means for transmitting, to a UE, control signaling identifying a configuration for reporting channel metrics for transport blocks that each include a set of multiple code block groups, means for transmitting a first transport block that includes a first set of multiple code block groups, and means for receiving a report indicating a channel metric for one or more code block groups of the first set of multiple code block groups of the first transport block in accordance with the configuration for reporting channel metrics.

A non-transitory computer-readable medium storing code for wireless communications at a base station is described. The code may include instructions executable by a processor to transmit, to a UE, control signaling identifying a configuration for reporting channel metrics for transport blocks that each include a set of multiple code block groups, transmit a first transport block that includes a first set of multiple code block groups, and receive a report indicating a channel metric for one or more code block groups of the first set of multiple code block groups of the first transport block in accordance with the configuration for reporting channel metrics.

In some examples of the method, apparatuses, and non-transitory computer-readable medium described herein, transmitting the control signaling identifying the configuration may include operations, features, means, or instructions for transmitting the control signaling identifying the configuration, the configuration indicating for the UE to report a single value of the channel metric for the first transport block, the reporting indicating the single value of the channel metric for the first set of multiple code block groups of the first transport block.

In some examples of the method, apparatuses, and non-transitory computer-readable medium described herein, transmitting the control signaling identifying the configuration may include operations, features, means, or instructions for transmitting the control signaling identifying the configuration, the configuration indicating for the UE to report a value of channel metric for each code block group of the first set of multiple code block groups of the first transport block, the reporting indicating the value of the channel metric for each code block group of the first transport block.

In some examples of the method, apparatuses, and non-transitory computer-readable medium described herein, receiving the report indicating the channel metric may include operations, features, means, or instructions for receiving the report, where the report includes a difference value between a reference channel metric and the channel metric associated with the one or more code block groups.

In some examples of the method, apparatuses, and non-transitory computer-readable medium described herein, receiving the report indicating the channel metric may include operations, features, means, or instructions for receiving the report, where the report includes the channel metric for each set of one or more sets of code block groups of the first set of multiple code block groups in accordance with the configuration.

In some examples of the method, apparatuses, and non-transitory computer-readable medium described herein, receiving the report indicating the channel metric may include operations, features, means, or instructions for receiving the report, where the channel metric includes an average metric for the first set of multiple code block groups, or a threshold metric for one code block group of the first set of multiple code block groups, or any combination thereof, where the threshold metric for the code block group may be selected from a set of channel metrics based on the threshold metric satisfying a threshold value, each channel metric of the set of channel metrics corresponding to a respective code block group of the first set of multiple code block groups.

In some examples of the method, apparatuses, and non-transitory computer-readable medium described herein, receiving the report indicating the channel metric may include operations, features, means, or instructions for receiving the report, where the report includes an average metric for each code block group of the first set of multiple code block groups, or a threshold metric for one code block from each code block group of the first set of multiple code block groups, or any combination thereof, where the threshold metric for each code block group may be selected from a set of channel metrics based on the threshold metric satisfying a threshold value, each channel metric of the set of channel metrics corresponding to a respective code block of a set of code blocks for each code block group of the first set of multiple code block groups.

Some examples of the method, apparatuses, and non-transitory computer-readable medium described herein may further include operations, features, means, or instructions for identifying a reference channel metric for determining the channel metric based on the report indicating a difference between the channel metric and the reference channel metric, where the reference channel metric includes a scheduled modulation and coding scheme, an average modulation and coding scheme associated with the first set of multiple code block groups, or a metric indicated by the control signaling.

Some examples of the method, apparatuses, and non-transitory computer-readable medium described herein may further include operations, features, means, or instructions for receiving, from the UE, an indication of the reference channel metric.

In some examples of the method, apparatuses, and non-transitory computer-readable medium described herein, the control signaling includes a bitmap indicating the one or more code block groups associated with the channel metric, the one or more code block groups including code block groups associated with a negative acknowledgment or each of the first set of multiple code block groups.

In some examples of the method, apparatuses, and non-transitory computer-readable medium described herein, the channel metric includes a modulation and coding scheme for the first transport block, a channel quality indicator for the first transport block, a set of modulation and coding schemes each of which may be associated with a respective code block group of the first set of multiple code block groups, a set of channel quality indicators each of which may be associated with a respective code block group of the first set of multiple code block groups, or any combination thereof.

BRIEF DESCRIPTION OF THE DRAWINGS

FIG. 7 illustrates an example of differential CQI tables that support channel state information reporting of code block group based transport blocks in accordance with aspects of the present disclosure.

DETAILED DESCRIPTION

Figure 1:
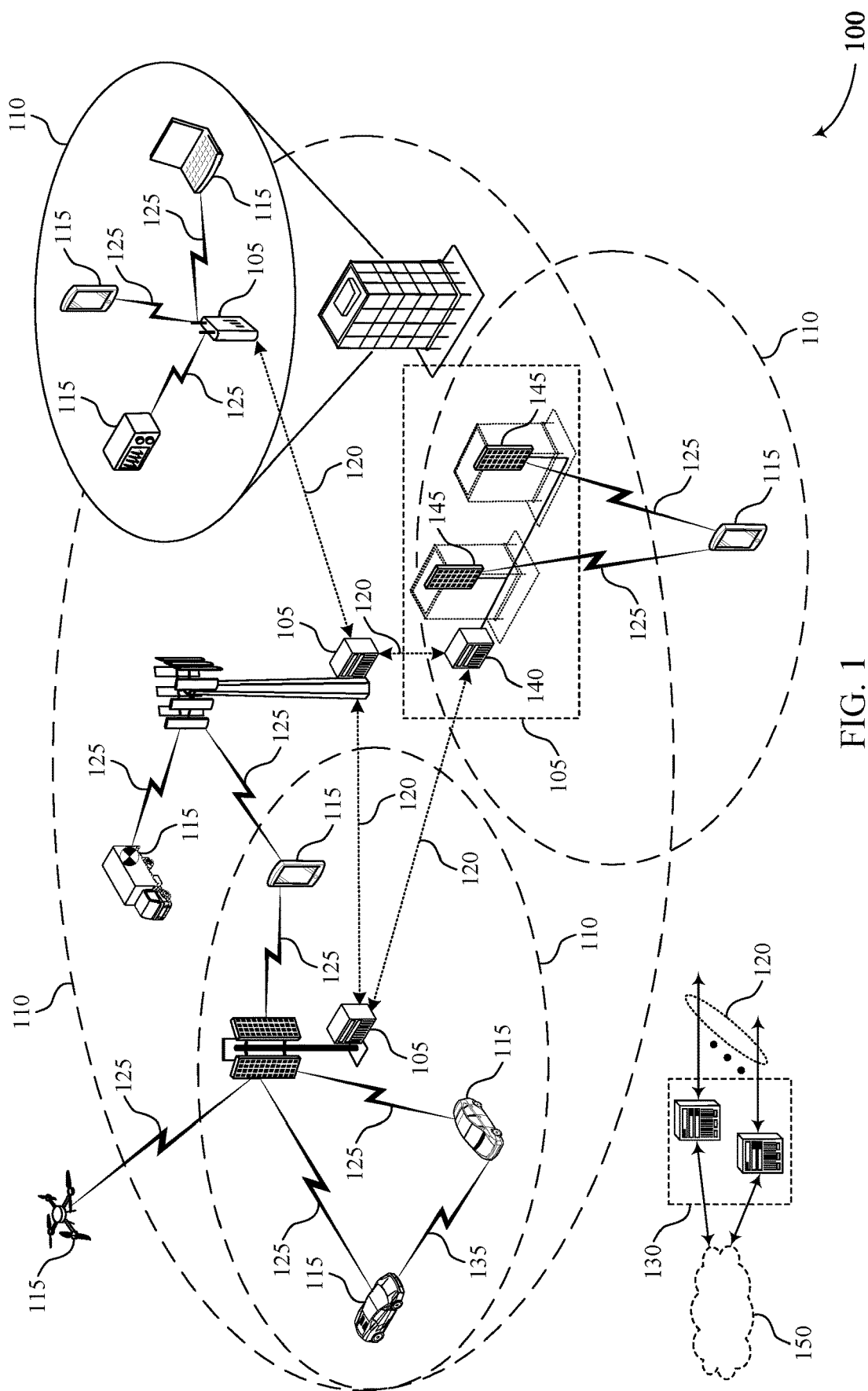
FIG. 1 illustrates an example of a wireless communications system that supports channel state information reporting of code block group based transport blocks in accordance with aspects of the present disclosure.

A base station may send data to a user equipment (UE), and the UE may provide feedback for the data to the base station. For example, the base station may communicate a transport block to the UE. The transport block may include one or more code block groups (CBGs). In some examples, a transport block transmission may include a single transport block (e.g., a physical downlink shared channel (PDSCH) transport block) with a single CBG (e.g., including multiple code blocks). In some examples, a transport block transmission may include multiple CBGs (e.g., PDSCH CBGs) where each transport block is divided into CBGs. Each CBG may include one or more code blocks (CBs), which may include a data size (e.g., each code block may include a configured or pre-configured quantity of bits). However, in some examples a UE may be unable to report channel feedback to the base station when a transport block includes multiple CBGs, or the UE may inefficiently report such feedback for the transport block. Thus, techniques for improved reporting of channel information are desired.

Accordingly, the techniques described herein provide for enhanced feedback and reporting of channel information for transport blocks including multiple CBGs. In some examples, such reporting may be included in feedback messaging for the transport block. For example, the UE may attempt to decode the CBGs in a transport block and transmit feedback (e.g., hybrid automatic repeat request (HARQ) feedback) to indicate which CBGs were successfully decoded or which CBGs were unsuccessfully decoded or both. The UE may indicate an acknowledgment (ACK) for each successfully decoded CBG and a negative acknowledgment (NACK) for each unsuccessfully decoded CBG. Additionally or alternatively, the UE may report channel metrics for the multiple CBGs. For example, the UE may report channel state information (CSI), a modulation and coding scheme (MC S), or channel quality information (CQI), among other examples of channel metrics. In some cases, the UE may report a single channel metric for multiple CBGs in the transport block (e.g., all of the CBGs may correspond to the channel metric). Additionally or alternatively, the UE may report a channel metric for each CBG in the transport block. As described in various examples based in the present disclosure, a UE may be configured, for example based on control signaling from a base station, to use either transport block-level feedback reporting or CBG-level feedback reporting. That is, the UE may be configured to report one or more channel metrics for a respective transport block or the UE may be configured to report one or more channel metrics for a respective CBG as described herein.

In some examples, a UE may be configured to report an absolute channel metric (e.g., a channel metric relative to zero). Additionally or alternatively, the UE may be configured to report a differential channel metric. For example, the UE can identify a reference channel metric and report a difference between the absolute channel metric and the reference channel metric. In some cases, the base station may configure the reference channel metric for the UE. In some cases, the UE may use an average channel metric as the reference channel metric. The UE may use one or more indexes in one or more tables to indicate the differential channel metric. In some examples, the differential channel metric may have a shorter bit length compared to reporting an absolute channel metric for each unsuccessfully decoded CBG, which may reduce the signaling overhead of reporting channel information, among other benefits.

Additionally or alternatively, the base station may configure the UE to compress the channel metrics of multiple CBGs into a bundle. For example, the UE may be configured to transmit a metric for a subset of CBGs by control signaling from a base station or a pre-configuration of the UE. Stated alternatively, the UE may be configured with bundled or compressed groups of CBGs for reporting feedback. In some such examples, the subset of CBGs may be one of multiple subsets of CBGs in the transport block.

Aspects of the disclosure are initially described in the context of wireless communications systems. Aspects of the disclosure are further illustrated by and described with reference to apparatus diagrams, system diagrams, and flowcharts that relate to channel state information reporting of code block group based transport blocks.

FIG. 1 illustrates an example of a wireless communications system 100 that supports channel state information reporting of code block group based transport blocks in accordance with aspects of the present disclosure. The wireless communications system 100 may include one or more base stations 105, one or more UEs 115, and a core network 130. In some examples, the wireless communications system 100 may be a Long Term Evolution (LTE) network, an LTE-Advanced (LTE-A) network, an LTE-A Pro network, or a New Radio (NR) network. In some examples, the wireless communications system 100 may support enhanced broadband communications, ultra-reliable communications, low latency communications, communications with low-cost and low-complexity devices, or any combination thereof.

The base stations 105 may be dispersed throughout a geographic area to form the wireless communications system 100 and may be devices in different forms or having different capabilities. The base stations 105 and the UEs 115 may wirelessly communicate via one or more communication links 125. Each base station 105 may provide a coverage area 110 over which the UEs 115 and the base station 105 may establish one or more communication links 125. The coverage area 110 may be an example of a geographic area over which a base station 105 and a UE 115 may support the communication of signals according to one or more radio access technologies.

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the base stations 105, or network equipment (e.g., core network nodes, relay devices, integrated access and backhaul (IAB) nodes, or other network equipment), as shown in FIG. 1.

The base stations 105 may communicate with the core network 130, or with one another, or both. For example, the base stations 105 may interface with the core network 130 through one or more backhaul links 120 (e.g., via an S1, N2, N3, or other interface). The base stations 105 may communicate with one another over the backhaul links 120 (e.g., via an X2, Xn, or other interface) either directly (e.g., directly between base stations 105), or indirectly (e.g., via core network 130), or both. In some examples, the backhaul links 120 may be or include one or more wireless links.

One or more of the base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown in FIG. 1.

The UEs 115 and the base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

The time intervals for the base stations 105 or the UEs 115 may be expressed in multiples of a basic time unit which may, for example, refer to a sampling period of $T_s=1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., the number of symbol periods in a TTI) may be variable. Additionally or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a number of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communications system 100 may include, for example, a heterogeneous network in which different types of the base stations 105 provide coverage for various geographic coverage areas 110 using the same or different radio access technologies.

The wireless communications system 100 may support synchronous or asynchronous operation. For synchronous operation, the base stations 105 may have similar frame timings, and transmissions from different base stations 105 may be approximately aligned in time. For asynchronous operation, the base stations 105 may have different frame timings, and transmissions from different base stations 105 may, in some examples, not be aligned in time. The techniques described herein may be used for either synchronous or asynchronous operations.

The wireless communications system 100 may be configured to support ultra-reliable communications or low-latency communications, or various combinations thereof. For example, the wireless communications system 100 may be configured to support ultra-reliable low-latency communications (URLLC). The UEs 115 may be designed to support ultra-reliable, low-latency, or critical functions. Ultra-reliable communications may include private communication or group communication and may be supported by one or more services such as push-to-talk, video, or data. Support for ultra-reliable, low-latency functions may include prioritization of services, and such services may be used for public safety or general commercial applications. The terms ultra-reliable, low-latency, and ultra-reliable low-latency may be used interchangeably herein.

In some examples, a UE 115 may also be able to communicate directly with other UEs 115 over a device-to-device (D2D) communication link 135 (e.g., using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of the UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between the UEs 115 without the involvement of a base station 105.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices (e.g., radio heads and ANCs) or consolidated into a single network device (e.g., a base station 105).

The wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as the base stations 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally or alternatively, an antenna panel may support radio frequency beamforming for a signal transmitted via an antenna port.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

The UEs 115 and the base stations 105 may support retransmissions of data to increase the likelihood that data is received successfully. Hybrid automatic repeat request (HARQ) feedback is one technique for increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the medium access control (MAC) layer in poor radio conditions (e.g., low signal-to-noise conditions). In some examples, a device may support same-slot HARQ feedback, where the device may provide HARQ feedback in a specific slot for data received in a previous symbol in the slot. In other cases, the device may provide HARQ feedback in a subsequent slot, or according to some other time interval.

A UE 115 may transmit feedback for a data transmission including multiple CBGs. The UE 115 may transmit HARQ ACK feedback and channel information to improve reliability for a retransmission of unsuccessfully decoded CBGs, as an example. A UE 115 described herein may be configured (e.g., a pre-configuration of the UE 115 or via control signaling from a base station 105 such as an indication of a configuration for channel information reporting in a radio resource control (RRC) message, a downlink control information (DCI) message, a MAC control element (CE) message, or other examples of control signaling) to either report channel feedback for the individual CBGs (e.g., one metric per CBG) or for an entire transport block (e.g., one metric for all of the CBGs or for a group of multiple CBGs). For example, in a transport block feedback mode, the UE may report an average for all the CBGs or a threshold metric for one CBG as applicable to all of the CBGs.

Additionally or alternatively, the UE 115 may implement techniques to report a differential metric rather than an absolute metric. For example, the UE 115 may identify a reference metric and report a difference between the absolute metric and the reference metric. The base station 105 may configure the reference metric, or the UE 115 may use an average metric across multiple CBGs or an MCS as the reference metric.

Additionally or alternatively, the UE 115 may transmit a compressed feedback for more than one CBG. For example, the UE 115 may transmit a metric for a group of CBGs selected from multiple CBG groupings in the transport block. In some cases, the group may be selected based on control signaling from the base station 105 or based on a feedback configuration.

Figure 2:
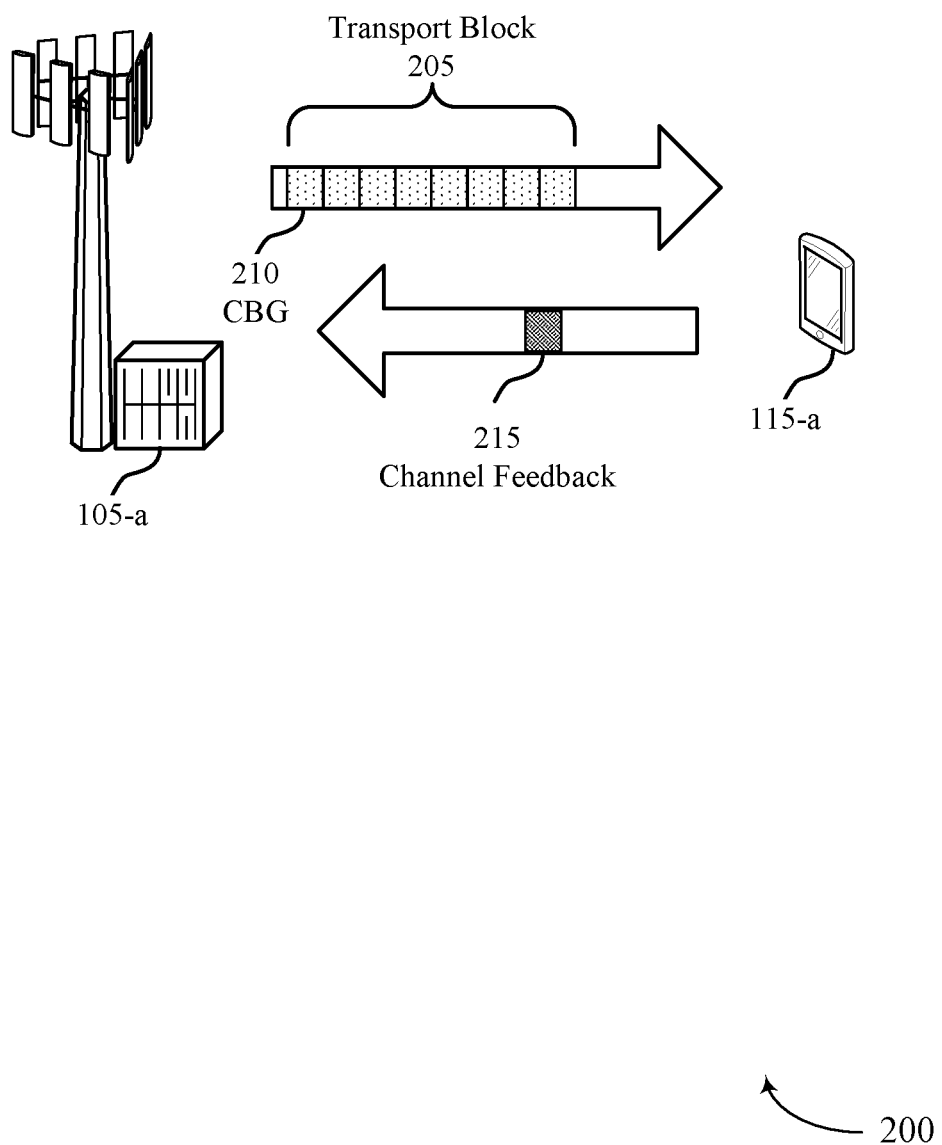
FIG. 2 illustrates an example of a wireless communications system that supports channel state information reporting of code block group based transport blocks in accordance with aspects of the present disclosure.

FIG. 2 illustrates an example of a wireless communications system 200 that supports channel state information reporting of code block group based transport blocks in accordance with aspects of the present disclosure. In some examples, the wireless communications system 200 may implement aspects of wireless communications system 100. The wireless communications system 200 may include UE 115-a and base station 105-a, which may be respective examples of a UE 115 and a base station 105 described with reference to FIG. 1.

Base station 105-a may transmit data on, for example, a PDSCH or a physical downlink control channel (PDCCH) to UE 115-a. The data may be transmitted in a transport block 205 including one or more CBGs 210. In some examples, each CBG 210 may include one or more code blocks including a respective quantity of bits. UE 115-a may attempt to decode the CBGs 210 and transmit feedback 215, such as HARQ feedback, to indicate which CBGs 210 were successfully decoded and which CBGs 210 were unsuccessfully decoded. UE 115-a may indicate an ACK for each successfully decoded CBG 210 and a NACK for each unsuccessfully decoded CBG 210.

The wireless communications system 200 may support ultra-reliable or low latency communications. In some cases, to support the ultra-reliable or low latency communications, the wireless communications system 200 may implement techniques for faster feedback and retransmissions (e.g., ultra-reliable low latency communications). For example, UE 115-a may report channel information (e.g., CQI, CSI, or MCS, among other examples of channel information indications or reporting) with the feedback 215, and base station 105-a may select an MCS, transmit beam, resource allocation, or any combination thereof, for a retransmission or subsequent data transmissions based on the reported information. In some cases, UE 115-a may report channel information for the transport block 205 (e.g., transport block-level reporting), or UE 115-a may report channel information for each CBG of the transport block 205 (e.g., CBG-level reporting).

In some cases, the base station 105-a may attempt to send a single retransmission, such that the data is successfully received by UE 115-a relatively quickly or with relatively few transmissions (e.g., with a maximum of two HARQ transmissions). In some cases, base station 105-a may target a residual block error rate (BLER) of less than $10^{-4}$ with two HARQ transmissions based on the inclusion of CQI with the feedback 215. In some cases, the initial transmission MCS may be based on periodic feedback reports, and the initial transmission may have a target BLER of 10%. For example, the initial transmission may result in a HARQ NACK for 10% of the CBGs 210 and a HARQ ACK for 90% of the CBGs 210. In some cases, including more information with NACK feedback may help the base station 105-a use more accurate MCS, resource allocation, transmission beams, or any combination thereof to target a smaller BLER. In some examples, such information may include DCI misdetection or MCS information, among other examples of information and metrics. The MCS for the retransmission may be based on the periodic feedback reports, the asynchronous feedback reports included with the feedback 215, or both, and the target BLER for the retransmission may be $10^{-5}$.

In some applications (e.g., extended reality (XR)) the transport block 205 may include multiple CBGs 210. To support communications (e.g., retransmission of the multiple CBGs 210), feedback 215 may include CSI for the base station 105-a. In some cases, the base station 105-a may determine the best MCS for retransmitting the transport block 205, based on the CSI. Additionally or alternatively, the CSI may determine the best resource block (RB) allocation by determining the best RBs for retransmitting the transport block 205, for example, retransmitting a CBG 210 in a RB allocation "Y" instead of RB allocation "X," where RB allocation "Y" was used for the first transmission of CBG 210 or for a failed retransmission of CBG 210. In some cases, the best RB allocation for retransmitting the failed CBG 210, or for new transmissions, may be based on an estimated signal-to-interference-plus-noise ratio (SINR) for each CBG 210. In some cases, CSI feedback may be applied to enhanced mobile broadband (eMBB) applications with multiple CBGs 210.

In accordance with the techniques described herein, the base station 105-a may configure the UE 115-a to use transport block-based CSI or CBG-based CSI for transport blocks including multiple CBGs 210. In some examples, the base station 105-a may configure the UE 115-a to use absolute transport block-based CSI and use a signal-to-noise (SNR) mode or CSI mode. For example, the UE may use transport block-based CSI to reduce feedback, when a channel has low diversity and is slowly changing, or any combination thereof. For transport block-based PDSCH, a single CSI (e.g., CQI or MCS) may be included in the feedback 215. For example, a single MCS may include or otherwise indicate an average SNR or CSI across multiple CBGs 210. Additionally or alternatively, a worst-case SNR or CSI CBG 210 may be identified as a threshold value. That is, the metric (e.g., SNR, CSI, MCS, CQI) may be an average metric or a threshold metric. The threshold metric may be an example of a worst-case metric or, in other words, the metric of the CBG 210 that indicates the lowest quality channel conditions (e.g., a highest SNR of the CBGs 210 may be determined, reported, or both, a lowest MCS or the lowest code rate of the CBGs 210 may be reported, etc.). Stated alternatively, the threshold metric may satisfy a threshold value (e.g., a configured threshold value, a lowest value of a set of metrics associated with respective CBGs 210, a highest value of the set of metrics, and the like).

In some examples, the base station 105-a may configure the UE 115-a to use absolute CBG-based CSI. For CBG-based PDSCH, the UE 115-a may send a different CSI (e.g., CQI or MCS) for each CBG 210. For example, if ACK and NACK indication occurs for each CBG 210, the base station 105-a may modify retransmission of each CBG 210 based on its relative CSI. In some cases, the UE 115-a may determine the CSI for a CBG 210 based on the average SNR or CSI across multiple CBs in the CBG 210. Additionally or alternatively, the UE 115-a may determine the CSI based on identifying a worst-case SNR or CSI CBG as a threshold metric or value. Based on the base station 105-a configuring the UE 115-a, the UE 115-a may report an MCS per transport block or per CBG. Reporting an MCS for each CBG may use more bits than reporting an MCS for each transport block, but may achieve improved retransmission and a better resource allocation among NACKed CBGs.

In some examples, the base station 105-a may configure the UE 115-a to use differential CSI instead of absolute CSI in order to save feedback bits. For example, the UE 115-a may report a differential MCS based on a reference MCS. In some cases, the UE 115-a may use a scheduled MCS (for example, an MCS scheduled by the transport block 205) as the reference MCS. The UE 115-a may compute the differential MCS based on the difference between the scheduled MCS and reported MCS. If the reference MCS is scheduled by the transport block 205, the UE 115-a may not report the reference MCS and the determined differential MCS.

In some examples, the UE 115-a may use an average MCS across multiple CBGs 210 as the reference MCS. The UE 115-a may compute the differential MCS based at least in part on the difference between the average MCS and reported MCS. If the reference MCS is the average MCS across multiple CBGs 210, the UE 115-a may be configured to report the reference MCS. Alternatively, the UE 115-a may be configured not to report the reference MCS.

In some examples, the UE 115-a may use another MCS explicitly signaled by the base station 105-a as the reference MCS. The UE 115-a may compute the differential MCS based on the difference between the signaled MCS and reported MCS. For example, the base station 105-a may signal the reference MCS in RRC signaling, DCI signaling, MAC-CE signaling, or any combination thereof. In some cases, the base station 105-*a* may configure the UE 115-*a* to use a reference CQI. For example, the base station 105-*a* may signal the reference CQI in RRC signaling, DC signaling, MAC-CE signaling, or any combination thereof. In some cases, the base station 105-*a* may signal the reference MCS or the reference CQI while signaling the scheduled MCS. Additionally or alternatively, the base station 105-*a* may prepare a mapping table between the scheduled MCS and the reference CQI. For example, MCS 0, 1, and 2 may use and map to CQI 1, MCS 3, 4, and 5 may use and map to CQI 2, and so on, where each of the scheduled MCS indexes are mapped to a reference CQI.

In some examples, the base station 105-*a* may configure the UE 115-*a* to compress (also referred to as bundle or group), the feedback of multiple CBGs. For example, the UE 115-*a* may compress CSI, MCS, or CQI, or any combination of CSI, MCS, or CQI, for multiple CBGs into one CSI, MCS, or CQI, or combined, metric, which may be referred to as CBG CSI/MCS/CQI grouping. In some cases, the grouping may be configured through RRC configuration. Additionally or alternatively, the grouping may be configured based at least on a pre-configuration of the wireless devices. In some cases, the base station 105-*a* may generate and indicate a bitmap to the UE 115-*a*. The bitmap may identify which CBGs are associated with the CSI. That is, the bitmap may indicate which CBGs 210 that the UE 115-*a* is to report a CSI, and the UE 115-*a* may determine and report a metric for each indicated CBG 210, or report a single average or threshold metric for the indicated CBGs 210. In some examples, the bitmap may indicate any CBG 210 that corresponds to a NACK feedback from the UE 115-*a*. In some such examples, the UE 115-*a* may only report channel information for NACKed CBGs 210 in transport block 205. Additionally or alternatively, the UE 115-*a* may report channel information for all CBGs 210 in transport block 205.

In some examples, for per-CBG CQI reporting, UE 115-*a* may determine the CQI for each CBG 210 based on a spectral efficiency of the CBG 210. UE 115-*a* may use a CQI-to-efficiency table to get a CQI value for the CBG 210 based on the spectral efficiency. In some cases, the CQI-to-efficiency table may include multiple indexes, where a spectral efficiency value corresponds to a CQI index. Additionally, or alternatively, the CQI per CBG computation may be based on log likelihood ratios, demodulation reference signals, or any combination thereof. UE 115-*a* may report the CQI index for each CBG 210, and base station 105-*a* may adapt retransmission parameters and the MCS based on the received CQI indexes. In some cases, the CQI-to-efficiency table may have 16 entries, so the CQI index may be 4 bits, though the per-CBG CQI reporting bit length may vary in other examples. In some cases, the bit length of reporting CQI per CBG 210 may be referred as K. Therefore, if UE 115-*a* has n unsuccessfully decoded CBGs 210, UE 115-*a* may use n*K bits to send per-CBG CQI feedback for the n unsuccessfully decoded CBGs 210.

For per-CBG MCS reporting, UE 115-*a* may determine the MCS for each CBG 210 based on a spectral efficiency of the CBG 210. UE 115-*a* may use an MCS-to-efficiency table to obtain an MCS value for the CBG 210 based on the spectral efficiency. In some cases, the MCS-to-efficiency table may include multiple indexes, where a spectral efficiency value corresponds to an MCS index. Additionally, or alternatively, the MCS per CBG computation may be based on log likelihood ratios, demodulation reference signals, or any combination thereof. UE 115-*a* may report the MCS index for each CBG 210, and base station 105-*a* may adapt retransmission parameters based on the received MCS indexes. In some cases, the MCS-to-efficiency table may have 16 entries, so the MCS index may be 5 bits, though the per-CBG MCS reporting bit length may vary in other examples. In some cases, the bit length of reporting MCS per CBG 210 may be referred as K. Therefore, if UE 115-*a* has n unsuccessfully decoded CBGs 210, UE 115-*a* may use n*K bits to send per-CBG CQI feedback for the n unsuccessfully decoded CBGs 210.

For transport block-level CQI reporting, UE 115-*a* may send a single CQI report for the transport block 205 in the feedback 215. For CBG-level PDSCH the UE 115-*a* may send different CQI for each CBG 210. In some cases, providing CQI for each CBG 210 may provide more accurate CQI information, as ACK/NACK feedback may also be provided per-CBG. In some wireless communications systems, a UE 115 may support either per-transport block CQI or per-CBG CQI. Per-CBG CQI may have higher reporting overhead, but a better resource allocation may improve the retransmission and resource allocation among the unsuccessfully decoded CBGs. UEs 115 of these systems may generally not be configured to support both per-transport block CQI reporting and per-CBG CQI reporting.

For transport block-level MCS reporting, UE 115-*a* may send a single MCS report for the transport block 205 in the feedback 215. For CBG-level PDSCH, UE 115-*a* may send different MCS for each CBG 210. In some cases, providing MCS for each CBG 210 may provide more accurate MCS information, as ACK/NACK feedback is also provided per-CBG. In some wireless communications systems, a UE 115 may support either per-transport block MCS or per-CBG MCS. Per-CBG MCS may have higher reporting overhead, but a better resource allocation may improve the retransmission and resource allocation among the unsuccessfully decoded CBGs. UEs 115 of these systems may generally not be configured to support both per-transport block MCS reporting and per-CBG MCS reporting.

In some examples, the UE 115-*a* may support per-transport block CQI reporting, per-CBG CQI reporting, per-transport block MCS reporting, per-CBG MCS reporting, or any combination thereof, among other examples of metrics and reporting schemes (e.g., grouping of CBGs into multiple sets such that, as an illustrative example, three CBGs correspond to a respective metric, though any quantity of CBGs may be included in a group or set). Base station 105-*a* may transmit an indication of which CQI or MCS reporting mode the UE 115-*a* is to use. For example, the base station 105-*a* may transmit control signaling identifying (e.g., indicating) a configuration for reporting channel metrics for transport blocks that each include multiple code block groups. Such control signaling may include or be an example of RRC signaling, DCI signaling, MAC-CE signaling, or any combination thereof, among other examples of control signaling. The UE 115-*a* may receive such an indication and report feedback 215 in accordance with the reporting mode for a transport block 205 or CBGs 210 of the transport block 205.

In some examples, the control signaling identifying the configuration may indicate for the UE to report a single value of the channel metric for a transport block (e.g., transport block-based CSI) and the reporting from the UE 115-*a* may indicate the single value. In some examples, the control signaling identifying the configuration may indicate for the UE to report a respective value of the channel metric for each CBG 210 (e.g., CBG-based CSI) and the reporting from the UE 115-a may indicate the value for each CBG 210.

The wireless communications system 200 may support techniques for reducing CBG reporting overhead. For example, UE 115-a may report an absolute metric (e.g., an average metric, such as an average CQI or average MCS), or a differential metric for CBGs 210. An absolute metric may be relative to zero (e.g., an MCS index of 20 may be reported as 20) and the differential metric may be a difference between a reference metric and the absolute metric (e.g., if a reference MCS index is 15, the differential metric may be 5 to indicate the absolute MCS index of 20 with fewer bits and less signaling overhead, though any metric or quantity may be used). In some examples, a differential metric may include fewer bits than the absolute metric for a CBG 210. For example, a CQI for a CBG 210 may use K bits (e.g., four bits), and a differential CQI for a CBG 210 may use fewer than K bits (e.g., one, two, or three bits). In some cases, the average CQI may use K bits. Similarly, an MCS for a CBG 210 may use K bits (e.g., five bits), and a differential MCS for a CBG 210 may use fewer than K bits (e.g., one, two, three, or four bits). In some cases, the average MCS may use K bits.

The average metric may be determined based on at least some of the CBGs 210 of a transport block 205. In some cases, the average metric may be determined based on the unsuccessfully decoded CBGs 210 of the transport block. In some cases, the average metric may be determined based on all CBGs 210 of the transport block (e.g., including successfully or unsuccessfully decoded CBGs). In some cases, the average metric may be determined based on a subset of unsuccessfully decoded CBGs. For example, base station 105-a may indicate a threshold number of CBGs 210, and UE 115-a may determine the average metric based on a group of CBGs 210 with a group size corresponding to the threshold number of CBGs 210.

A differential metric may be determined based on a difference between the average metric and a metric of a CBG 210. For example, UE 115-a may determine the average metric and the metric of each unsuccessfully decoded CBG 210. Then, the differential metric for a CBG 210 may be determined based on a difference between the average metric and the metric of the CBG 210. For example, for CBG k, $\Delta CQI_k = CQI_{avg} - CQI_k$ or $\Delta MCS_k = MCS_{avg} - MCS_k$.

The differential metric for the CBG 210 may be quantized to a value based on a differential values table. For example, UE 115-a may use a table to map the differential CQI or MCS to an index of a table. UE 115-a may be configured with multiple differential value tables with different granularities. For example, if the average CQI is 4 bits (e.g., K=4), then UE 115-a may use 1, 2, or 3 bits to report the differential CQI. This may correspond to differential value tables with 2 entries, 4 entries, or 8 entries. Some examples of differential CQI values tables are described in more detail herein, for example, with respect to FIG. 5. Similarly, if the average MCS is 5 bits (e.g., K=5), then UE 115-a may use 1, 2, 3, or 4 bits to report the differential MCS. This may correspond to differential value tables with 2 entries, 4 entries, 8, or 16 entries. Some examples of differential MCS values tables are described in more detail herein, for example, with respect to FIG. 6.

A total number of bits to report the average metric (e.g., the reference metric) and the differential metric for each CBG 210 may then be smaller than a number of bits to report an absolute metric for each CBG 210. For example, if n CBGs 210 failed, the number of reported bits may be K+n*(numBitsPerCBG) bits, where numBitsPerCBG corresponds to the number of bits of a corresponding differential values table (e.g., 1 bit, 2 bits, or 3 bits if K is 4 bits, and 1 bit, 2 bits, 3 bits, or 4 bits if K is 5 bits). As an example, using the largest value of numBitsPerCBG, reporting differential metric feedback may use fewer bits than reporting individual metric feedback as long as the number of unsuccessfully decoded CBGs 210 is larger than the number of bits for individual metric feedback (e.g., n>K).

In some cases, UE 115-a may determine just one CBG 210 was unsuccessfully decoded. In this example, UE 115-a may transmit individual metric feedback for the one unsuccessfully decoded CBG 210. Base station 105-a may receive the ACK feedback, determine that just one CBG 210 was unsuccessfully decoded, and determine that UE 115-a is reporting individual (e.g., uncompressed) feedback for the CBG 210.

In some examples, base station 105-a may indicate a threshold number of CBGs to UE 115-a. For example, UE 115-a may omit a differential CQI for some unsuccessfully decoded CBGs to further reduce feedback overhead. For example, base station 105-a may configure UE 115-a to report differential metrics for X failed CBGs. Then, if UE 115-a is operating in the CBG-based reporting mode, UE 115-a may report a differential metric for X unsuccessfully decoded CBGs instead of reporting differential metrics for all failed CBGs. In some cases, the average metric (i.e., reference metric) may be determined based on all CBGs (e.g., successfully or unsuccessfully decoded CBGs), all unsuccessfully decoded BGS, or just the X CBGs which have differential metrics reported. UE 115-a may still report HARQ ACK feedback for all CBGs 210 of the transport block 205, such that base station 105-a identifies which CBGs 210 were successfully or unsuccessfully decoded. In some cases, UE 115-a may select the X CBGs according to an order, such as pre-configured order. In some cases, base station 105-a may configure UE 115-a with a value for X via a MAC-CE or RRC signaling. In some cases, the threshold number of CBGs 210 may be based on a capability of a UE 115. For example, UEs 115 with different processing or computational capabilities may have different threshold. If a UE 115 has a higher computational power, the UE 115 may have a higher threshold number of CBGs. In some cases, the threshold number of CBGs may be indicated via downlink control information.

In some cases, base station 105-a may indicate a default differential value table. For example, each differential value table may correspond to a number of bits or numBitsPerCBG. Base station 105-a may send an indication, L, corresponding to one of the tables UE 115-a is to use for differential metric feedback. An initial signaling for L may be sent via RRC or a MAC CE. The value for L may be dynamically updated through DCI. If L is set to a value, but that value causes compression loss (e.g., the differential CQI reporting uses more bits than individual per-CBG metric feedback), then UE 115-a may use a default value for L. For example, for CQI reporting, if K=4, 5 CBGs 210 were unsuccessfully received, and the differential value tables are 1 bit, 2 bits, and 3 bits, then UE 115-a may use either 9 bits, 14 bits, or 19 bits to report differential CQI feedback. If the default value of L is 3 (e.g., corresponding to the 3 bit table), then reporting differential CQI feedback may reduce overhead by 1 bit. For example, if n=5, then L may be less than or equal to 2. However, if 4 CBGs 210 were unsuccessfully received, and the default value of L is 3, the reporting differential CQI feedback may require more bits (e.g., 16 bits) than individual per-CBG feedback (e.g., 12 bits). In some cases, a table may be configured with all possible n for a given K. The table may be used whenever an agreed value in DCI (or RRC signaling or a MAC CE) is higher than the successful compression values. An example of the table for K=4 is shown below with respect to Table 1.

TABLE 1

| n | Usable L |
|---|---|
| 1 | Send individual CQI feedback |
| 2 | L = 1 |
| 3, 4 | L ≤ 2 |
| >=5 | L ≤ 3 |

Similarly, for MCS reporting, if K=5, 3 CBGs 210 were unsuccessfully received, and the differential value tables are 1 bit, 2 bits, 3 bits, and 4 bits then UE 115-a may use either 8 bits, 11 bits, 14 bits, or 17 bits to report differential CQI feedback. If the default value of L is 4 (e.g., corresponding to the 4 bit table), then reporting differential MCS feedback may use the same number of bits or more than individual per-CBG feedback. In this example, UE 115-a and base station 105-a may determine to use an L value of 3, which may provide reduced overhead of 1 bit. Alternatively, UE 115-a and base station 105-a may determine to use an L value of 2, which may provide reduced overhead of 4 bits.

Base station 105-a may receive the feedback 215 and determine parameters for a retransmission of the unsuccessfully decoded CBGs 210. Based on the CBG HARQ ACK feedback, base station 105-a may determine a transport block size for the unsuccessfully decoded (e.g., NACKed) CBGs 210. Based on the differential metric feedback per CBG and the average metric, base station 105-a may determine a common modulation order and code rate for retransmitting the CBGs 210, and base station 105-a may determine a time and frequency resource allocation for the retransmission. Based on the determined common MCS for the retransmitted CBGs, base station 105-a may schedule the retransmission for the CBGs 210. For example, base station 105-a may transmit DCI with a grant allocating the resource to UE 115-a, and base station 105-a may retransmit the CBGs on the resource. Thus, the base station 105-a may adjust one or more parameters (e.g., resources, MCS, etc.) for subsequent communications, such as for retransmission of NACKed CBGs 210 or other communications, based on the feedback 215 (e.g., in accordance with the channel information and metrics included in the feedback 215 or in another message).

In some examples, the devices may compute a MCS based on all CBGs 210 in a transport block. In some cases, the devices may exclude ACKed CBGs 210 or the UE 115-a may include the ACKed CBGs 210 (e.g., resource blocks (RBs) used for ACKed CBGs may be used for the NACKed CBGs 210). In some examples, the devices may compute the MCS of each CBG 210 then take the average metric across CBGs 210 CSI (or MCS or rank indicator (RI) or other metric). In some example, such an average metric may represent a reference metric (e.g., a reference MCS denoted by $MCS_{ref}$). A reference metric may be a scheduled metric (e.g., a scheduled MCS may be used as a reference MCS) or the reference metric may be the average metric (e.g., average MCS across CBGs 210).

In some examples, the UE 115-a may report an offset per CBG 210 for each of the CBGs 210 in the transport block (e.g., the UE 115-a may assume MCS of CBG number k is $CQI_k$, the reported MCS is $(MCS_{ref}-MCS_k)$, and the UE 115-a may quantize this based on the tables described herein and send the report of the quantization). Such examples may additionally or alternatively apply to other metrics (e.g., $CQI_{ref}$). In some examples, a total number of bits, assuming n failed CBGs 210, may be K+(n*numBitsPerCBG) bits, where numBitsPerCBG may be 1, 2, 3 (e.g., a RRC or DCI message or other control signaling may indicate the number of bits). In some cases, numBitsPerCBG may not be set to 4 or higher since this may result in more signaling overhead (e.g., a higher quantity of bits) than per CBG reporting and thus no averaging may be transmitted (e.g., higher resolution may be obtained with the same or less signaling overhead by transmitting per CBG MCS rather than averaging if the numBitsPerCBG is higher than 4). For example, using the maximum numBitsPerCBG=K−1=3, K+n*(K−1)=K+nK−n=nK−(n−K), which may be lower than nK as long as n>K (i.e., number of failed-CRC CBGs 210 is higher than 4).

In some examples, when the numBitsPerCBG is 3 and if the number of CRC-failed CBGs 210 (e.g., NACKed CBGs 210 that were unsuccessfully decoded) is less than or equal to K=4 (i.e., {1, 2, . . . , K}), it may be better to decrease the number of bits per MCS, numBitsPerCBG, to be less than K−1, otherwise sending the MCS using K bits may be more efficient and accurate than the compression (e.g., sending $CQI_{avg}$ and the differential MCS of each CBG 210). In such examples, K may denote or be referred to as the number of bits per CBG 210 for feedback of channel state information. Thus, in such examples, the devices may not compress using L<=2 if number of NACKed CBGs 210, n, is n≤4 (e.g., the devices may use L=1).

In some examples, the control signaling from the base station 105-a may indicate one or more valid quantities of bits per CBG 210 (e.g., L) based on a type of the channel metric, a type of the configuration, or both. For example, valid L values may not result in increasing a report size beyond a full resolution (e.g., K=5 for MCS and K=4 for CQI). If K+n*L>n*K, and n is the number of CBGs 210, then sending with full resolution (e.g., a metric for each CBG 210) may be used rather than compression/differential reporting. In some examples, the devices may be configured or pre-configured with a set of valid L values for a quantity of CBGs 210 to report (e.g., NACKed CBGs 210 or total CBGs 210) and for a full resolution K. In some examples, if an invalid value of L is used, than compression may be canceled and the devices may use full resolution. In some examples, the base station 105-a may configure the UE to use or switch between the valid values of L (e.g., via control signaling). In some examples, the MCS per CBG 210 computation may be realized based on log likelihood rations (LLR), based on demodulation reference signals (DMRSs), or both, among other examples.

In some examples, the base station 105-a may use per CBG 210 based metrics (e.g., MCS, CQI, CSI). In such examples, the base station 105-a may determine the transport block size for NACKed CBGs 210 based on CBG HARQ-ACK feedback. Additionally or alternatively, the base station 105-a may determine a common modulation order and code rate for retransmitted CBGs 210 based on MCS feedback per CBG 210 along with an average MCS. Additionally or alternatively, the base station 105-a may determine time frequency resource allocation for the retransmissions and schedule the retransmissions of the CBGs 210 based on the determined common MCS for the retransmitted CBGs 210. In some examples, the UE 115-a may be signaled such information or otherwise perform similar operations.

In some examples, the average MCS may be sent with a full accuracy (e.g., K=4 bits for CQI as a metric and K=5 bits for MCS as a metric). In some examples, a device may send 1 bit of the 4 or 5 bits in the first stage and then send 3 or 4 bits, respectively. Such examples may keep a full accuracy and send the 3 or 4 bits of HARQ-ACK feedback in the first stage. In some examples, a lower resolution for K may be used.

Figure 3:
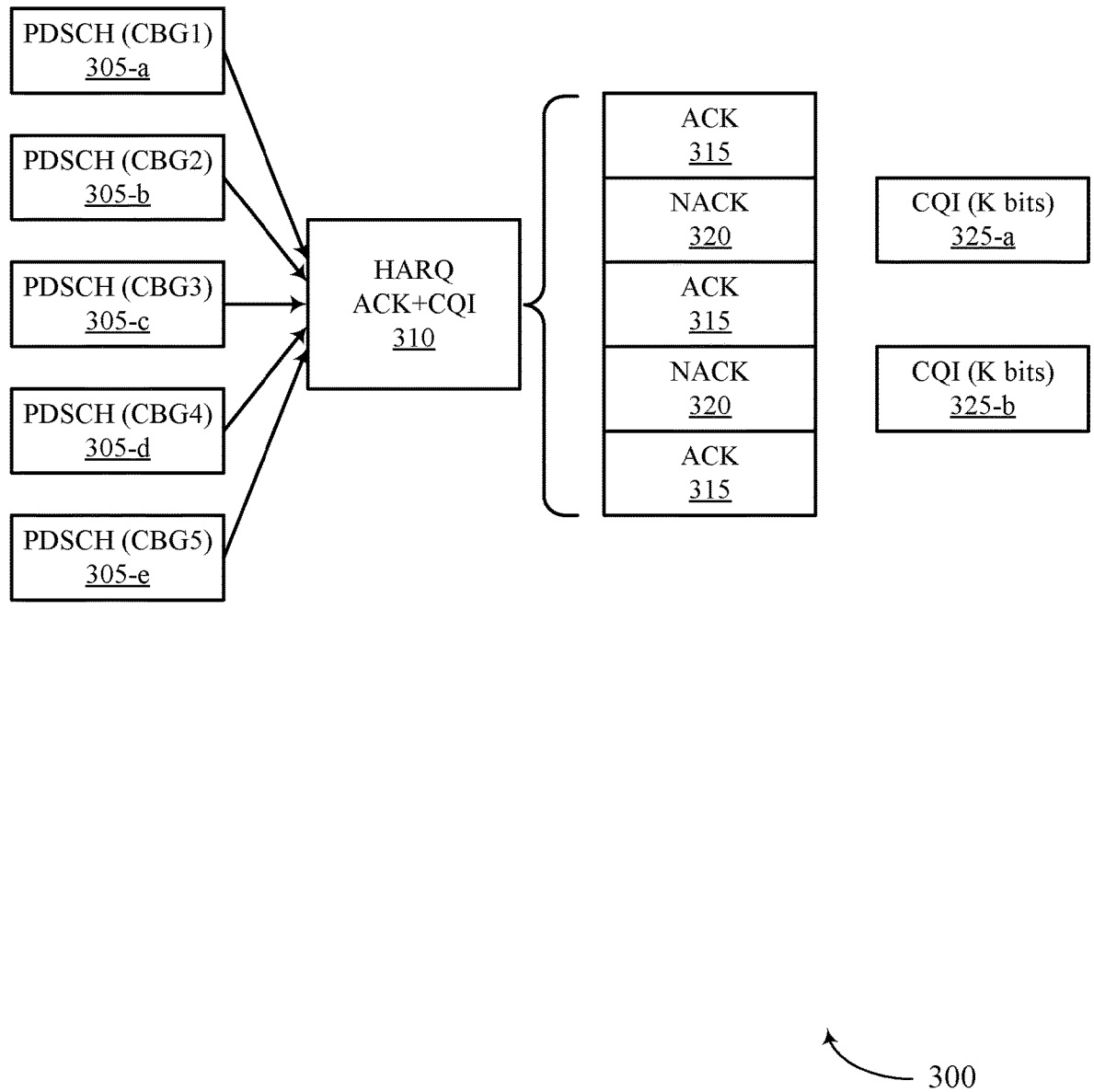
FIG. 3 illustrates an example of a channel quality information (CQI) reporting configuration that supports channel state information reporting of code block group based transport blocks in accordance with aspects of the present disclosure.

FIG. 3 illustrates an example of a CQI feedback configuration 300 that supports channel state information reporting of code block group based transport blocks in accordance with aspects of the present disclosure. In some examples, the CQI feedback configuration 300 may implement aspects of wireless communications system 100 or 200. The CQI feedback configuration 300 may include UE 115-a and base station 105-a, which may be respective examples of a UE 115 and a base station 105 described with reference to FIG. 2.

As described with reference to FIG. 2, a base station 105 may transmit a transport block with one or more PDSCH CBGs 305 to a UE 115. For example, the transport block may include 5 CBGs 305, including CBG 305-a, 305-b, 305-c, 305-d, and 305-e. The UE 115 may attempt to decode each CBG 305 of the transport block and determine which CBGs 305 were successfully decoded or unsuccessfully decoded.

The UE 115 may transmit HARQ ACK and CQI feedback 310 to the base station 105. In the example of the CQI feedback configuration 300, the UE 115 may transmit individual CQI feedback for each unsuccessfully decoded CBG 305. For example, the UE 115 may determine that CBG 305-b and CBG 305-d were unsuccessfully received. Therefore, the UE 115 may indicate an ACK 315 for CBGs 305-a, 305-c, and CBG 305-e and a NACK 320 for CBGs 305-b and CBG 305-d.

The UE 115 may determine CQI for the unsuccessfully decoded CBGs 305. For example, The UE may determine CQI 325-a for CBG 305-b and CQI 325-b for CBG 305-d. Each CQI 325 may include K bits. For example, CQI 325-a may include K bits and CQI 325-b may include K bits. The CQI 325 may correspond to a value on a CQI-to-efficiency table, where the UE 115 maps a spectral efficiency for the unsuccessfully decoded CBG 305 to a corresponding index on the table. The UE 115 may then report this index to the base station 105 with the HARQ ACK feedback. For example, K may be 4 bits. Therefore, the UE 115 may use 8 bits to report the CQI feedback for both unsuccessfully decoded CBGs 305. A UE 115 described herein may, in some cases, implement the technique of per-CBG CQI reporting. A UE 115 described herein may also implement techniques of differential CQI reporting to reduce overhead for CQI reporting, described in more detail herein, for example, with reference to FIG. 5.

In some examples of the PDSCH messages described herein, the UE 115 may receive a downlink grant indicating resources for a PDSCH transmission, a duration between the grant and the PDSCH transmission (e.g., K0), or both. The grant may additionally or alternatively indicate resources for a physical uplink control channel (PUCCH) transmission, a duration between the grant and the PUCCH transmission (e.g., K1), or both. In some examples, the CSI report (or other report indicating metrics of a channel as described herein) may be included in the PUCCH message with HARQ-ACK information. In some other examples, the CSI report (or other report indicating metrics of a channel as described herein) may be included in a different PUCCH message on the same or different time-frequency resources. In either case, the wireless communications system described herein may support aperiodic CSI reporting based on PDSCH decoding (e.g., for reduced latency and increased reliability).

In some examples of the configurations shown in FIGS. 3-6, the reporting scheme may include two stage uplink control information. For example, the first stage includes the HARQ-ACK codebook (e.g., ACKs 315 and NACKs 320) and the second stage may include a channel metric (e.g., MCS or CQI including 2*K bits in the second stage uplink control information).

Figure 4:
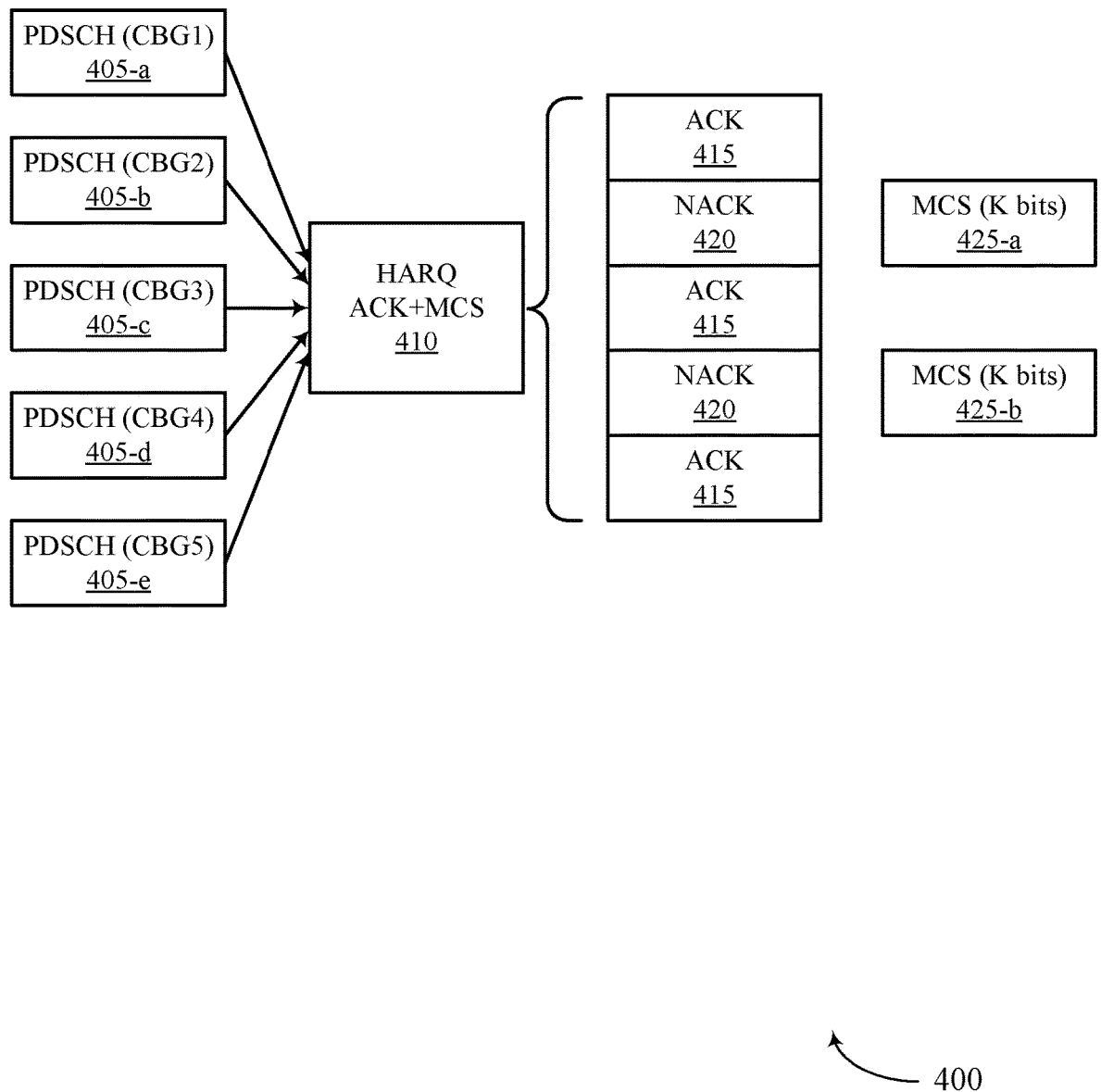
FIG. 4 illustrates an example of a modulation and coding scheme (MCS) reporting configuration that supports channel state information reporting of code block group based transport blocks in accordance with aspects of the present disclosure.

FIG. 4 illustrates an example of a MCS feedback configuration 400 that supports channel state information reporting of code block group based transport blocks in accordance with aspects of the present disclosure. In some examples, the MCS feedback configuration 400 may implement aspects of wireless communications system 100 or 200. The MCS feedback configuration 400 may include UE 115-a and base station 105-a, which may be respective examples of a UE 115 and a base station 105 described with reference to FIG. 2.

As described with reference to FIG. 2, a base station 105 may transmit a transport block with one or more PDSCH CBGs 405 to a UE 115. For example, the transport block may include 5 CBGs 405, including CBG 405-a, 405-b, 405-c, 405-d, and 405-e. The UE 115 may attempt to decode each CBG 405 of the transport block and determine which CBGs 405 were successfully decoded or unsuccessfully decoded.

The UE 115 may transmit HARQ ACK and MCS feedback 410 to the base station 105. In the example of the MCS feedback configuration 400, the UE 115 may transmit individual MCS feedback for each unsuccessfully decoded CBG 405. For example, the UE 115 may determine that CBG 405-b and CBG 405-d were unsuccessfully received. Therefore, the UE 115 may indicate an ACK 415 for CBGs 405-a, 405-c, and CBG 405-e and a NACK 420 for CBGs 405-b and CBG 405-d.

The UE 115 may determine MCS for the unsuccessfully decoded CBGs 405. For example, The UE may determine MCS 425-a for CBG 405-b and MCS 425-b for CBG 405-d. Each MCS 425 may include K bits. For example, MCS 425-a may include K bits and MCS 425-b may include K bits. The MCS 425 may correspond to a value on an MCS-to-efficiency table, where the UE 115 maps a spectral efficiency for the unsuccessfully decoded CBG 405 to a corresponding index on the table. The UE 115 may then report this index to the base station 105 with the HARQ ACK feedback. For example, K may be 5 bits. Therefore, the UE 115 may use 10 bits to report the MCS feedback for both unsuccessfully decoded CBGs 405. A UE 115 described herein may, in some cases, implement the technique of per-CBG MCS reporting. A UE 115 described herein may also implement techniques of differential MCS reporting to reduce overhead for MCS reporting, described in more detail herein, for example, with reference to FIG. 6.

Figure 5:
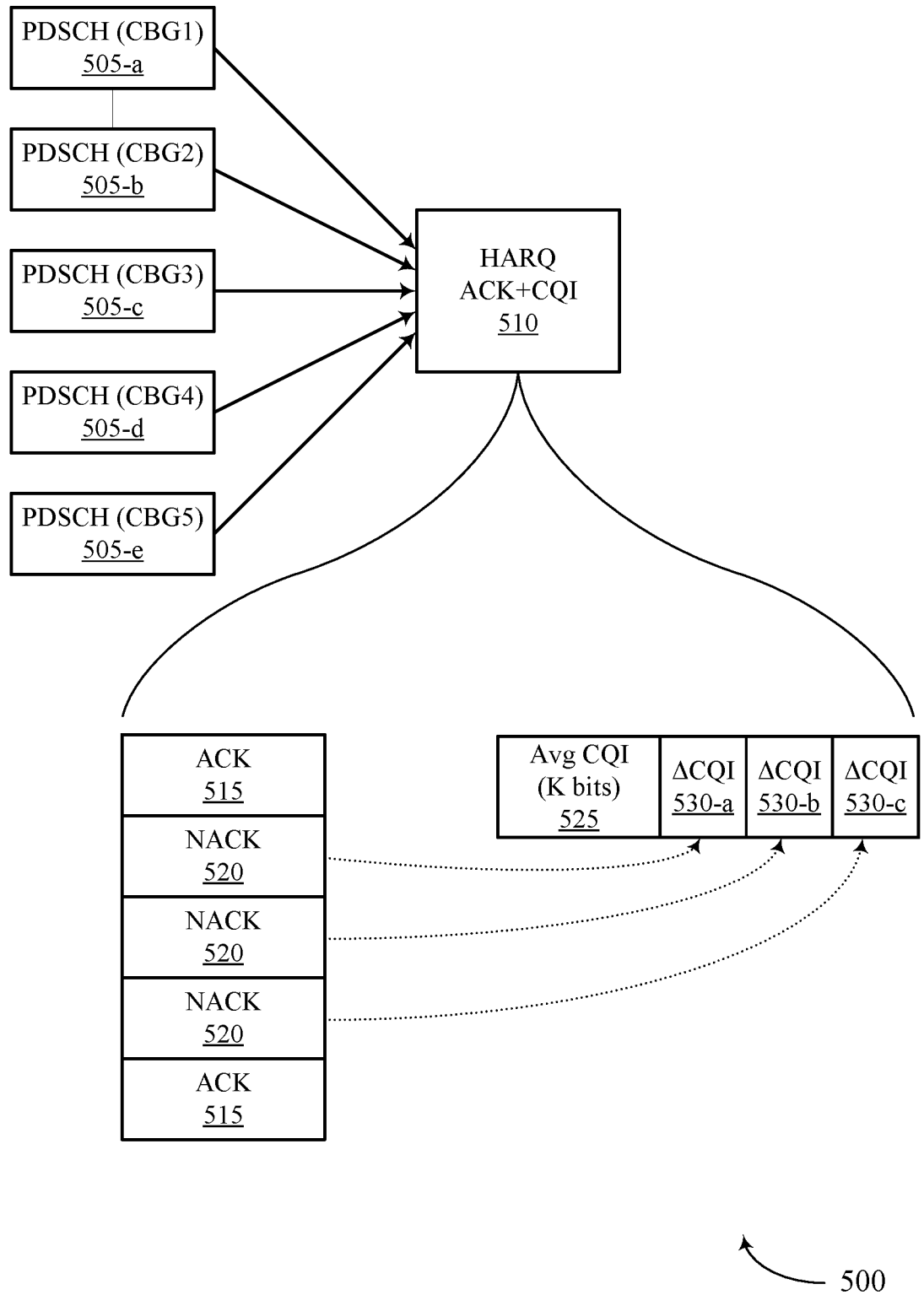
FIG. 5 illustrates an example of a differential CQI reporting configuration that supports channel state information reporting of code block group based transport blocks in accordance with aspects of the present disclosure.

FIG. 5 illustrates an example of a differential CQI reporting configuration 500 that supports channel state information reporting of code block group based transport blocks in accordance with aspects of the present disclosure. In some examples, the differential CQI reporting configuration 500 may implement or may be implemented by aspects of wireless communications system 100 or 200.

As described with reference to FIG. 2, a base station 105 may transmit a transport block with one or more PDSCH CBGs 505 to a UE 115. For example, the transport block may include 5 CBGs 505, including CBG 505-a, 505-b, 505-c, 505-d, and 505-e. The UE 115 may attempt to decode each CBG 505 of the transport block and determine which CBGs 505 were successfully decoded or unsuccessfully decoded.

The UE 115 may transmit HARQ ACK and differential CQI feedback 510 to the base station 105. For example, the UE 115 may determine that CBG 505-*b*, CBG 505-*c*, and CBG 505-*d* were unsuccessfully decoded. Therefore, the UE 115 may indicate an ACK 515 for CBGs 505-*a* and CBG 505-*e* and a NACK 520 for CBGs 505-*b*, CBG 505-*c*, and CBG 505-*d*. In the example of the differential CQI reporting configuration 500, the UE 115 may transmit an average CQI 525 and a differential CQI 530 for each unsuccessfully decoded CBG 505.

The UE 115 may determine CQI for the CBGs 505. In some cases, the UE 115 may determine the average CQI 525 by averaging the CQIs of the one or more unsuccessfully decoded CBGs 505. In some example, the UE 115 may determine the average CQI 525 by averaging the CQIs of all of the CBGs 505. The UE 115 may determine a differential CQI 530 by taking a difference between a CQI of a CBG 505 and the average CQI 525. In some cases, the average CQI 525 may include K bits. For example, the average CQI 525 may include the same number of bits as a CQI for an individual CQI described with reference to FIG. 3.

The differential CQI 530 may, in some examples, be mapped to a differential values table. For example, the differential values table may be an example of a differential values table 705, 710, or 715 described with reference to FIG. 7. Each differential values table may correspond to a different number of bits reported to the base station 105 for the differential CQI 530. For example, the UE 115 may use 1 bit, 2 bits, or 3 bits to report each differential CQI 530.

The CQI reporting for the HARQ ACK and CQI feedback 510 may in some cases include fewer bits than individual CQI reporting. For example, the average CQI 525 and differential CQIs 530 may use K+n*numBitsPerCBG bits, where numBitsPerCBG corresponds to a number of bits associated with a used differential values table. If K is 4 bits, and the differential values tables correspond to 1, 2, and 3 bits, then the CQI feedback reporting may be 7, 10, or 13 bits long. Individual CQI reporting may use 12 bits. The UE 115 may use either a 1-bit table or a 2-bit table to report the differential CQI feedback, which may save 5 bits or 2 bits, respectively, while still supporting an ultra-reliable retransmission for the unsuccessfully decoded CBGs 505.

Figure 6:
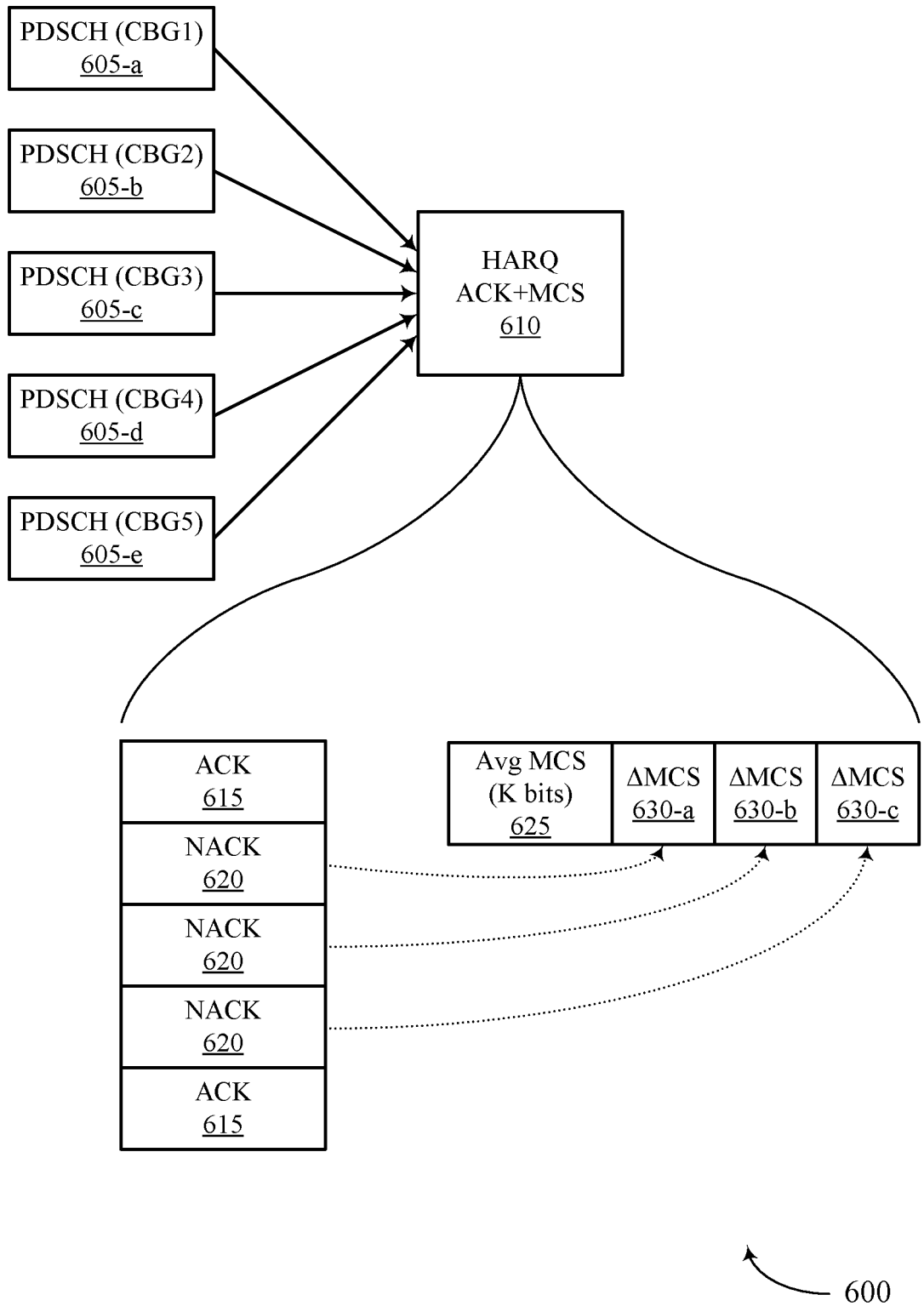
FIG. 6 illustrates an example of a differential MCS reporting configuration that supports channel state information reporting of code block group based transport blocks in accordance with aspects of the present disclosure.

FIG. 6 illustrates an example of a differential MCS reporting configuration 600 that supports channel state information reporting of code block group based transport blocks in accordance with aspects of the present disclosure. In some examples, the differential MCS reporting configuration 600 may implement or may be implemented by aspects of wireless communications system 100 or 200.

As described with reference to FIG. 2, a base station 105 may transmit a transport block with one or more PDSCH CBGs 605 to a UE 115. For example, the transport block may include 5 CBGs 605, including CBG 605-*a*, 605-*b*, 605-*c*, 605-*d*, and 605-*e*. The UE 115 may attempt to decode each CBG 605 of the transport block and determine which CBGs 605 were successfully decoded or unsuccessfully decoded.

The UE 115 may transmit HARQ ACK and differential MCS feedback 610 to the base station 105. For example, the UE 115 may determine that CBG 605-*b*, CBG 605-*c*, and CBG 605-*d* were unsuccessfully decoded. Therefore, the UE 115 may indicate an ACK 515 for CBGs 605-*a* and CBG 605-*e* and a NACK 620 for CBGs 605-*b*, CBG 605-*c*, and CBG 605-*d*. In the example of the differential MCS reporting configuration 600, the UE 115 may transmit an average MCS 625 and a differential MCS 630 for each unsuccessfully decoded CBG 605.

The UE 115 may determine MCSs for the CBGs 605. In some cases, the UE 115 may determine the average CQI by averaging the MCSs of the one or more unsuccessfully decoded CBGs 605. In some example, the UE 115 may determine the average MCS 625 by averaging the MCSs of all of the CBGs 605. The UE 115 may determine a differential MCS 630 by taking a difference between a MCS of a CBG 605 and the average MCS 625. In some cases, the average MCS 625 may include K bits. For example, the average MCS 625 may include the same number of bits as an MCS for an individual MCS described with reference to FIG. 4.

The differential MCS 630 may, in some examples, be mapped to a differential values table. For example, the differential values table may be an example of a differential values table 805, 810, or 815 described with reference to FIG. 8. Each differential values table may correspond to a different number of bits reported to the base station 105 for the differential MCS 630. For example, the UE 115 may use 1 bit, 2 bits, 3 bits, or 4 bits to report each differential MCS 630.

The MCS reporting for the HARQ ACK and MCS feedback 610 may in some cases include fewer bits than individual MCS reporting. For example, the average MCS 625 and differential MCS 630 may use K+n*numBitsPerCBG bits, where numBitsPerCBG corresponds to a number of bits associated with a used differential values table. If K is 4 bits, and the differential values tables correspond to 1, 2, 3, and 4 bits, then the MCS feedback reporting may be 7, 10, 13, or 16 bits long. Individual MCS reporting may use 16 bits. The UE 115 may use either a 1-bit table, a 2-bit table, or a 3-bit table to report the differential MCS feedback, which may save 9 bits, 6 bits, or 3 bits, respectively, while still supporting an ultra-reliable retransmission for the unsuccessfully decoded CBGs 605. If the UE is restricted to a 4-bit table, differential MCS feedback would not save any bits, and the UE may elect to use individual MCS reporting to achieve full resolution.

FIG. 7 illustrates an example of differential CQI value tables 700 that support channel state information reporting of code block group based transport blocks in accordance with aspects of the present disclosure. In some examples, the differential CQI value tables 700 may implement or may be implemented by aspects of wireless communications system 100 or 200.

A base station 105 may transmit a transport block with one or more PDSCH CBGs to a UE 115. The UE 115 may attempt to decode each CBG of the transport block and determine which CBGs were successfully decoded or unsuccessfully decoded. The UE 115 may transmit HARQ ACK and differential CQI feedback to the base station. The UE 115 may indicate an ACK successfully decoded CBGs and a NACK for unsuccessfully decoded CBGs. The UE 115 may also transmit differential CQI feedback, including an average CQI and a differential CQI for unsuccessfully decoded CBGs.

The UE 115 may determine CQI for the CBGs and determine the average CQI by averaging the CQIs of the CBGs. In some example, the UE 115 may determine the average CQI by averaging the CQIs of all of the CBGs, or the UE 115 may determine the average CQI by averaging the CQIs of all of the unsuccessfully decoded CBGs. UE 115 may determine a differential CQI by taking a difference between a CQI of a CBG and the average CQI. In some cases, a CQI for a CBG and the average CQI may each include K bits.

The differential CQI may be mapped to one of the differential CQI value tables 700. The UE 115 may be configured with one or more differential values tables, such as a one-bit table 705, a two-bit table 710, and a three-bit table 715. In some cases, the UE 115 may take the difference of the CQI index of the average CQI and the CQI index of the CBG to determine a CQI offset 725. In some cases, the CQI offset 725 may be an integer value which may be mapped to a differential CQI 720 using one of the differential CQI value tables 700.

In some cases, the UE 115 may be configured to use the one-bit table 705. If, for example, a differential CQI offset 725 for a CBG is less than or equal to 0, the corresponding differential CQI 720 for the CBG may be '0'. If the differential CQI offset 725 for the CBG is greater than or equal to 1, the differential CQI 720 for the CBG may be '1'. Therefore, by setting a bit in the feedback corresponding to the differential CQI 720 for the CBG to '0', the UE 115 may indicate that the CQI index for the CBG was either the same as the average CQI or less than the average CQI. Setting the bit to '1' may indicate that the CQI index for the CBG was at least 1 greater than the CQI index for the average CQI.

The 2-bit differential table 710 and the 3-bit differential table 715 may provide greater granularity than the 1-bit differential table 705. However, these tables may use more bits, which may increase overhead. The UE 115 may be indicated which table to use via RRC signaling, a MAC CE, or DCI. In some cases, if the indicated table does not use fewer bits than individual CQI feedback for the CBGs, the UE 115 may use a smaller table.

In an example, K may be 4 bits. Therefore, the average CQI may be 4 bits, and an individual CQI may be 4 bits. A UE 115 may be configured with three tables, including the 1-bit table 705, the 2-bit table 710, and the 3-bit table 715. In some cases, the possible bit lengths, L, for a differential CQI for a CBG may be L={1,2,3}. The UE 115 may determine that 3 CBGs were unsuccessfully decoded, such that n=3. In this example, the total number of feedback bits for CBG-based CQI feedback, K+3L, may be {7, 10, 13} for the three tables, instead of 3K=12 for individual CQI without compression. Therefore, L=1 may save 5 bits, and L=2 may save 2 bits. In some cases, if L is indicated to be 3, the UE 115 may instead use a default table, such as the 1-bit table 705 or the 2-bit table 710. The default table may be configured or indicated to the UE 115 by the base station 105. When the base station 105 receives the HARQ ACK feedback indicating the ACKs and NACKs, the base station 105 may determine that the UE 115 used the default table instead of the indicated table to compress the reporting overhead. If the UE is restricted to a 3-bit table, differential CQI feedback would not save any bits, and the UE may elect to use individual CQI reporting to achieve full resolution.

In another example, K may be 4 bits, the UE 115 may be configured with same three tables, and the UE 115 may determine that 6 CBGs were unsuccessfully decoded. In this example, the total number of feedback bits for differential CBG-based CQI feedback, K+6L, may be {10, 16, 22}, instead of 6K=24 for individual CQI without compression. Therefore, L=1 may save 14 bits, and L=2 may save 8 bits, and L=3 may save 2 bits.

Figure 8:
FIG. 8 illustrates an example of differential MCS tables that support channel state information reporting of code block group based transport blocks in accordance with aspects of the present disclosure.

FIG. 8 illustrates an example of differential MCS value tables 800 that support channel state information reporting of code block group based transport blocks in accordance with aspects of the present disclosure. In some examples, the differential MCS value tables 800 may implement or may be implemented by aspects of wireless communications system 100 or 200.

A base station 105 may transmit a transport block with one or more PDSCH CBGs to a UE 115. The UE 115 may attempt to decode each CBG of the transport block and determine which CBGs were successfully decoded or unsuccessfully decoded. The UE 115 may transmit HARQ ACK and differential MCS feedback to the base station. The UE 115 may indicate an ACK successfully decoded CBGs and a NACK for unsuccessfully decoded CBGs. The UE 115 may also transmit differential MCS feedback, including an average MCS and a differential MCS for unsuccessfully decoded CBGs.

The UE 115 may determine CQI for the CBGs and determine the average CQI by averaging the MCSs of the CBGs. In some example, the UE 115 may determine the average MCS by averaging the MCSs of all of the CBGs, or the UE 115 may determine the average MCS by averaging the MCSs of all of the unsuccessfully decoded CBGs. UE 115 may determine a differential MCS by taking a difference between an MCS of a CBG and the average MCS. In some cases, a MCS for a CBG and the average MCS may each include K bits.

The differential MCS may be mapped to one of the differential MCS value tables 800. The UE 115 may be configured with one or more differential values tables, such as a one-bit table 805, a two-bit table 810, and a three-bit table 815. In some cases, the UE 115 may take the difference of the MCS index of the average MCS and the MCS index of the CBG to determine a MCS offset 825. In some cases, the MCS offset 925 may be an integer value which may be mapped to a differential MCS using one of the differential MCS value tables 800.

In some cases, the UE 115 may be configured to use the one-bit table 805. If, for example, a differential MCS offset 825 for a CBG is less than or equal to 0, the corresponding differential MCS 820 for the CBG may be '0'. If the differential MCS offset 825 for the CBG is greater than or equal to 1, the differential MCS 820 for the CBG may be '1'. Therefore, by setting a bit in the feedback corresponding to the differential MCS 820 for the CBG to '0', the UE 115 may indicate that the MCS index for the CBG was either the same as the average MCS or less than the average MCS. Setting the bit to '1' may indicate that the MCS index for the CBG was at least 1 greater than the MCS index for the average MCS.

The 2-bit differential table 810 and the 3-bit differential table 815 may provide greater granularity than the 1-bit differential table 805. However, these tables may use more bits, which may increase overhead. The UE 115 may be indicated which table to use via RRC signaling, a MAC CE, or DCI. In some cases, if the indicated table does not use fewer bits than individual MCS feedback for the CBGs, the UE 115 may use a smaller table.

In an example, K may be 5 bits. Therefore, the average MCS may be 5 bits, and an individual MCS may be 5 bits. A UE 115 may be configured with four tables, including the 1-bit table 805, the 2-bit table 810, the 3-bit table 815, and the 4-bit table 830. In some cases, the possible bit lengths, L, for a differential MCS for a CBG may be L={1,2,3,4}. The UE 115 may determine that 3 CBGs were unsuccessfully decoded, such that n=3. In this example, the total number of feedback bits for CBG-based MCS feedback, K+3L, may be {8, 11, 14, 17} for the four tables, instead of 3K=15 for individual MCS without compression. Therefore, L=1 may save 7 bits, L=2 may save 4 bits, and L=3 may save 1 bit. In some cases, if L is indicated to be 4, the UE 115 may instead use a default table, such as the 1-bit table 805, the 2-bit table 810, or the 3-bit table 815. The default table may be configured or indicated to the UE 115 by the base station 105. When the base station 105 receives the HARQ ACK feedback indicating the ACKs and NACKs, the base station 105 may determine that the UE 115 used the default table instead of the indicated table to compress the reporting overhead.

In another example, K may be 5 bits, the UE 115 may be configured with same three tables, and the UE 115 may determine that 6 CBGs were unsuccessfully decoded. In this example, the total number of feedback bits for differential CBG-based MCS feedback, K+6L, may be {11, 17, 23, 29}, instead of 6K=30 for individual MCS without compression. Therefore, L=1 may save 19 bits, L=2 may save 13 bits, and L=3 may save 7 bits. If the UE is restricted to a 4-bit table, differential MCS feedback would not save any bits, and the UE may elect to use individual MCS reporting to achieve full resolution.

In some examples, the tables, schemes, and configurations described herein may include various metrics, values, and information for illustrative clarity, but it is to be understood that any type or quantity of metrics, values, information, and the like may be used.

Figure 9:
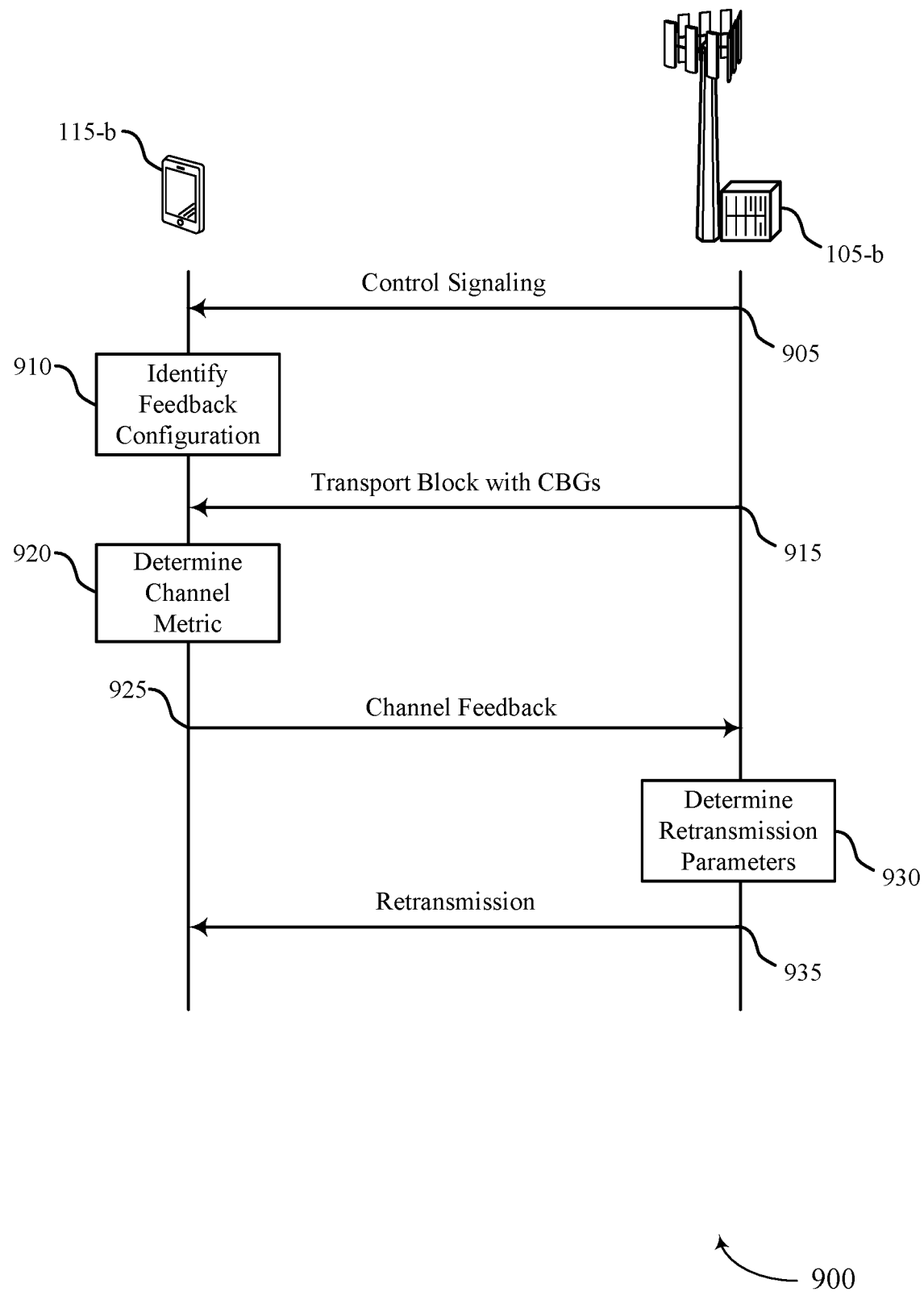
FIG. 9 illustrates an example of a process flow that supports channel state information reporting of code block group based transport blocks in accordance with aspects of the present disclosure.

FIG. 9 illustrates an example of a process flow 900 that supports channel state information reporting of code block group based transport blocks in accordance with aspects of the present disclosure. In some examples, the process flow 900 may implement or may be implemented by aspects of wireless communications system 100 or 200. The process flow 900 may be performed by UE 115-*b* or base station 105-*b* or both, which may be respective examples of a UE 115 and a base station 105 described with reference to FIGS. 1 and 2.

At 905, base station 105-*b* may transmit control signaling to the UE 115-*b*. For example, the control signaling may include an indication of a feedback mode (e.g., a configuration for reporting channel metrics for transport blocks with multiple CBGs) to UE 115-*b*. The feedback mode may be, for example, a transport block-based feedback mode or a CBG-based feedback mode as described herein. At 910, UE 115-*b* may identify the feedback configuration based on the control signaling. For example, the UE 115-*b* may select, for communicating with base station 105-*b*, between the transport block-based feedback mode or the CBG-based feedback mode based on the indication, between absolute or differential metrics, between a type of metric, and the like, among other examples of parameters of the configuration.

At 915, base station 105-*b* may transmit a transport block to UE 115-*b*. For example, base station 105-*b* may transmit a set of multiple CBGs in the transport block to UE 115-*b*. UE 115-*b* may attempt to decode the CBGs and determine which CBGs were successfully decoded and which CBGs were unsuccessfully decoded.

In some cases, UE 115-*b* may implement one or more techniques for differential reporting for CBGs. For example, UE 115-*b* may determine an average channel metric for multiple CBGs of the set of CBGs. UE 115-*b* may determine channel metrics for each CBG of the set of CBG, and the average CBG may be determined based on averaging the determined channel metrics. In some cases, UE 115-*b* may determine the average channel metric based on metrics for unsuccessfully decoded CBGs. UE 115-*b* may determine, for each CBG of the multiple CBGs, a differential channel metric relative to the average channel metric. For example, for each unsuccessfully decoded CBG, UE 115-*b* may determine a differential channel metric based on the difference between the channel metric for an unsuccessfully decoded CBG and the average channel metric.

At 925, UE 15-*b* may transmit feedback to base station 105-*b*. In some cases, the feedback may be a HARQ ACK transmission and may include channel metric information. If UE 115-*b* is operating in the transport block-based feedback mode, the feedback may be for the entire transport block. If UE 115-*b* is operating in the CBG-based feedback mode, feedback may be for the unsuccessfully decoded CBGs. In some cases, the feedback may include individual channel metrics for the CBGs, or the feedback may include an average channel metric and differential channel metric.

For example, UE 115-*b* may report the average channel metric for the multiple CBGs and the differential value of the channel metric for each CBG of the multiple CBGs to base station 105-*b*. For example, the average channel metric and the differential value of the channel metric feedback for each CBG may be an example of the differential CQI feedback transmitted in the differential CQI feedback 510 described with reference to FIG. 5 or the differential MCS feedback transmitting in the channel metric feedback 610 described with reference to FIG. 6.

Base station 105-*b* may receive the feedback and determine a transport block size for a retransmission of the CBGs which correspond to a NACK in the HARQ ACK feedback. At 930, base station 105-*b* may determine one or more retransmission parameters for retransmitting the one or more unsuccessfully decoded CBGs based on the feedback. For example, base station 105-*b* may select an MCS, a code rate, a transmit beam, or a resource, or any combination thereof, for example, based on reported feedback. Base station 105-*b* may schedule UE 115-*b* for a resource for the retransmission and send the retransmission at 935 on the resource.

Figure 10:
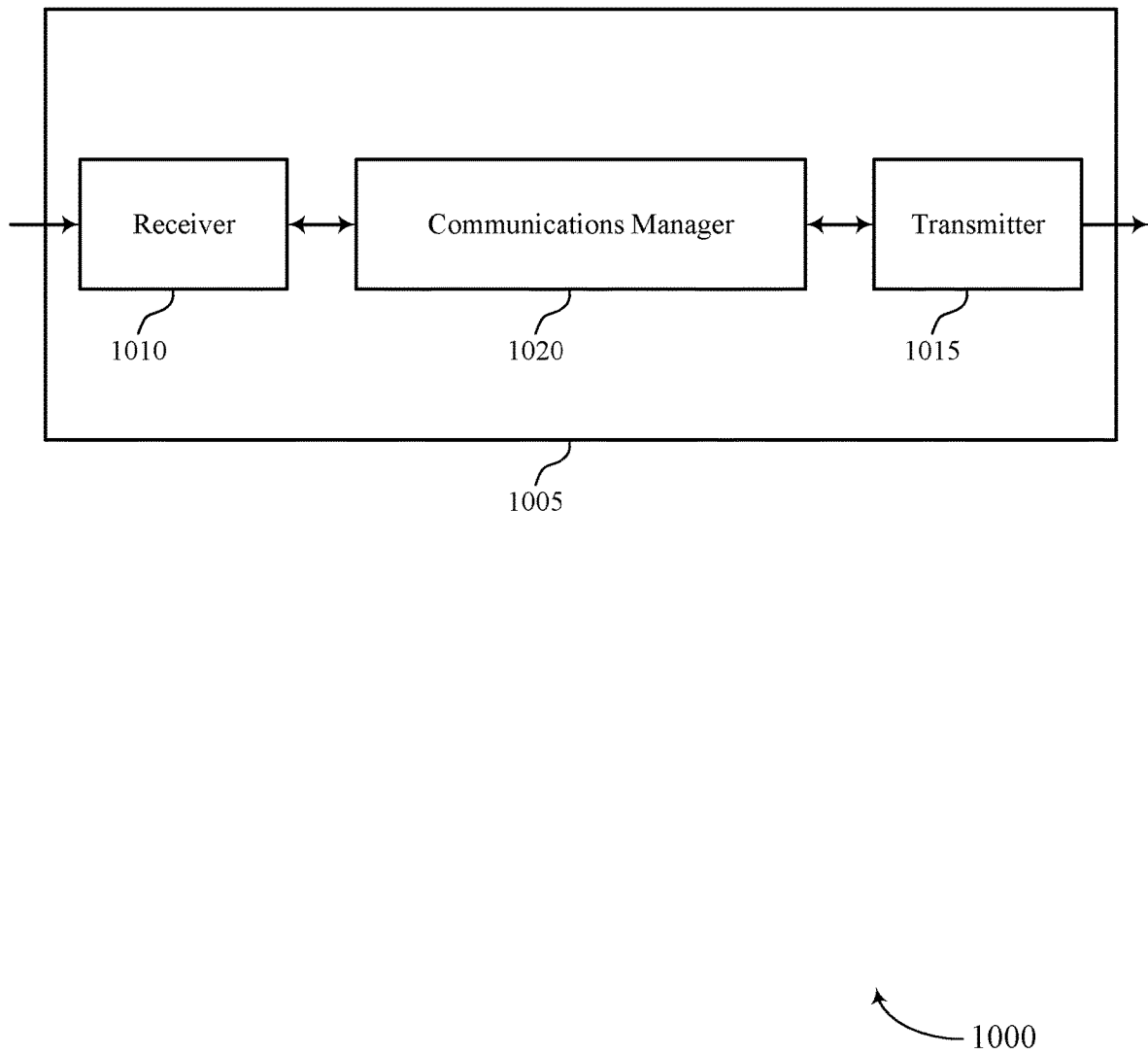
FIGS. 10 and 11 show block diagrams of devices that support channel state information reporting of code block group based transport blocks in accordance with aspects of the present disclosure.

FIG. 10 shows a block diagram 1000 of a device 1005 that supports channel state information reporting of code block group based transport blocks in accordance with aspects of the present disclosure. The device 1005 may be an example of aspects of a UE 115 as described herein. The device 1005 may include a receiver 1010, a transmitter 1015, and a communications manager 1020. The device 1005 may also include one or more processors, memory coupled with the one or more processors, and instructions stored in the memory that are executable by the one or more processors to enable the one or more processors to perform the channel state information reporting features discussed herein. Each of these components may be in communication with one another (e.g., via one or more buses).

The receiver 1010 may provide a means for receiving information such as packets, user data, control information, or any combination thereof associated with various information channels (e.g., control channels, data channels, information channels related to channel state information reporting of code block group based transport blocks). Information may be passed on to other components of the device 1005. The receiver 1010 may utilize a single antenna or a set of multiple antennas.

The transmitter 1015 may provide a means for transmitting signals generated by other components of the device 1005. For example, the transmitter 1015 may transmit information such as packets, user data, control information, or any combination thereof associated with various information channels (e.g., control channels, data channels, information channels related to channel state information reporting of code block group based transport blocks). In some examples, the transmitter 1015 may be co-located with a receiver 1010 in a transceiver module. The transmitter 1015 may utilize a single antenna or a set of multiple antennas.

The communications manager 1020, the receiver 1010, the transmitter 1015, or various combinations thereof or various components thereof may be examples of means for performing various aspects of channel state information reporting of code block group based transport blocks as described herein. For example, the communications manager 1020, the receiver 1010, the transmitter 1015, or various combinations or components thereof may support a method for performing one or more of the functions described herein.

In some examples, the communications manager 1020, the receiver 1010, the transmitter 1015, or various combinations or components thereof may be implemented in hardware (e.g., in communications management circuitry). The hardware may include a processor, a digital signal processor (DSP), an application-specific integrated circuit (ASIC), a field-programmable gate array (FPGA) or other programmable logic device, a discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally or alternatively, in some examples, the communications manager 1020, the receiver 1010, the transmitter 1015, or various combinations or components thereof may be implemented in code (e.g., as communications management software or firmware) executed by a processor. If implemented in code executed by a processor, the functions of the communications manager 1020, the receiver 1010, the transmitter 1015, or various combinations or components thereof may be performed by a general-purpose processor, a DSP, a central processing unit (CPU), an ASIC, an FPGA, or any combination of these or other programmable logic devices (e.g., configured as or otherwise supporting a means for performing the functions described in the present disclosure).

In some examples, the communications manager 1020 may be configured to perform various operations (e.g., receiving, monitoring, transmitting) using or otherwise in cooperation with the receiver 1010, the transmitter 1015, or both. For example, the communications manager 1020 may receive information from the receiver 1010, send information to the transmitter 1015, or be integrated in combination with the receiver 1010, the transmitter 1015, or both to receive information, transmit information, or perform various other operations as described herein.

The communications manager 1020 may support wireless communications at a UE in accordance with examples as disclosed herein. For example, the communications manager 1020 may be configured as or otherwise support a means for receiving, from a base station, control signaling identifying a configuration for reporting channel metrics for transport blocks that each include a set of multiple code block groups. The communications manager 1020 may be configured as or otherwise support a means for receiving a first transport block that includes a first set of multiple code block groups. The communications manager 1020 may be configured as or otherwise support a means for transmitting a report indicating a channel metric for one or more code block groups of the first set of multiple code block groups of the first transport block in accordance with the configuration for reporting channel metrics.

By including or configuring the communications manager 1020 in accordance with examples as described herein, the device 1005 (e.g., a processor controlling or otherwise coupled to the receiver 1010, the transmitter 1015, the communications manager 1020, or a combination thereof) may support techniques for channel state information reporting for transport blocks with multiple CBGs. Thus, the device 1005 may realize reduced signaling overhead, improved communications reliability, more efficient utilization of communication resources, or any combination thereof, among other benefits.

Figure 11:
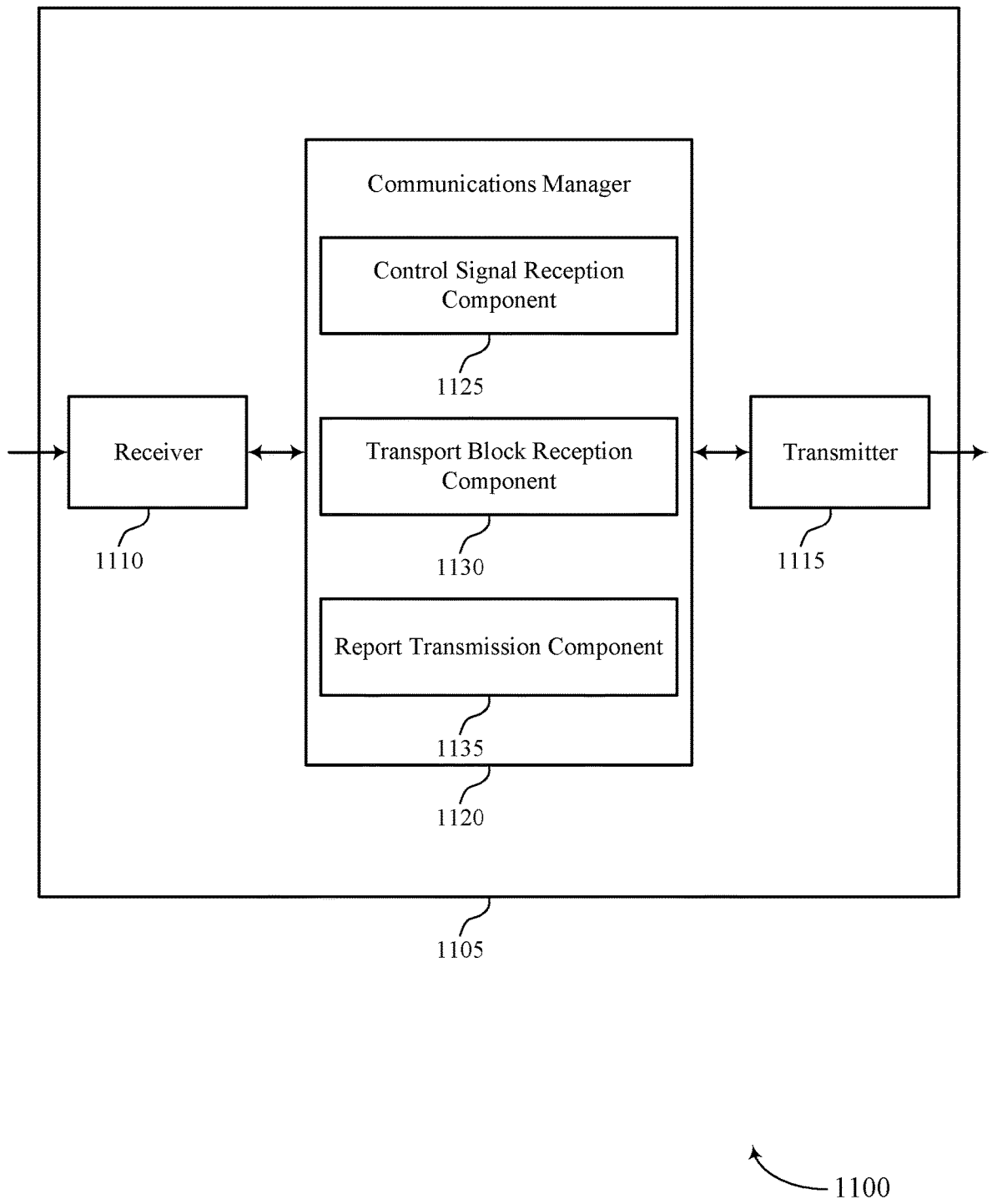

FIG. 11 shows a block diagram 1100 of a device 1105 that supports channel state information reporting of code block group based transport blocks in accordance with aspects of the present disclosure. The device 1105 may be an example of aspects of a device 1005 or a UE 115 as described herein. The device 1105 may include a receiver 1110, a transmitter 1115, and a communications manager 1120. The device 1105 may also include a processor. Each of these components may be in communication with one another (e.g., via one or more buses).

The receiver 1110 may provide a means for receiving information such as packets, user data, control information, or any combination thereof associated with various information channels (e.g., control channels, data channels, information channels related to channel state information reporting of code block group based transport blocks). Information may be passed on to other components of the device 1105. The receiver 1110 may utilize a single antenna or a set of multiple antennas.

The transmitter 1115 may provide a means for transmitting signals generated by other components of the device 1105. For example, the transmitter 1115 may transmit information such as packets, user data, control information, or any combination thereof associated with various information channels (e.g., control channels, data channels, information channels related to channel state information reporting of code block group based transport blocks). In some examples, the transmitter 1115 may be co-located with a receiver 1110 in a transceiver module. The transmitter 1115 may utilize a single antenna or a set of multiple antennas.

The device 1105, or various components thereof, may be an example of means for performing various aspects of channel state information reporting of code block group based transport blocks as described herein. For example, the communications manager 1120 may include a control signal reception component 1125, a transport block reception component 1130, a report transmission component 1135, or any combination thereof. The communications manager 1120 may be an example of aspects of a communications manager 1020 as described herein. In some examples, the communications manager 1120, or various components thereof, may be configured to perform various operations (e.g., receiving, monitoring, transmitting) using or otherwise in cooperation with the receiver 1110, the transmitter 1115, or both. For example, the communications manager 1120 may receive information from the receiver 1110, send information to the transmitter 1115, or be integrated in combination with the receiver 1110, the transmitter 1115, or both to receive information, transmit information, or perform various other operations as described herein.

The communications manager 1120 may support wireless communications at a UE in accordance with examples as disclosed herein. The control signal reception component 1125 may be configured as or otherwise support a means for receiving, from a base station, control signaling identifying a configuration for reporting channel metrics for transport blocks that each include a set of multiple code block groups. The transport block reception component 1130 may be configured as or otherwise support a means for receiving a first transport block that includes a first set of multiple code block groups. The report transmission component 1135 may be configured as or otherwise support a means for transmitting a report indicating a channel metric for one or more code block groups of the first set of multiple code block groups of the first transport block in accordance with the configuration for reporting channel metrics.

In some cases, the control signal reception component 1125, the transport block reception component 1130, and the report transmission component 1135 may each be or be at least a part of a processor (e.g., a transceiver processor, or a radio processor, or a transmitter processor, or a receiver processor). The processor may be coupled with memory and execute instructions stored in the memory that enable the processor to perform or facilitate the features of the control signal reception component 1125, transport block reception component 1130, and report transmission component 1135 discussed herein. A transceiver processor may be collocated with and/or communicate with (e.g., direct the operations of) a transceiver of the device. A radio processor may be collocated with and/or communicate with (e.g., direct the operations of) a radio (e.g., an NR radio, an LTE radio, a Wi-Fi radio) of the device. A transmitter processor may be collocated with and/or communicate with (e.g., direct the operations of) a transmitter of the device. A receiver processor may be collocated with and/or communicate with (e.g., direct the operations of) a receiver of the device.

Figure 12:
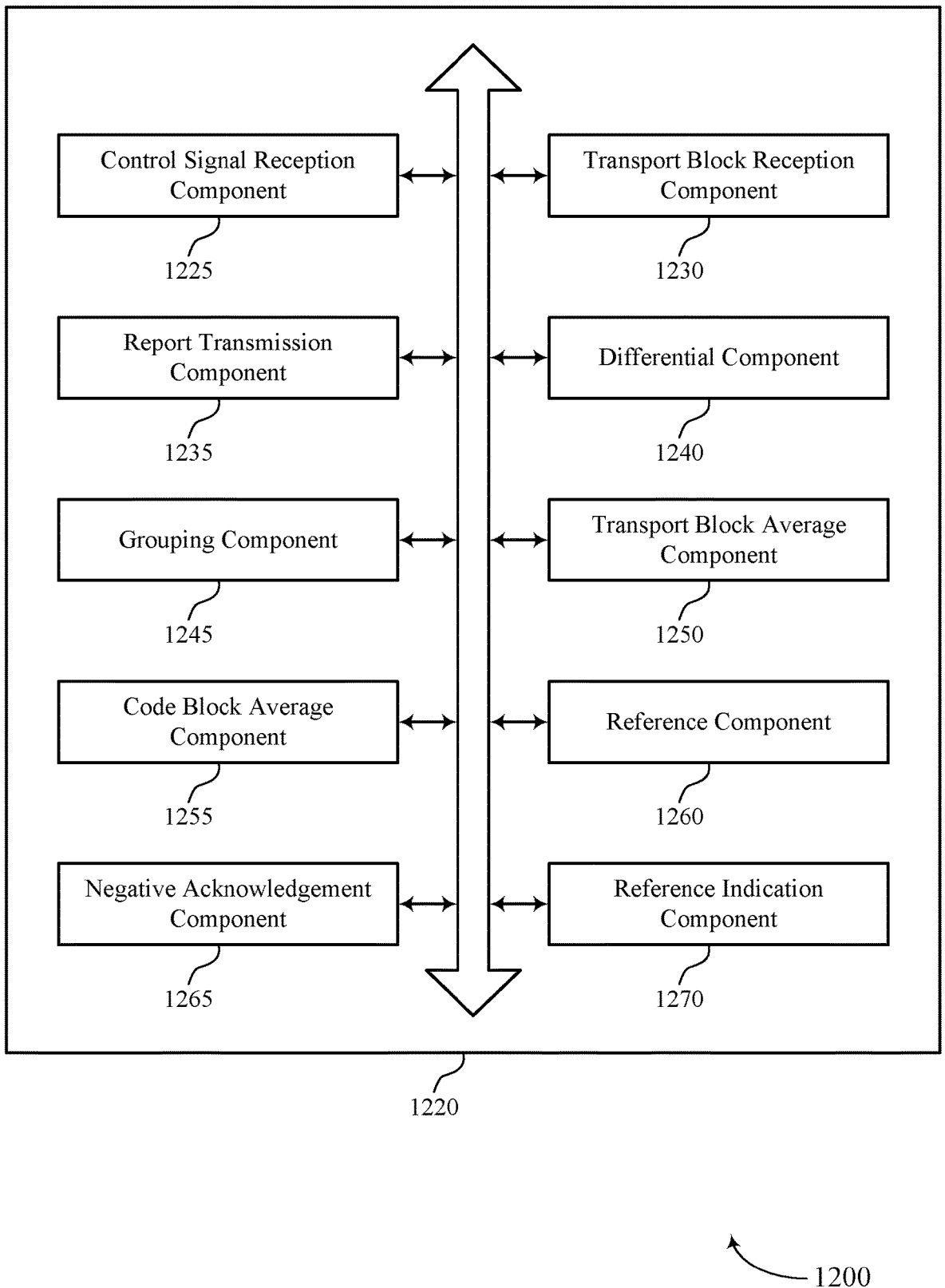
FIG. 12 shows a block diagram of a communications manager that supports channel state information reporting of code block group based transport blocks in accordance with aspects of the present disclosure.

FIG. 12 shows a block diagram 1200 of a communications manager 1220 that supports channel state information reporting of code block group based transport blocks in accordance with aspects of the present disclosure. The communications manager 1220 may be an example of aspects of a communications manager 1020, a communications manager 1120, or both, as described herein. The communications manager 1220, or various components thereof, may be an example of means for performing various aspects of channel state information reporting of code block group based transport blocks as described herein. For example, the communications manager 1220 may include a control signal reception component 1225, a transport block reception component 1230, a report transmission component 1235, a differential component 1240, a grouping component 1245, a transport block average component 1250, a code block average component 1255, a reference component 1260, a negative acknowledgement component 1265, a reference indication component 1270, or any combination thereof. Each of these components may communicate, directly or indirectly, with one another (e.g., via one or more buses).

The communications manager 1220 may support wireless communications at a UE in accordance with examples as disclosed herein. The control signal reception component 1225 may be configured as or otherwise support a means for receiving, from a base station, control signaling identifying a configuration for reporting channel metrics for transport blocks that each include a set of multiple code block groups. The transport block reception component 1230 may be configured as or otherwise support a means for receiving a first transport block that includes a first set of multiple code block groups. The report transmission component 1235 may be configured as or otherwise support a means for transmitting a report indicating a channel metric for one or more code block groups of the first set of multiple code block groups of the first transport block in accordance with the configuration for reporting channel metrics.

In some examples, to support receiving the control signaling identifying the configuration, the control signal reception component 1225 may be configured as or otherwise support a means for receiving the control signaling identifying the configuration, the configuration indicating for the UE to report a single value of the channel metric for the first transport block, the reporting indicating the single value of the channel metric for the first set of multiple code block groups of the first transport block.

In some examples, to support receiving the control signaling identifying the configuration, the control signal reception component 1225 may be configured as or otherwise support a means for receiving the control signaling identifying the configuration, the configuration indicating for the UE to report a value of channel metric for each code block group of the first set of multiple code block groups of the first transport block, the reporting indicating the value of the channel metric for each code block group of the first transport block.

In some examples, to support transmitting the report indicating the channel metric, the differential component 1240 may be configured as or otherwise support a means for transmitting the report, where the report includes a difference value between a reference channel metric and the channel metric associated with the one or more code block groups.

In some examples, to support transmitting the report indicating the channel metric, the grouping component 1245 may be configured as or otherwise support a means for transmitting the report, where the report includes the channel metric for each set of one or more sets of code block groups of the first set of multiple code block groups in accordance with the configuration.

In some examples, to support transmitting the report indicating the channel metric, the transport block average component 1250 may be configured as or otherwise support a means for transmitting the report, where the report includes an average metric for the first set of multiple code block groups, or a threshold metric for one code block group of the first set of multiple code block groups, or any combination thereof, where the threshold metric for the code block group is selected from a set of channel metrics based on the threshold metric satisfying a threshold value, each channel metric of the set of channel metrics corresponding to a respective code block group of the first set of multiple code block groups.

In some examples, to support transmitting the report indicating the channel metric, the code block average component 1255 may be configured as or otherwise support a means for transmitting the report, where the report includes an average metric for each code block group of the first set of multiple code block groups, or a threshold metric for one code block from each code block group of the first set of multiple code block groups, or any combination thereof, where the threshold metric for each code block group is selected from a set of channel metrics based on the threshold metric satisfying a threshold value, each channel metric of the set of channel metrics corresponding to a respective code block of a set of code blocks for each code block group of the first set of multiple code block groups.

In some examples, the reference component 1260 may be configured as or otherwise support a means for identifying a reference channel metric for determining a difference between the channel metric and the reference channel metric, where the reference channel metric includes a scheduled modulation and coding scheme, an average modulation and coding scheme associated with the first set of multiple code block groups, or a metric indicated by the control signaling.

In some examples, the reference indication component 1270 may be configured as or otherwise support a means for transmitting, to the base station, an indication of the identified reference channel metric.

In some examples, the reference channel metric includes a channel quality indicator. In some examples, the channel quality indicator is indicated by the control signaling, or the channel quality indicator is indicated by a mapping identified by the configuration that maps the scheduled modulation and coding scheme to the channel quality indicator.

In some examples, the control signaling includes a bitmap indicating the one or more code block groups associated with the channel metric, the one or more code block groups including code block groups associated with a negative acknowledgment or each of the first set of multiple code block groups.

In some examples, the negative acknowledgement component 1265 may be configured as or otherwise support a means for comparing a quantity of code block groups associated with negative acknowledgements to a threshold, where the report indicates the channel metric corresponding to the first transport block or a set of channel metrics corresponding to each code block group of the first set of multiple code block groups based on whether the quantity of code block groups associated with the negative acknowledgements satisfies the threshold.

In some examples, the control signaling indicates one or more valid quantities of bits per code block group of the first set of multiple code block groups based on a type of the channel metric, a type of the configuration, or both.

In some examples, the channel metric includes a modulation and coding scheme for the first transport block, a channel quality indicator for the first transport block, a set of modulation and coding schemes each of which is associated with a respective code block group of the first set of multiple code block groups, a set of channel quality indicators each of which is associated with a respective code block group of the first set of multiple code block groups, or any combination thereof.

In some cases, the control signal reception component 1225, the transport block reception component 1230, the report transmission component 1235, the differential component 1240, the grouping component 1245, the transport block average component 1250, the code block average component 1255, the reference component 1260, the negative acknowledgement component 1265, and the reference indication component 1270 may each be or be at least a part of a processor (e.g., a transceiver processor, or a radio processor, or a transmitter processor, or a receiver processor). The processor may be coupled with memory and execute instructions stored in the memory that enable the processor to perform or facilitate the features of the control signal reception component 1225, the transport block reception component 1230, the report transmission component 1235, the differential component 1240, the grouping component 1245, the transport block average component 1250, the code block average component 1255, the reference component 1260, the negative acknowledgement component 1265, and the reference indication component 1270 discussed herein.

Figure 13:
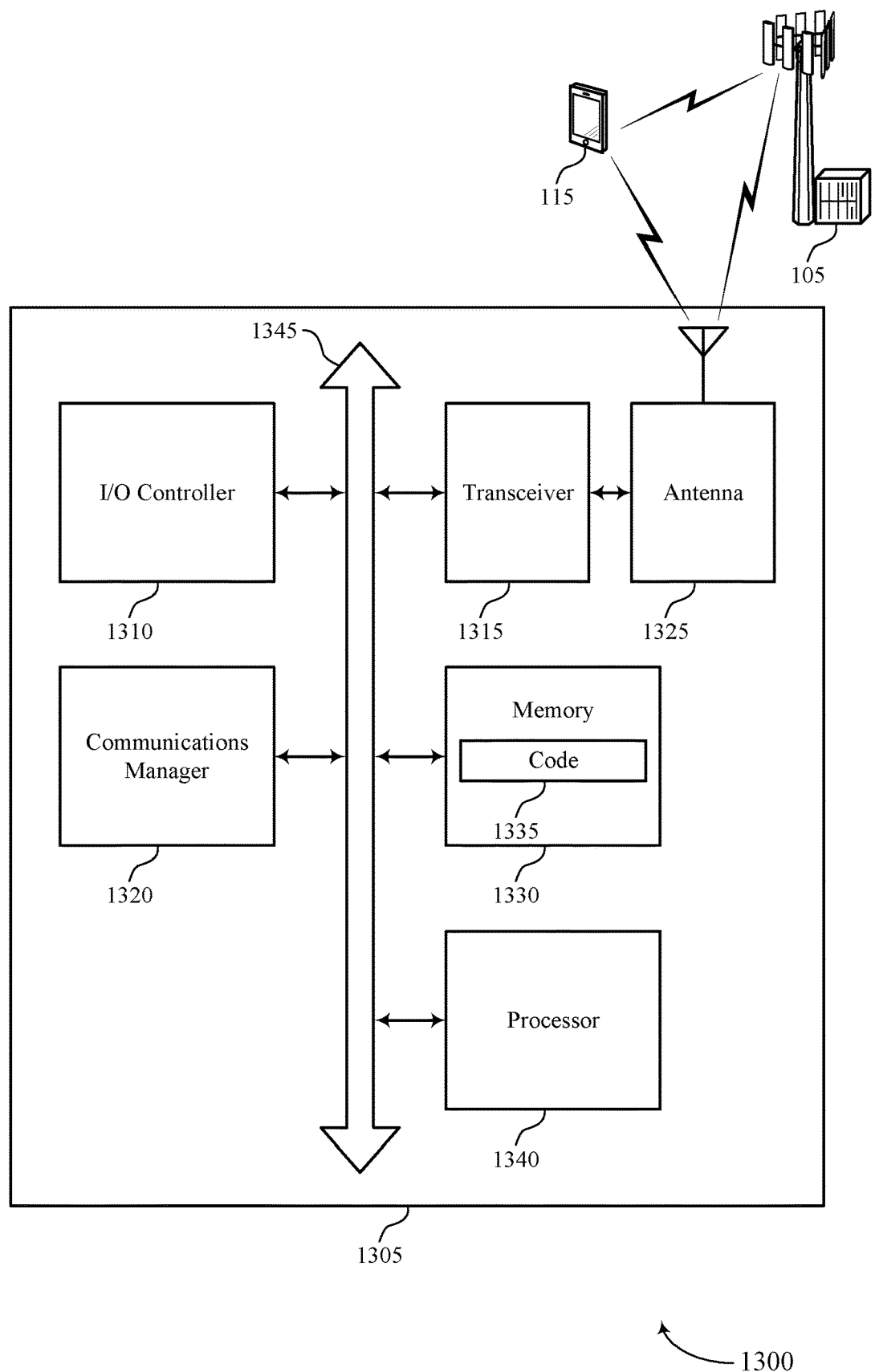
FIG. 13 shows a diagram of a system including a device that supports channel state information reporting of code block group based transport blocks in accordance with aspects of the present disclosure.

FIG. 13 shows a diagram of a system 1300 including a device 1305 that supports channel state information reporting of code block group based transport blocks in accordance with aspects of the present disclosure. The device 1305 may be an example of or include the components of a device 1005, a device 1105, or a UE 115 as described herein. The device 1305 may communicate wirelessly with one or more base stations 105, UEs 115, or any combination thereof. The device 1305 may include components for bi-directional voice and data communications including components for transmitting and receiving communications, such as a communications manager 1320, an input/output (I/O) controller 1310, a transceiver 1315, an antenna 1325, a memory 1330, code 1335, and a processor 1340. These components may be in electronic communication or otherwise coupled (e.g., operatively, communicatively, functionally, electronically, electrically) via one or more buses (e.g., a bus 1345).

The I/O controller 1310 may manage input and output signals for the device 1305. The I/O controller 1310 may also manage peripherals not integrated into the device 1305. In some cases, the I/O controller 1310 may represent a physical connection or port to an external peripheral. In some cases, the I/O controller 1310 may utilize an operating system such as iOS®, ANDROID®, MS-DOS®, MS-WINDOWS®, OS/2®, UNIX®, LINUX®, or another known operating system. Additionally or alternatively, the I/O controller 1310 may represent or interact with a modem, a keyboard, a mouse, a touchscreen, or a similar device. In some cases, the I/O controller 1310 may be implemented as part of a processor, such as the processor 1340. In some cases, a user may interact with the device 1305 via the I/O controller 1310 or via hardware components controlled by the I/O controller 1310.

In some cases, the device 1305 may include a single antenna 1325. However, in some other cases, the device 1305 may have more than one antenna 1325, which may be capable of concurrently transmitting or receiving multiple wireless transmissions. The transceiver 1315 may communicate bi-directionally, via the one or more antennas 1325, wired, or wireless links as described herein. For example, the transceiver 1315 may represent a wireless transceiver and may communicate bi-directionally with another wireless transceiver. The transceiver 1315 may also include a modem to modulate the packets, to provide the modulated packets to one or more antennas 1325 for transmission, and to demodulate packets received from the one or more antennas 1325. The transceiver 1315, or the transceiver 1315 and one or more antennas 1325, may be an example of a transmitter 1015, a transmitter 1115, a receiver 1010, a receiver 1110, or any combination thereof or component thereof, as described herein.

The memory 1330 may include random access memory (RAM) and read-only memory (ROM). The memory 1330 may store computer-readable, computer-executable code 1335 including instructions that, when executed by the processor 1340, cause the device 1305 to perform various functions described herein. The code 1335 may be stored in a non-transitory computer-readable medium such as system memory or another type of memory. In some cases, the code 1335 may not be directly executable by the processor 1340 but may cause a computer (e.g., when compiled and executed) to perform functions described herein. In some cases, the memory 1330 may contain, among other things, a basic I/O system (BIOS) which may control basic hardware or software operation such as the interaction with peripheral components or devices.

The processor 1340 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1340 may be configured to operate a memory array using a memory controller. In some other cases, a memory controller may be integrated into the processor 1340. The processor 1340 may be configured to execute computer-readable instructions stored in a memory (e.g., the memory 1330) to cause the device 1305 to perform various functions (e.g., functions or tasks supporting channel state information reporting of code block group based transport blocks). For example, the device 1305 or a component of the device 1305 may include a processor 1340 and memory 1330 coupled to the processor 1340, the processor 1340 and memory 1330 configured to perform various functions described herein.

The communications manager 1320 may support wireless communications at a UE in accordance with examples as disclosed herein. For example, the communications manager 1320 may be configured as or otherwise support a means for receiving, from a base station, control signaling identifying a configuration for reporting channel metrics for transport blocks that each include a set of multiple code block groups. The communications manager 1320 may be configured as or otherwise support a means for receiving a first transport block that includes a first set of multiple code block groups. The communications manager 1320 may be configured as or otherwise support a means for transmitting a report indicating a channel metric for one or more code block groups of the first set of multiple code block groups of the first transport block in accordance with the configuration for reporting channel metrics.

By including or configuring the communications manager 1320 in accordance with examples as described herein, the device 1305 may support techniques for channel state information reporting for transport blocks with multiple CBGs. Thus, the device 1305 may realize reduced signaling overhead, improved communications reliability, more efficient utilization of communication resources, or any combination thereof, among other benefits.

In some examples, the communications manager 1320 may be configured to perform various operations (e.g., receiving, monitoring, transmitting) using or otherwise in cooperation with the transceiver 1315, the one or more antennas 1325, or any combination thereof. Although the communications manager 1320 is illustrated as a separate component, in some examples, one or more functions described with reference to the communications manager 1320 may be supported by or performed by the processor 1340, the memory 1330, the code 1335, or any combination thereof. For example, the code 1335 may include instructions executable by the processor 1340 to cause the device 1305 to perform various aspects of channel state information reporting of code block group based transport blocks as described herein, or the processor 1340 and the memory 1330 may be otherwise configured to perform or support such operations.

Figure 14:
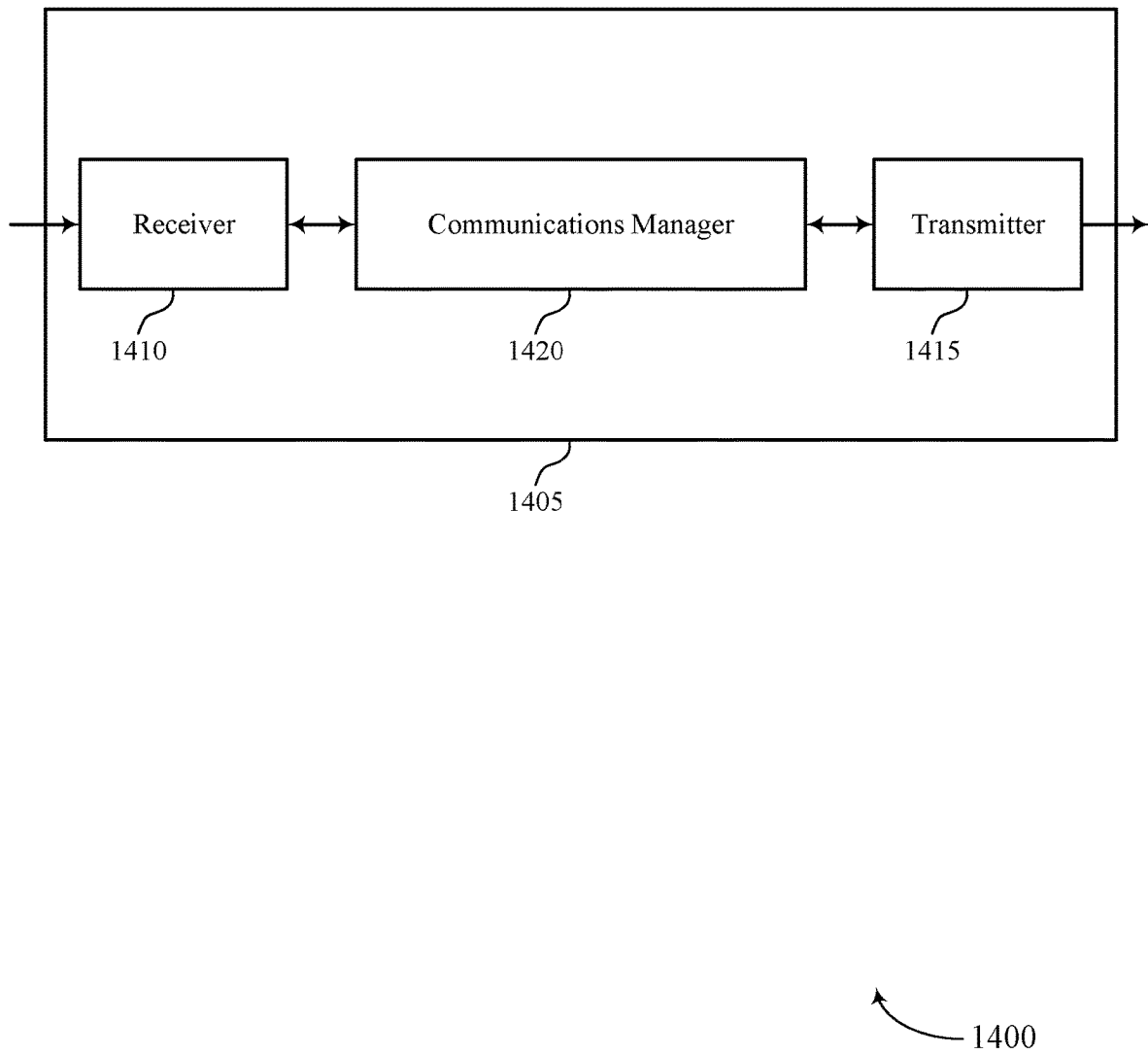
FIGS. 14 and 15 show block diagrams of devices that support channel state information reporting of code block group based transport blocks in accordance with aspects of the present disclosure.

FIG. 14 shows a block diagram 1400 of a device 1405 that supports channel state information reporting of code block group based transport blocks in accordance with aspects of the present disclosure. The device 1405 may be an example of aspects of a base station 105 as described herein. The device 1405 may include a receiver 1410, a transmitter 1415, and a communications manager 1420. The device 1405 may also include a processor. Each of these components may be in communication with one another (e.g., via one or more buses).

The receiver 1410 may provide a means for receiving information such as packets, user data, control information, or any combination thereof associated with various information channels (e.g., control channels, data channels, information channels related to channel state information reporting of code block group based transport blocks). Information may be passed on to other components of the device 1405. The receiver 1410 may utilize a single antenna or a set of multiple antennas.

The transmitter 1415 may provide a means for transmitting signals generated by other components of the device 1405. For example, the transmitter 1415 may transmit information such as packets, user data, control information, or any combination thereof associated with various information channels (e.g., control channels, data channels, information channels related to channel state information reporting of code block group based transport blocks). In some examples, the transmitter 1415 may be co-located with a receiver 1410 in a transceiver module. The transmitter 1415 may utilize a single antenna or a set of multiple antennas.

The communications manager 1420, the receiver 1410, the transmitter 1415, or various combinations thereof or various components thereof may be examples of means for performing various aspects of channel state information reporting of code block group based transport blocks as described herein. For example, the communications manager 1420, the receiver 1410, the transmitter 1415, or various combinations or components thereof may support a method for performing one or more of the functions described herein.

In some examples, the communications manager 1420, the receiver 1410, the transmitter 1415, or various combinations or components thereof may be implemented in hardware (e.g., in communications management circuitry). The hardware may include a processor, a DSP, an ASIC, an FPGA or other programmable logic device, a discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally or alternatively, in some examples, the communications manager 1420, the receiver 1410, the transmitter 1415, or various combinations or components thereof may be implemented in code (e.g., as communications management software or firmware) executed by a processor. If implemented in code executed by a processor, the functions of the communications manager 1420, the receiver 1410, the transmitter 1415, or various combinations or components thereof may be performed by a general-purpose processor, a DSP, a CPU, an ASIC, an FPGA, or any combination of these or other programmable logic devices (e.g., configured as or otherwise supporting a means for performing the functions described in the present disclosure).

In some examples, the communications manager 1420 may be configured to perform various operations (e.g., receiving, monitoring, transmitting) using or otherwise in cooperation with the receiver 1410, the transmitter 1415, or both. For example, the communications manager 1420 may receive information from the receiver 1410, send information to the transmitter 1415, or be integrated in combination with the receiver 1410, the transmitter 1415, or both to receive information, transmit information, or perform various other operations as described herein.

The communications manager 1420 may support wireless communications at a base station in accordance with examples as disclosed herein. For example, the communications manager 1420 may be configured as or otherwise support a means for transmitting, to a UE, control signaling identifying a configuration for reporting channel metrics for transport blocks that each include a set of multiple code block groups. The communications manager 1420 may be configured as or otherwise support a means for transmitting a first transport block that includes a first set of multiple code block groups. The communications manager 1420 may be configured as or otherwise support a means for receiving a report indicating a channel metric for one or more code block groups of the first set of multiple code block groups of the first transport block in accordance with the configuration for reporting channel metrics.

By including or configuring the communications manager 1420 in accordance with examples as described herein, the device 1405 (e.g., a processor controlling or otherwise coupled to the receiver 1410, the transmitter 1415, the communications manager 1420, or a combination thereof) may support techniques for channel state information reporting for transport blocks with multiple CBGs. Thus, the device 1405 may realize reduced signaling overhead, improved communications reliability, more efficient utilization of communication resources, or any combination thereof, among other benefits.

Figure 15:
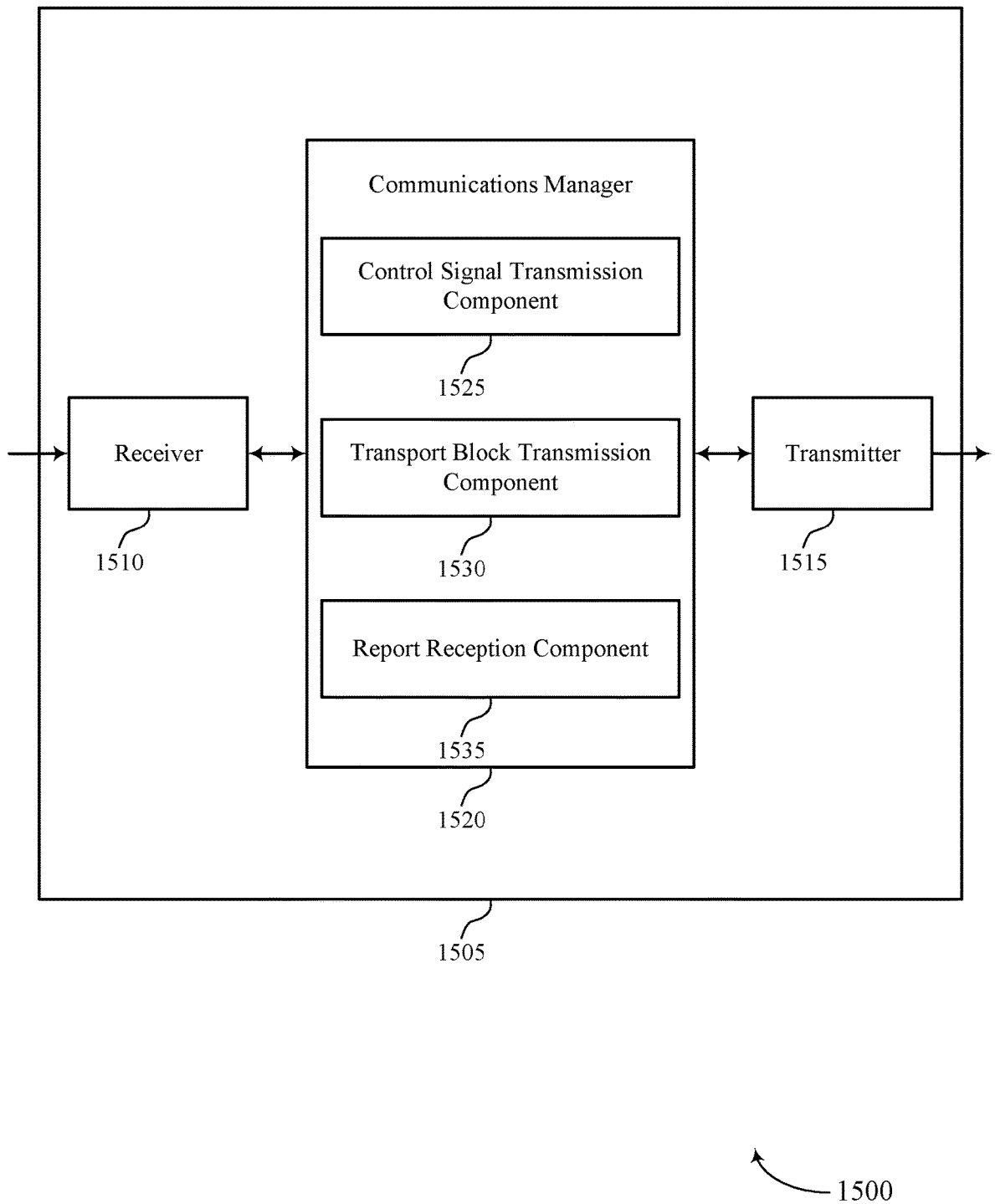

FIG. 15 shows a block diagram 1500 of a device 1505 that supports channel state information reporting of code block group based transport blocks in accordance with aspects of the present disclosure. The device 1505 may be an example of aspects of a device 1405 or a base station 105 as described herein. The device 1505 may include a receiver 1510, a transmitter 1515, and a communications manager 1520. The device 1505 may also include a processor. Each of these components may be in communication with one another (e.g., via one or more buses).

The receiver 1510 may provide a means for receiving information such as packets, user data, control information, or any combination thereof associated with various information channels (e.g., control channels, data channels, information channels related to channel state information reporting of code block group based transport blocks). Information may be passed on to other components of the device 1505. The receiver 1510 may utilize a single antenna or a set of multiple antennas.

The transmitter 1515 may provide a means for transmitting signals generated by other components of the device 1505. For example, the transmitter 1515 may transmit information such as packets, user data, control information, or any combination thereof associated with various information channels (e.g., control channels, data channels, information channels related to channel state information reporting of code block group based transport blocks). In some examples, the transmitter 1515 may be co-located with a receiver 1510 in a transceiver module. The transmitter 1515 may utilize a single antenna or a set of multiple antennas.

The device 1505, or various components thereof, may be an example of means for performing various aspects of channel state information reporting of code block group based transport blocks as described herein. For example, the communications manager 1520 may include a control signal transmission component 1525, a transport block transmission component 1530, a report reception component 1535, or any combination thereof. The communications manager 1520 may be an example of aspects of a communications manager 1420 as described herein. In some examples, the communications manager 1520, or various components thereof, may be configured to perform various operations (e.g., receiving, monitoring, transmitting) using or otherwise in cooperation with the receiver 1510, the transmitter 1515, or both. For example, the communications manager 1520 may receive information from the receiver 1510, send information to the transmitter 1515, or be integrated in combination with the receiver 1510, the transmitter 1515, or both to receive information, transmit information, or perform various other operations as described herein.

The communications manager 1520 may support wireless communications at a base station in accordance with examples as disclosed herein. The control signal transmission component 1525 may be configured as or otherwise support a means for transmitting, to a UE, control signaling identifying a configuration for reporting channel metrics for transport blocks that each include a set of multiple code block groups. The transport block transmission component 1530 may be configured as or otherwise support a means for transmitting a first transport block that includes a first set of multiple code block groups. The report reception component 1535 may be configured as or otherwise support a means for receiving a report indicating a channel metric for one or more code block groups of the first set of multiple code block groups of the first transport block in accordance with the configuration for reporting channel metrics.

Figure 16:
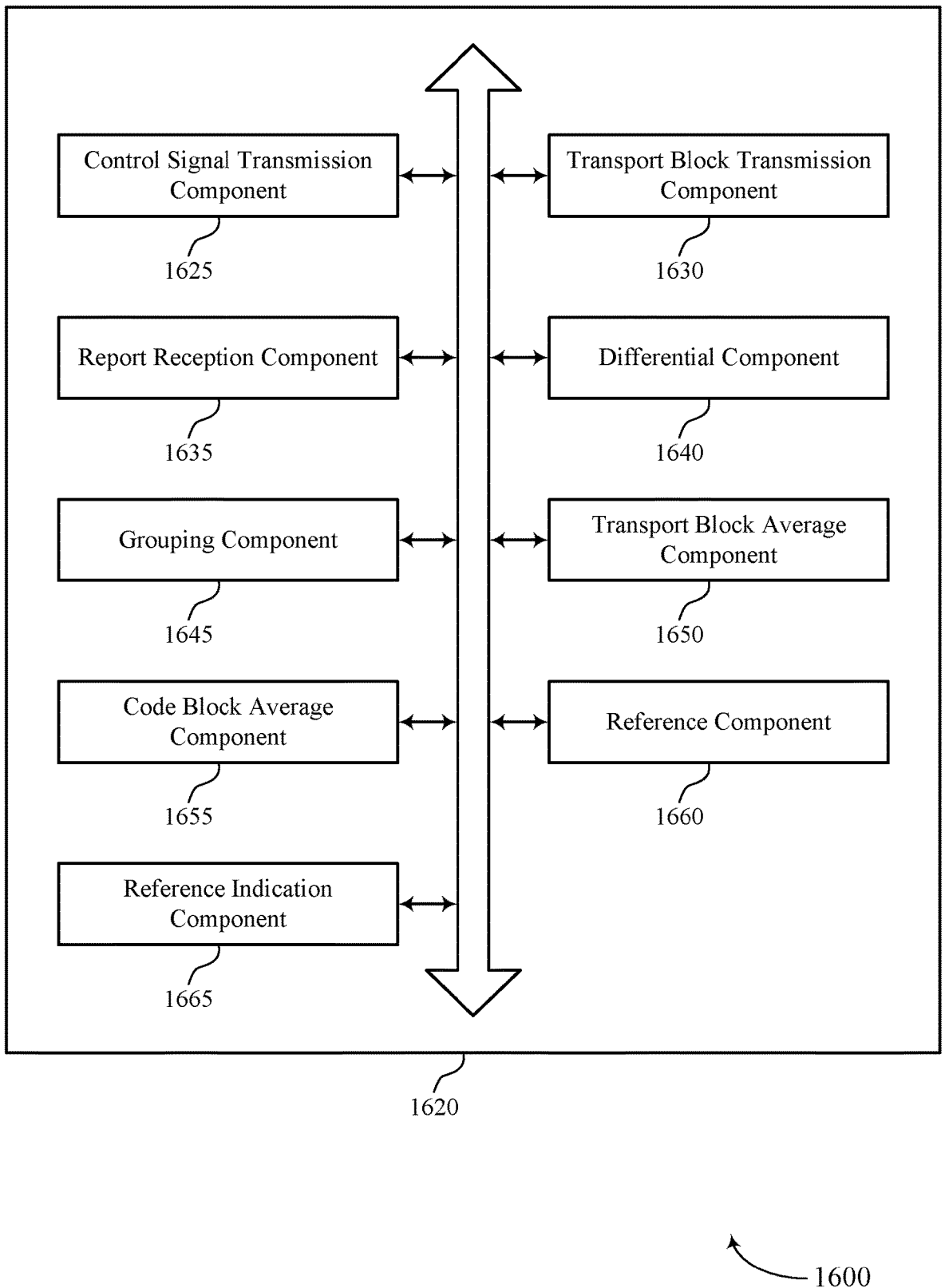
FIG. 16 shows a block diagram of a communications manager that supports channel state information reporting of code block group based transport blocks in accordance with aspects of the present disclosure.

FIG. 16 shows a block diagram 1600 of a communications manager 1620 that supports channel state information reporting of code block group based transport blocks in accordance with aspects of the present disclosure. The communications manager 1620 may be an example of aspects of a communications manager 1420, a communications manager 1520, or both, as described herein. The communications manager 1620, or various components thereof, may be an example of means for performing various aspects of channel state information reporting of code block group based transport blocks as described herein. For example, the communications manager 1620 may include a control signal transmission component 1625, a transport block transmission component 1630, a report reception component 1635, a differential component 1640, a grouping component 1645, a transport block average component 1650, a code block average component 1655, a reference component 1660, a reference indication component 1665, or any combination thereof. Each of these components may communicate, directly or indirectly, with one another (e.g., via one or more buses).

The communications manager 1620 may support wireless communications at a base station in accordance with examples as disclosed herein. The control signal transmission component 1625 may be configured as or otherwise support a means for transmitting, to a UE, control signaling identifying a configuration for reporting channel metrics for transport blocks that each include a set of multiple code block groups. The transport block transmission component 1630 may be configured as or otherwise support a means for transmitting a first transport block that includes a first set of multiple code block groups. The report reception component 1635 may be configured as or otherwise support a means for receiving a report indicating a channel metric for one or more code block groups of the first set of multiple code block groups of the first transport block in accordance with the configuration for reporting channel metrics.

In some examples, to support transmitting the control signaling identifying the configuration, the control signal transmission component 1625 may be configured as or otherwise support a means for transmitting the control signaling identifying the configuration, the configuration indicating for the UE to report a single value of the channel metric for the first transport block, the reporting indicating the single value of the channel metric for the first set of multiple code block groups of the first transport block.

In some examples, to support transmitting the control signaling identifying the configuration, the control signal transmission component 1625 may be configured as or otherwise support a means for transmitting the control signaling identifying the configuration, the configuration indicating for the UE to report a value of channel metric for each code block group of the first set of multiple code block groups of the first transport block, the reporting indicating the value of the channel metric for each code block group of the first transport block.

In some examples, to support receiving the report indicating the channel metric, the differential component 1640 may be configured as or otherwise support a means for receiving the report, where the report includes a difference value between a reference channel metric and the channel metric associated with the one or more code block groups.

In some examples, to support receiving the report indicating the channel metric, the grouping component 1645 may be configured as or otherwise support a means for receiving the report, where the report includes the channel metric for each set of one or more sets of code block groups of the first set of multiple code block groups in accordance with the configuration.

In some examples, to support receiving the report indicating the channel metric, the transport block average component 1650 may be configured as or otherwise support a means for receiving the report, where the channel metric includes an average metric for the first set of multiple code block groups, or a threshold metric for one code block group of the first set of multiple code block groups, or any combination thereof, where the threshold metric for the code block group is selected from a set of channel metrics based on the threshold metric satisfying a threshold value, each channel metric of the set of channel metrics corresponding to a respective code block group of the first set of multiple code block groups.

In some examples, to support receiving the report indicating the channel metric, the code block average component 1655 may be configured as or otherwise support a means for receiving the report, where the report includes an average metric for each code block group of the first set of multiple code block groups, or a threshold metric for one code block from each code block group of the first set of multiple code block groups, or any combination thereof, where the threshold metric for each code block group is selected from a set of channel metrics based on the threshold metric satisfying a threshold value, each channel metric of the set of channel metrics corresponding to a respective code block of a set of code blocks for each code block group of the first set of multiple code block groups.

In some examples, the reference component 1660 may be configured as or otherwise support a means for identifying a reference channel metric for determining the channel metric based on the report indicating a difference between the channel metric and the reference channel metric, where the reference channel metric includes a scheduled modulation and coding scheme, an average modulation and coding scheme associated with the first set of multiple code block groups, or a metric indicated by the control signaling.

In some examples, the reference indication component 1665 may be configured as or otherwise support a means for receiving, from the UE, an indication of the reference channel metric.

In some examples, the control signaling includes a bitmap indicating the one or more code block groups associated with the channel metric, the one or more code block groups including code block groups associated with a negative acknowledgment or each of the first set of multiple code block groups.

In some examples, the channel metric includes a modulation and coding scheme for the first transport block, a channel quality indicator for the first transport block, a set of modulation and coding schemes each of which is associated with a respective code block group of the first set of multiple code block groups, a set of channel quality indicators each of which is associated with a respective code block group of the first set of multiple code block groups, or any combination thereof.

Figure 17:
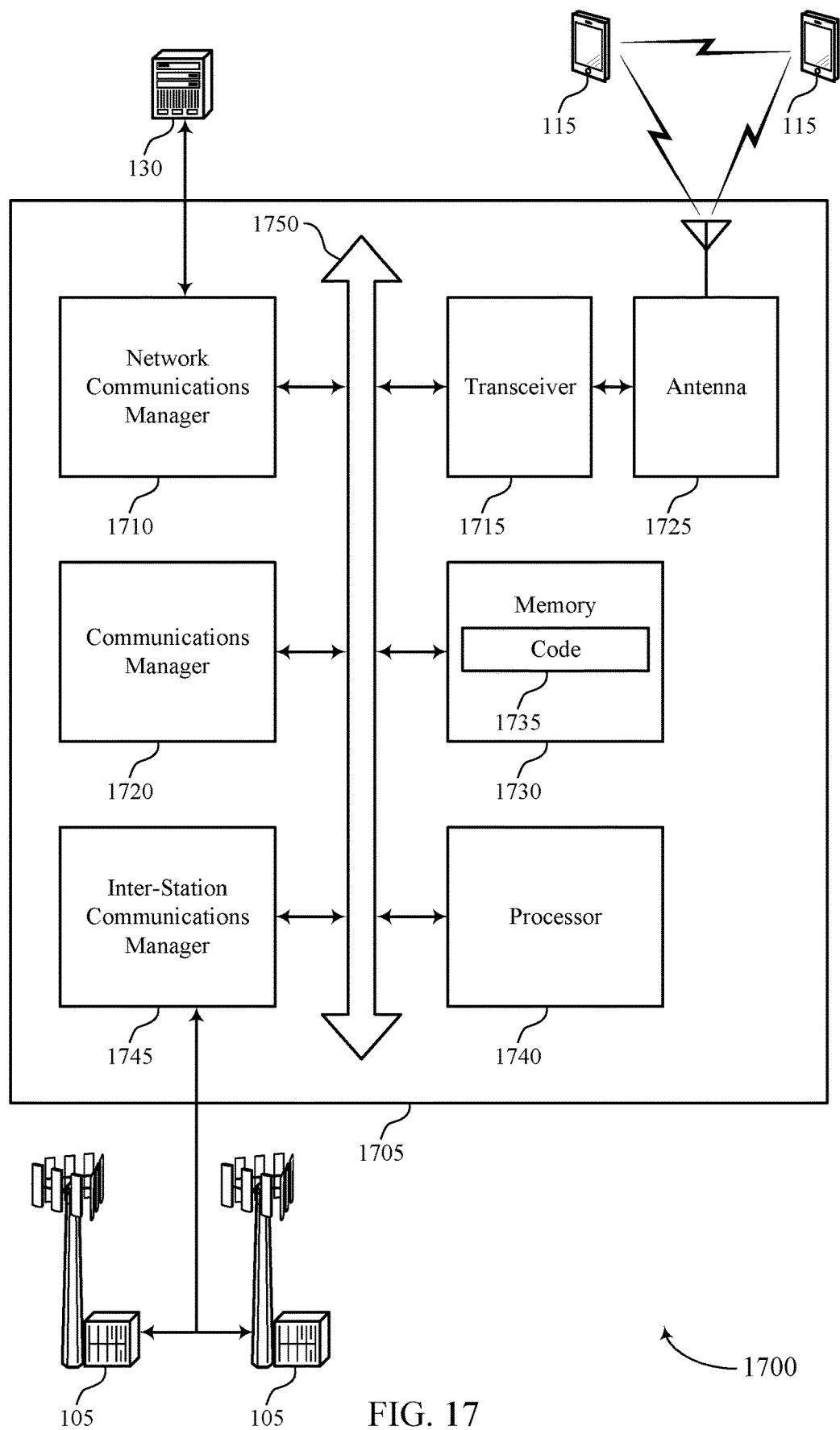
FIG. 17 shows a diagram of a system including a device that supports channel state information reporting of code block group based transport blocks in accordance with aspects of the present disclosure.

FIG. 17 shows a diagram of a system 1700 including a device 1705 that supports channel state information reporting of code block group based transport blocks in accordance with aspects of the present disclosure. The device 1705 may be an example of or include the components of a device 1405, a device 1505, or a base station 105 as described herein. The device 1705 may communicate wirelessly with one or more base stations 105, UEs 115, or any combination thereof. The device 1705 may include components for bi-directional voice and data communications including components for transmitting and receiving communications, such as a communications manager 1720, a network communications manager 1710, a transceiver 1715, an antenna 1725, a memory 1730, code 1735, a processor 1740, and an inter-station communications manager 1745. These components may be in electronic communication or otherwise coupled (e.g., operatively, communicatively, functionally, electronically, electrically) via one or more buses (e.g., a bus 1750).

The network communications manager 1710 may manage communications with a core network 130 (e.g., via one or more wired backhaul links). For example, the network communications manager 1710 may manage the transfer of data communications for client devices, such as one or more UEs 115.

In some cases, the device 1705 may include a single antenna 1725. However, in some other cases the device 1705 may have more than one antenna 1725, which may be capable of concurrently transmitting or receiving multiple wireless transmissions. The transceiver 1715 may communicate bi-directionally, via the one or more antennas 1725, wired, or wireless links as described herein. For example, the transceiver 1715 may represent a wireless transceiver and may communicate bi-directionally with another wireless transceiver. The transceiver 1715 may also include a modem to modulate the packets, to provide the modulated packets to one or more antennas 1725 for transmission, and to demodulate packets received from the one or more antennas 1725. The transceiver 1715, or the transceiver 1715 and one or more antennas 1725, may be an example of a transmitter 1415, a transmitter 1515, a receiver 1410, a receiver 1510, or any combination thereof or component thereof, as described herein.

The memory 1730 may include RAM and ROM. The memory 1730 may store computer-readable, computer-executable code 1735 including instructions that, when executed by the processor 1740, cause the device 1705 to perform various functions described herein. The code 1735 may be stored in a non-transitory computer-readable medium such as system memory or another type of memory. In some cases, the code 1735 may not be directly executable by the processor 1740 but may cause a computer (e.g., when compiled and executed) to perform functions described herein. In some cases, the memory 1730 may contain, among other things, a BIOS which may control basic hardware or software operation such as the interaction with peripheral components or devices.

The processor 1740 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1740 may be configured to operate a memory array using a memory controller. In some other cases, a memory controller may be integrated into the processor 1740. The processor 1740 may be configured to execute computer-readable instructions stored in a memory (e.g., the memory 1730) to cause the device 1705 to perform various functions (e.g., functions or tasks supporting channel state information reporting of code block group based transport blocks). For example, the device 1705 or a component of the device 1705 may include a processor 1740 and memory 1730 coupled to the processor 1740, the processor 1740 and memory 1730 configured to perform various functions described herein.

The inter-station communications manager 1745 may manage communications with other base stations 105, and may include a controller or scheduler for controlling communications with UEs 115 in cooperation with other base stations 105. For example, the inter-station communications manager 1745 may coordinate scheduling for transmissions to UEs 115 for various interference mitigation techniques such as beamforming or joint transmission. In some examples, the inter-station communications manager 1745 may provide an X2 interface within an LTE/LTE-A wireless communications network technology to provide communication between base stations 105.

The communications manager 1720 may support wireless communications at a base station in accordance with examples as disclosed herein. For example, the communications manager 1720 may be configured as or otherwise support a means for transmitting, to a UE, control signaling identifying a configuration for reporting channel metrics for transport blocks that each include a set of multiple code block groups. The communications manager 1720 may be configured as or otherwise support a means for transmitting a first transport block that includes a first set of multiple code block groups. The communications manager 1720 may be configured as or otherwise support a means for receiving a report indicating a channel metric for one or more code block groups of the first set of multiple code block groups of the first transport block in accordance with the configuration for reporting channel metrics.

By including or configuring the communications manager 1720 in accordance with examples as described herein, the device 1705 may support techniques for channel state information reporting for transport blocks with multiple CBGs. Thus, the device 1705 may realize reduced signaling overhead, improved communications reliability, more efficient utilization of communication resources, or any combination thereof, among other benefits.

In some examples, the communications manager 1720 may be configured to perform various operations (e.g., receiving, monitoring, transmitting) using or otherwise in cooperation with the transceiver 1715, the one or more antennas 1725, or any combination thereof. Although the communications manager 1720 is illustrated as a separate component, in some examples, one or more functions described with reference to the communications manager 1720 may be supported by or performed by the processor 1740, the memory 1730, the code 1735, or any combination thereof. For example, the code 1735 may include instructions executable by the processor 1740 to cause the device 1705 to perform various aspects of channel state information reporting of code block group based transport blocks as described herein, or the processor 1740 and the memory 1730 may be otherwise configured to perform or support such operations.

Figure 18:
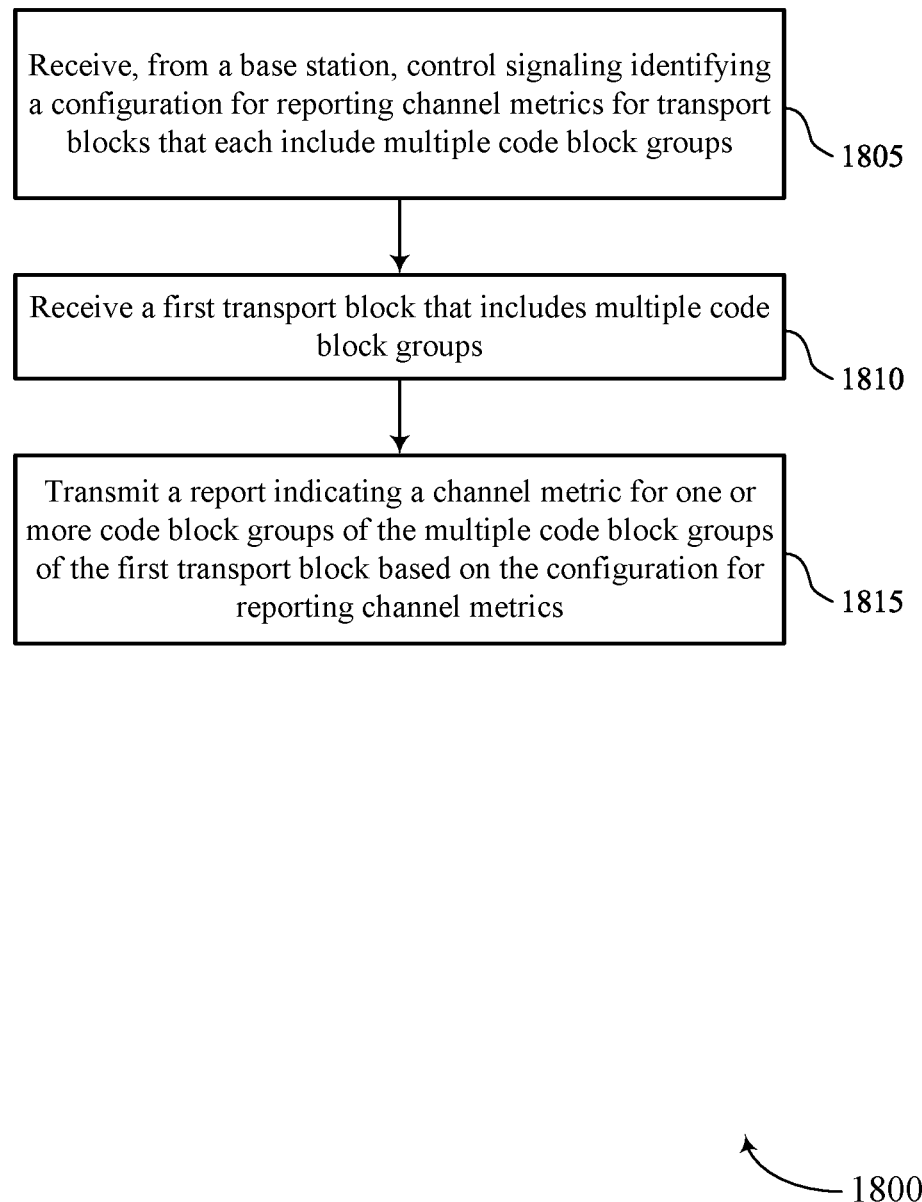
FIGS. 18 through 23 show flowcharts illustrating methods that support channel state information reporting of code block group based transport blocks in accordance with aspects of the present disclosure.

FIG. 18 shows a flowchart illustrating a method 1800 that supports channel state information reporting of code block group based transport blocks in accordance with aspects of the present disclosure. The operations of the method 1800 may be implemented by a UE or its components as described herein. For example, the operations of the method 1800 may be performed by a UE 115 as described with reference to FIGS. 1 through 13. In some examples, a UE may execute a set of instructions to control the functional elements of the UE to perform the described functions. Additionally or alternatively, the UE may perform aspects of the described functions using special-purpose hardware.

At 1805, the method may include receiving, from a base station, control signaling identifying a configuration for reporting channel metrics for transport blocks that each include a set of multiple code block groups. The operations of 1805 may be performed in accordance with examples as disclosed herein. In some examples, aspects of the operations of 1805 may be performed by a control signal reception component 1225 as described with reference to FIG. 12.

At 1810, the method may include receiving a first transport block that includes a first set of multiple code block groups. The operations of 1810 may be performed in accordance with examples as disclosed herein. In some examples, aspects of the operations of 1810 may be performed by a transport block reception component 1230 as described with reference to FIG. 12.

At 1815, the method may include transmitting a report indicating a channel metric for one or more code block groups of the first set of multiple code block groups of the first transport block in accordance with the configuration for reporting channel metrics. The operations of 1815 may be performed in accordance with examples as disclosed herein. In some examples, aspects of the operations of 1815 may be performed by a report transmission component 1235 as described with reference to FIG. 12.

Figure 19:
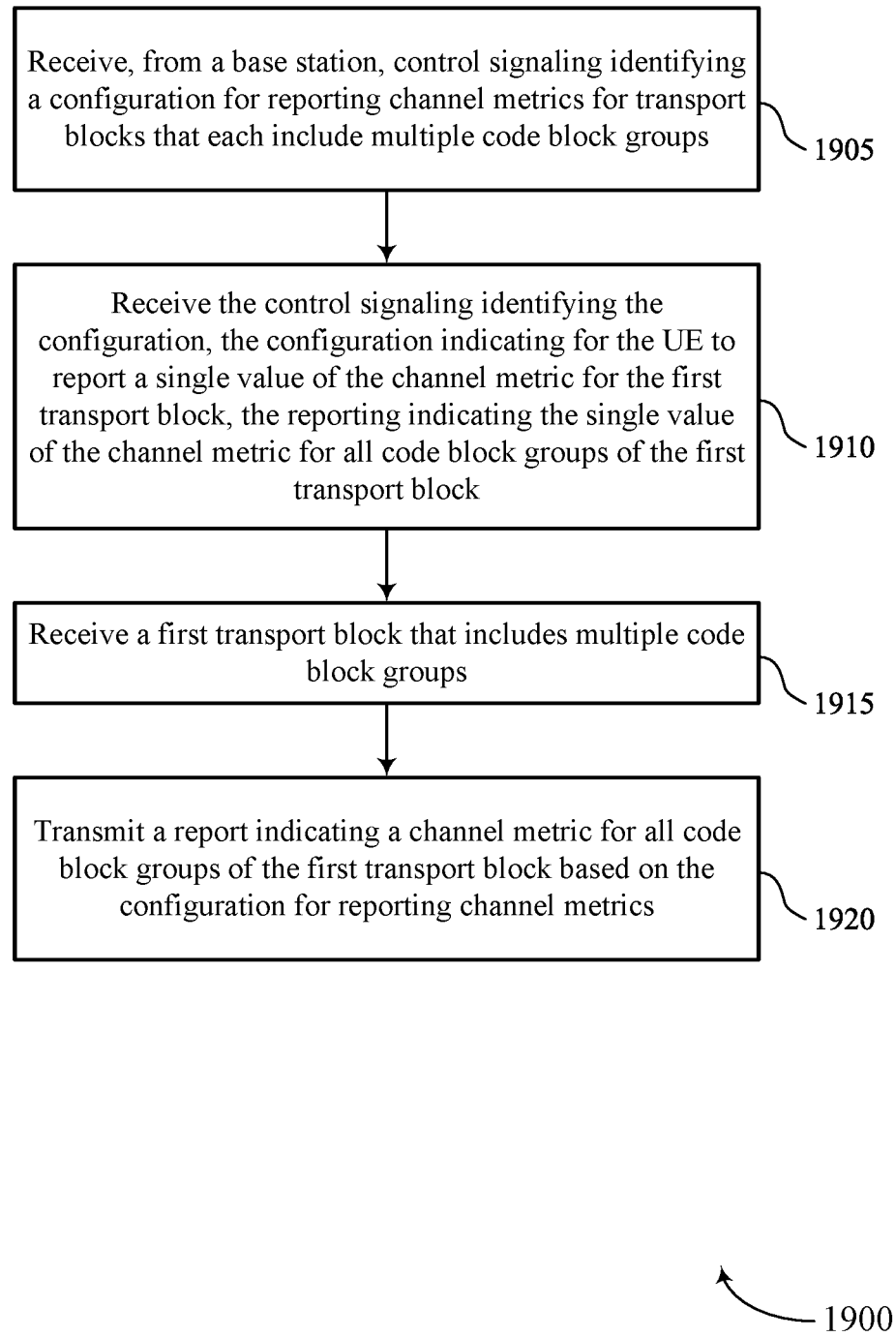

FIG. 19 shows a flowchart illustrating a method 1900 that supports channel state information reporting of code block group based transport blocks in accordance with aspects of the present disclosure. The operations of the method 1900 may be implemented by a UE or its components as described herein. For example, the operations of the method 1900 may be performed by a UE 115 as described with reference to FIGS. 1 through 13. In some examples, a UE may execute a set of instructions to control the functional elements of the UE to perform the described functions. Additionally or alternatively, the UE may perform aspects of the described functions using special-purpose hardware.

At 1905, the method may include receiving, from a base station, control signaling identifying a configuration for reporting channel metrics for transport blocks that each include a set of multiple code block groups. The operations of 1905 may be performed in accordance with examples as disclosed herein. In some examples, aspects of the operations of 1905 may be performed by a control signal reception component 1225 as described with reference to FIG. 12.

At 1910, the method may include receiving the control signaling identifying the configuration, the configuration indicating for the UE to report a single value of the channel metric for the first transport block, the reporting indicating the single value of the channel metric for the first set of multiple code block groups of the first transport block. The operations of 1910 may be performed in accordance with examples as disclosed herein. In some examples, aspects of the operations of 1910 may be performed by a control signal reception component 1225 as described with reference to FIG. 12.

At 1915, the method may include receiving a first transport block that includes a first set of multiple code block groups. The operations of 1915 may be performed in accordance with examples as disclosed herein. In some examples, aspects of the operations of 1915 may be performed by a transport block reception component 1230 as described with reference to FIG. 12.

At 1920, the method may include transmitting a report indicating a channel metric for one or more code block groups of the first set of multiple code block groups of the first transport block in accordance with the configuration for reporting channel metrics. The operations of 1920 may be performed in accordance with examples as disclosed herein. In some examples, aspects of the operations of 1920 may be performed by a report transmission component 1235 as described with reference to FIG. 12.

Figure 20:
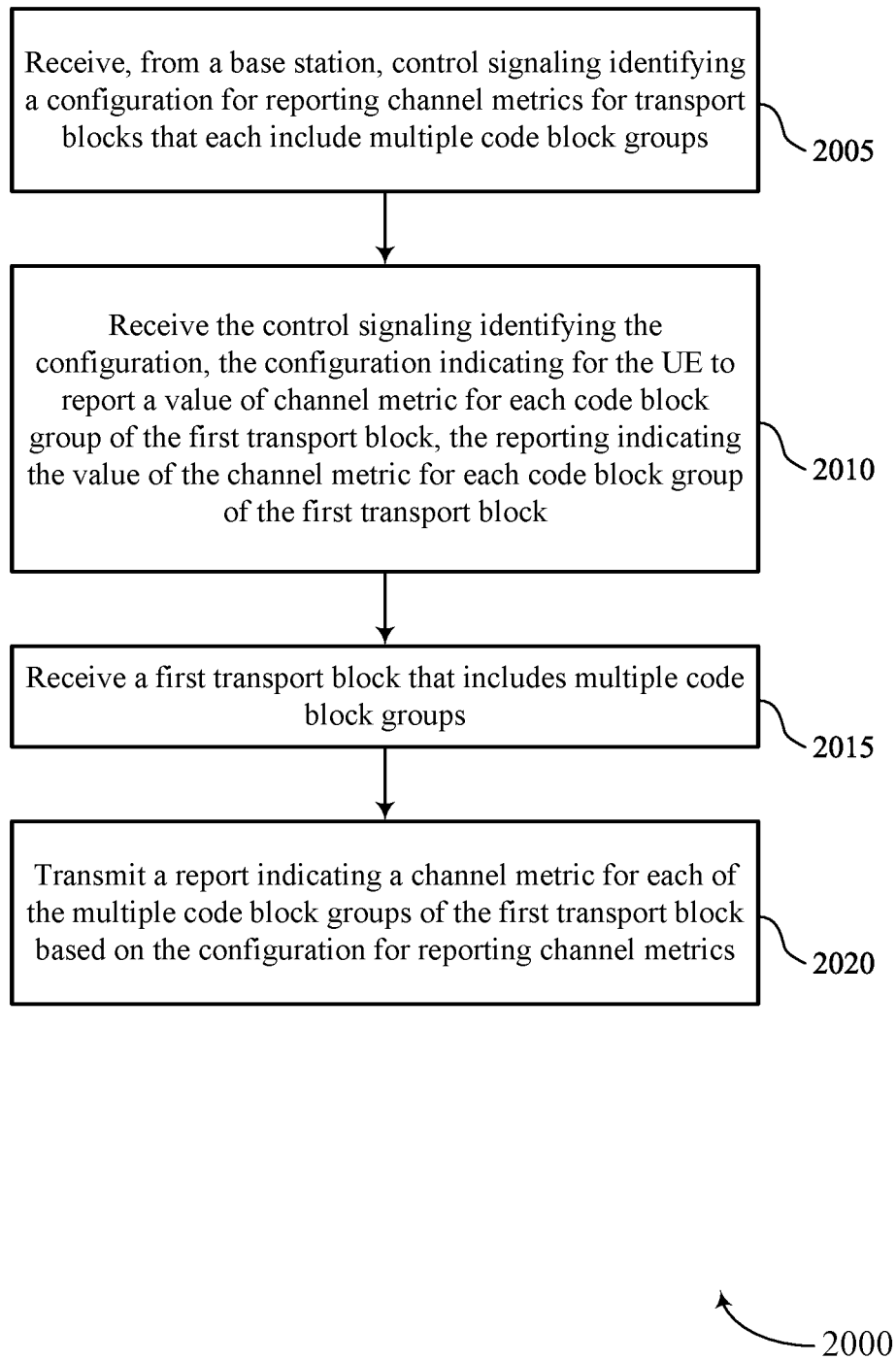

FIG. 20 shows a flowchart illustrating a method 2000 that supports channel state information reporting of code block group based transport blocks in accordance with aspects of the present disclosure. The operations of the method 2000 may be implemented by a UE or its components as described herein. For example, the operations of the method 2000 may be performed by a UE 115 as described with reference to FIGS. 1 through 13. In some examples, a UE may execute a set of instructions to control the functional elements of the UE to perform the described functions. Additionally or alternatively, the UE may perform aspects of the described functions using special-purpose hardware.

At 2005, the method may include receiving, from a base station, control signaling identifying a configuration for reporting channel metrics for transport blocks that each include a set of multiple code block groups. The operations of 2005 may be performed in accordance with examples as disclosed herein. In some examples, aspects of the operations of 2005 may be performed by a control signal reception component 1225 as described with reference to FIG. 12.

At 2010, the method may include receiving the control signaling identifying the configuration, the configuration indicating for the UE to report a value of channel metric for each code block group of the first set of multiple code block groups of the first transport block, the reporting indicating the value of the channel metric for each code block group of the first transport block. The operations of 2010 may be performed in accordance with examples as disclosed herein. In some examples, aspects of the operations of 2010 may be performed by a control signal reception component 1225 as described with reference to FIG. 12.

At 2015, the method may include receiving a first transport block that includes a first set of multiple code block groups. The operations of 2015 may be performed in accordance with examples as disclosed herein. In some examples, aspects of the operations of 2015 may be performed by a transport block reception component 1230 as described with reference to FIG. 12.

At 2020, the method may include transmitting a report indicating a channel metric for one or more code block groups of the first set of multiple code block groups of the first transport block in accordance with the configuration for reporting channel metrics. The operations of 2020 may be performed in accordance with examples as disclosed herein. In some examples, aspects of the operations of 2020 may be performed by a report transmission component 1235 as described with reference to FIG. 12.

Figure 21:
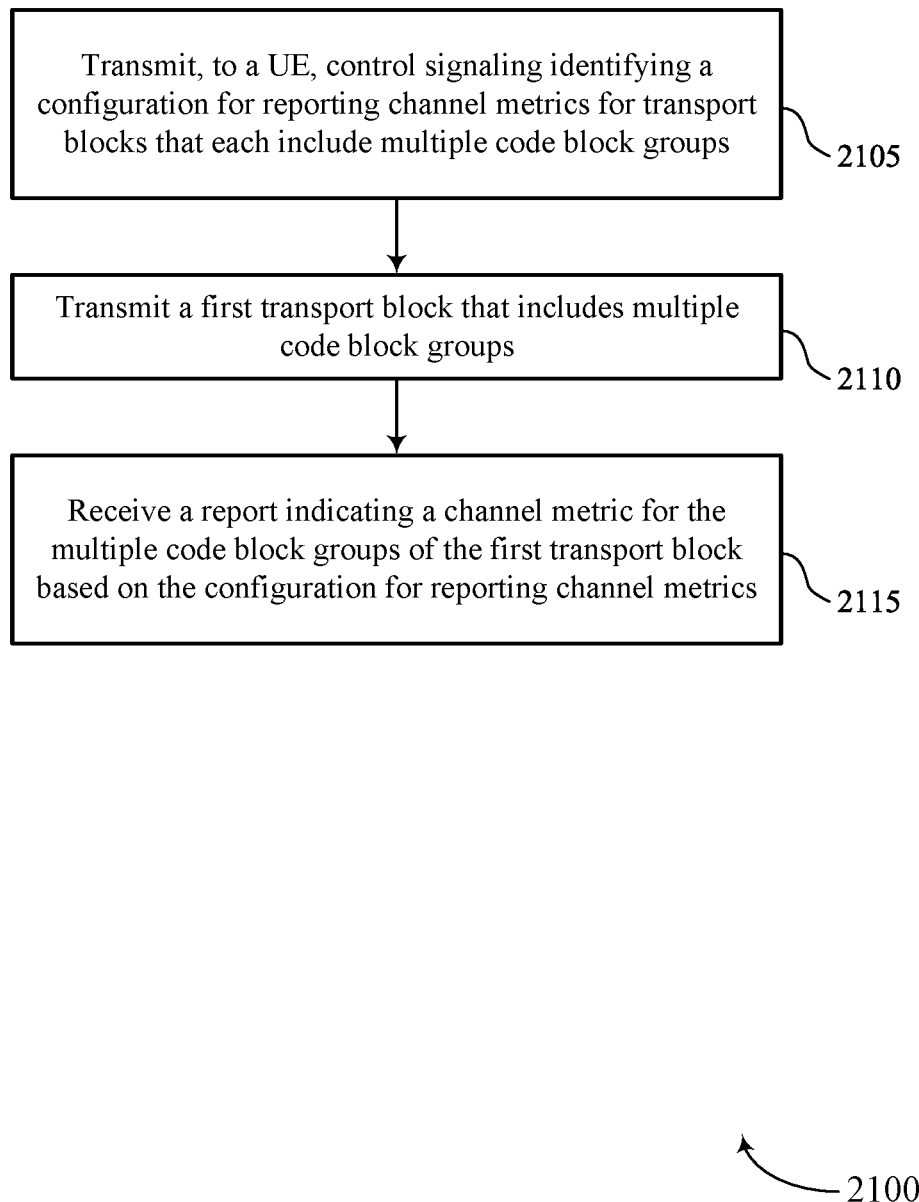

FIG. 21 shows a flowchart illustrating a method 2100 that supports channel state information reporting of code block group based transport blocks in accordance with aspects of the present disclosure. The operations of the method 2100 may be implemented by a base station or its components as described herein. For example, the operations of the method 2100 may be performed by a base station 105 as described with reference to FIGS. 1 through 9 and 14 through 17. In some examples, a base station may execute a set of instructions to control the functional elements of the base station to perform the described functions. Additionally or alternatively, the base station may perform aspects of the described functions using special-purpose hardware.

At 2105, the method may include transmitting, to a UE, control signaling identifying a configuration for reporting channel metrics for transport blocks that each include a set of multiple code block groups. The operations of 2105 may be performed in accordance with examples as disclosed herein. In some examples, aspects of the operations of 2105 may be performed by a control signal transmission component 1625 as described with reference to FIG. 16.

At 2110, the method may include transmitting a first transport block that includes a first set of multiple code block groups. The operations of 2110 may be performed in accordance with examples as disclosed herein. In some examples, aspects of the operations of 2110 may be performed by a transport block transmission component 1630 as described with reference to FIG. 16.

At 2115, the method may include receiving a report indicating a channel metric for one or more code block groups of the first set of multiple code block groups of the first transport block in accordance with the configuration for reporting channel metrics. The operations of 2115 may be performed in accordance with examples as disclosed herein. In some examples, aspects of the operations of 2115 may be performed by a report reception component 1635 as described with reference to FIG. 16.

Figure 22:
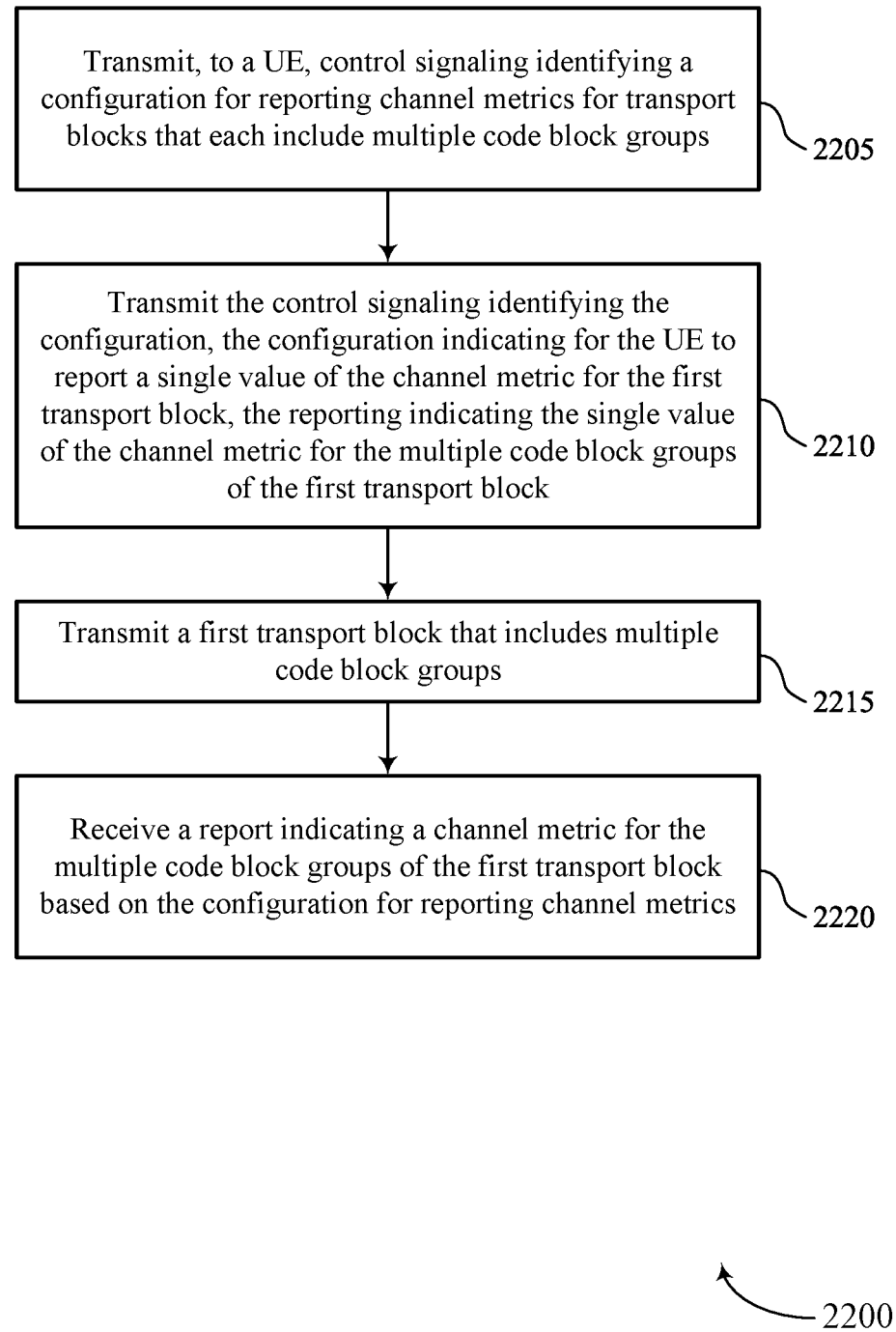

FIG. 22 shows a flowchart illustrating a method 2200 that supports channel state information reporting of code block group based transport blocks in accordance with aspects of the present disclosure. The operations of the method 2200 may be implemented by a base station or its components as described herein. For example, the operations of the method 2200 may be performed by a base station 105 as described with reference to FIGS. 1 through 9 and 14 through 17. In some examples, a base station may execute a set of instructions to control the functional elements of the base station to perform the described functions. Additionally or alternatively, the base station may perform aspects of the described functions using special-purpose hardware.

At 2205, the method may include transmitting, to a UE, control signaling identifying a configuration for reporting channel metrics for transport blocks that each include a set of multiple code block groups. The operations of 2205 may be performed in accordance with examples as disclosed herein. In some examples, aspects of the operations of 2205 may be performed by a control signal transmission component 1625 as described with reference to FIG. 16.

At 2210, the method may include transmitting the control signaling identifying the configuration, the configuration indicating for the UE to report a single value of the channel metric for the first transport block, the reporting indicating the single value of the channel metric for the first set of multiple code block groups of the first transport block. The operations of 2210 may be performed in accordance with examples as disclosed herein. In some examples, aspects of the operations of 2210 may be performed by a control signal transmission component 1625 as described with reference to FIG. 16.

At 2215, the method may include transmitting a first transport block that includes a first set of multiple code block groups. The operations of 2215 may be performed in accordance with examples as disclosed herein. In some examples, aspects of the operations of 2215 may be performed by a transport block transmission component 1630 as described with reference to FIG. 16.

At 2220, the method may include receiving a report indicating a channel metric for one or more code block groups of the first set of multiple code block groups of the first transport block in accordance with the configuration for reporting channel metrics. The operations of 2220 may be performed in accordance with examples as disclosed herein. In some examples, aspects of the operations of 2220 may be performed by a report reception component 1635 as described with reference to FIG. 16.

Figure 23:
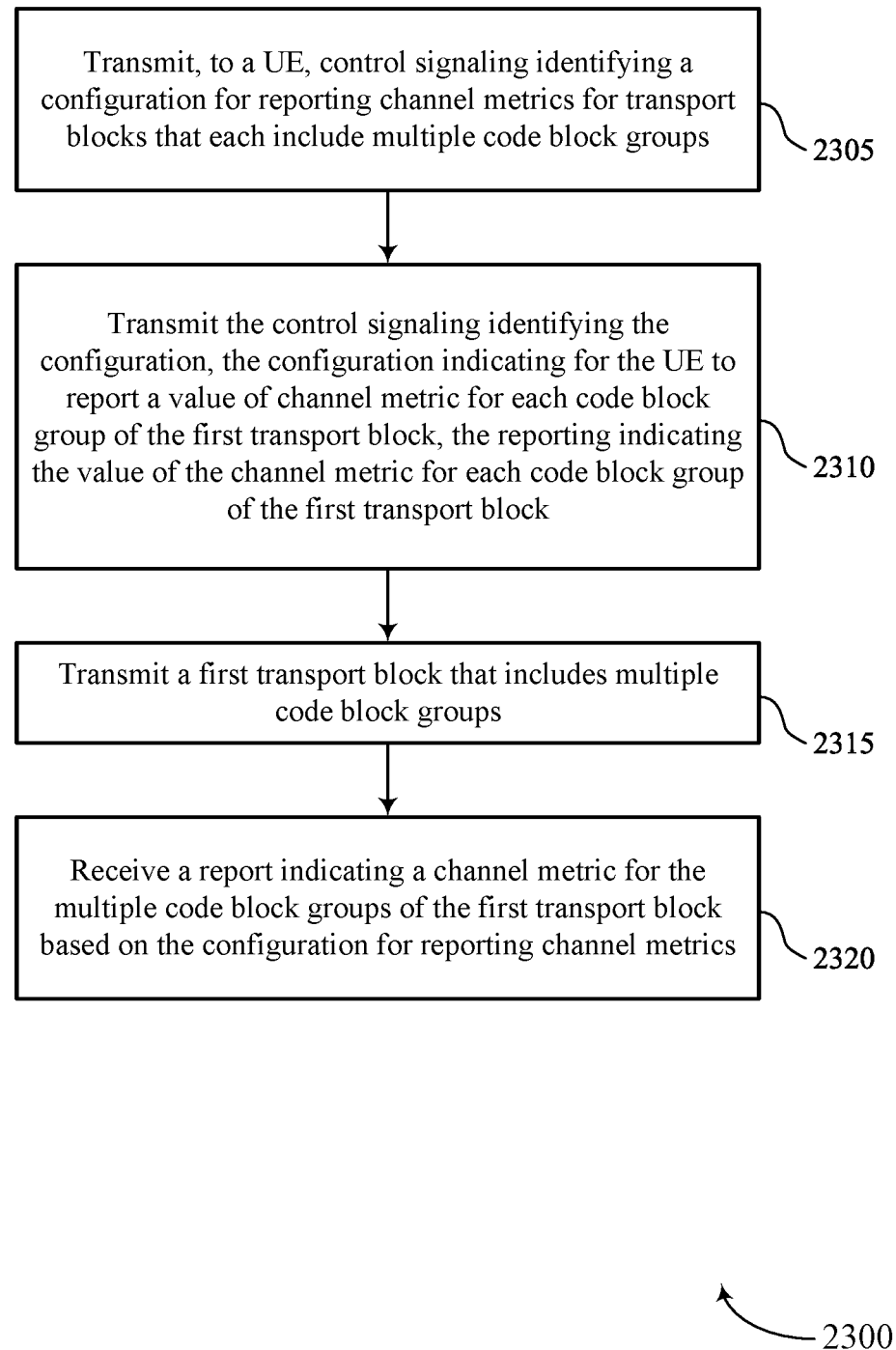

FIG. 23 shows a flowchart illustrating a method 2300 that supports channel state information reporting of code block group based transport blocks in accordance with aspects of the present disclosure. The operations of the method 2300 may be implemented by a base station or its components as described herein. For example, the operations of the method 2300 may be performed by a base station 105 as described with reference to FIGS. 1 through 9 and 14 through 17. In some examples, a base station may execute a set of instructions to control the functional elements of the base station to perform the described functions. Additionally or alternatively, the base station may perform aspects of the described functions using special-purpose hardware.

At 2305, the method may include transmitting, to a UE, control signaling identifying a configuration for reporting channel metrics for transport blocks that each include a set of multiple code block groups. The operations of 2305 may be performed in accordance with examples as disclosed herein. In some examples, aspects of the operations of 2305 may be performed by a control signal transmission component 1625 as described with reference to FIG. 16.

At 2310, the method may include transmitting the control signaling identifying the configuration, the configuration indicating for the UE to report a value of channel metric for each code block group of the first set of multiple code block groups of the first transport block, the reporting indicating the value of the channel metric for each code block group of the first transport block. The operations of 2310 may be performed in accordance with examples as disclosed herein. In some examples, aspects of the operations of 2310 may be performed by a control signal transmission component 1625 as described with reference to FIG. 16.

At 2315, the method may include transmitting a first transport block that includes a first set of multiple code block groups. The operations of 2315 may be performed in accordance with examples as disclosed herein. In some examples, aspects of the operations of 2315 may be performed by a transport block transmission component 1630 as described with reference to FIG. 16.

At 2320, the method may include receiving a report indicating a channel metric for one or more code block groups of the first set of multiple code block groups of the first transport block in accordance with the configuration for reporting channel metrics. The operations of 2320 may be performed in accordance with examples as disclosed herein. In some examples, aspects of the operations of 2320 may be performed by a report reception component 1635 as described with reference to FIG. 16.

The following provides an overview of aspects of the present disclosure:

Aspect 1: A method for wireless communications at a UE, comprising: receiving, from a base station, control signaling identifying a configuration for reporting channel metrics for transport blocks that each include a plurality of code block groups; receiving a first transport block that includes a first plurality of code block groups; and transmitting a report indicating a channel metric for one or more code block groups of the first plurality of code block groups of the first transport block in accordance with the configuration for reporting channel metrics.

Aspect 2: The method of aspect 1, wherein receiving the control signaling identifying the configuration comprises: receiving the control signaling identifying the configuration, the configuration indicating for the UE to report a single value of the channel metric for the first transport block, the reporting indicating the single value of the channel metric for the first plurality of code block groups of the first transport block.

Aspect 3: The method of any of aspects 1 through 2, wherein receiving the control signaling identifying the configuration comprises: receiving the control signaling identifying the configuration, the configuration indicating for the UE to report a value of channel metric for each code block group of the first plurality of code block groups of the first transport block, the reporting indicating the value of the channel metric for each code block group of the first transport block.

Aspect 4: The method of any of aspects 1 through 3, wherein transmitting the report indicating the channel metric comprises: transmitting the report, wherein the report includes a difference value between a reference channel metric and the channel metric associated with the one or more code block groups.

Aspect 5: The method of any of aspects 1 through 4, wherein transmitting the report indicating the channel metric comprises: transmitting the report, wherein the report includes the channel metric for each set of one or more sets of code block groups of the first plurality of code block groups in accordance with the configuration.

Aspect 6: The method of any of aspects 1 through 5, wherein transmitting the report indicating the channel metric comprises: transmitting the report, wherein the report includes an average metric for the first plurality of code block groups, or a threshold metric for one code block group of the first plurality of code block groups, or any combination thereof, wherein the threshold metric for the code block group is selected from a set of channel metrics based at least in part on the threshold metric satisfying a threshold value, each channel metric of the set of channel metrics corresponding to a respective code block group of the first plurality of code block groups.

Aspect 7: The method of any of aspects 1 through 6, wherein transmitting the report indicating the channel metric comprises: transmitting the report, wherein the report includes an average metric for each code block group of the first plurality of code block groups, or a threshold metric for one code block from each code block group of the first plurality of code block groups, or any combination thereof, wherein the threshold metric for each code block group is selected from a set of channel metrics based at least in part on the threshold metric satisfying a threshold value, each channel metric of the set of channel metrics corresponding to a respective code block of a set of code blocks for each code block group of the first plurality of code block groups.

Aspect 8: The method of any of aspects 1 through 7, further comprising: identifying a reference channel metric for determining a difference between the channel metric and the reference channel metric, wherein the reference channel metric comprises a scheduled modulation and coding scheme, an average modulation and coding scheme associated with the first plurality of code block groups, or a metric indicated by the control signaling.

Aspect 9: The method of aspect 8, further comprising: transmitting, to the base station, an indication of the identified reference channel metric.

Aspect 10: The method of any of aspects 8 through 9, wherein the reference channel metric comprises a channel quality indicator, the channel quality indicator is indicated by the control signaling, or the channel quality indicator is indicated by a mapping identified by the configuration that maps the scheduled modulation and coding scheme to the channel quality indicator.

Aspect 11: The method of any of aspects 1 through 10, wherein the control signaling comprises a bitmap indicating the one or more code block groups associated with the channel metric, the one or more code block groups comprising code block groups associated with a negative acknowledgment or each of the first plurality of code block groups.

Aspect 12: The method of any of aspects 1 through 11, further comprising: comparing a quantity of code block groups associated with negative acknowledgements to a threshold, wherein the report indicates the channel metric corresponding to the first transport block or a set of channel metrics corresponding to each code block group of the first plurality of code block groups based at least in part on whether the quantity of code block groups associated with the negative acknowledgements satisfies the threshold.

Aspect 13: The method of any of aspects 1 through 12, wherein the control signaling indicates one or more valid quantities of bits per code block group of the first plurality of code block groups based at least in part on a type of the channel metric, a type of the configuration, or both.

Aspect 14: The method of any of aspects 1 through 13, wherein the channel metric comprises a modulation and coding scheme for the first transport block, a channel quality indicator for the first transport block, a set of modulation and coding schemes each of which is associated with a respective code block group of the first plurality of code block groups, a set of channel quality indicators each of which is associated with a respective code block group of the first plurality of code block groups, or any combination thereof.

Aspect 15: A method for wireless communications at a base station, comprising: transmitting, to a UE, control signaling identifying a configuration for reporting channel metrics for transport blocks that each include a plurality of code block groups; transmitting a first transport block that includes a first plurality of code block groups; and receiving a report indicating a channel metric for one or more code block groups of the first plurality of code block groups of the first transport block in accordance with the configuration for reporting channel metrics.

Aspect 16: The method of aspect 15, wherein transmitting the control signaling identifying the configuration comprises: transmitting the control signaling identifying the configuration, the configuration indicating for the UE to report a single value of the channel metric for the first transport block, the reporting indicating the single value of the channel metric for the first plurality of code block groups of the first transport block.

Aspect 17: The method of any of aspects 15 through 16, wherein transmitting the control signaling identifying the configuration comprises: transmitting the control signaling identifying the configuration, the configuration indicating for the UE to report a value of channel metric for each code block group of the first plurality of code block groups of the first transport block, the reporting indicating the value of the channel metric for each code block group of the first transport block.

Aspect 18: The method of any of aspects 15 through 17, wherein receiving the report indicating the channel metric comprises: receiving the report, wherein the report includes a difference value between a reference channel metric and the channel metric associated with the one or more code block groups.

Aspect 19: The method of any of aspects 15 through 18, wherein receiving the report indicating the channel metric comprises: receiving the report, wherein the report includes the channel metric for each set of one or more sets of code block groups of the first plurality of code block groups in accordance with the configuration.

Aspect 20: The method of any of aspects 15 through 19, wherein receiving the report indicating the channel metric comprises: receiving the report, wherein the channel metric comprises an average metric for the first plurality of code block groups, or a threshold metric for one code block group of the first plurality of code block groups, or any combination thereof, wherein the threshold metric for the code block group is selected from a set of channel metrics based at least in part on the threshold metric satisfying a threshold value, each channel metric of the set of channel metrics corresponding to a respective code block group of the first plurality of code block groups.

Aspect 21: The method of any of aspects 15 through 20, wherein receiving the report indicating the channel metric comprises: receiving the report, wherein the report includes an average metric for each code block group of the first plurality of code block groups, or a threshold metric for one code block from each code block group of the first plurality of code block groups, or any combination thereof, wherein the threshold metric for each code block group is selected from a set of channel metrics based at least in part on the threshold metric satisfying a threshold value, each channel metric of the set of channel metrics corresponding to a respective code block of a set of code blocks for each code block group of the first plurality of code block groups.

Aspect 22: The method of any of aspects 15 through 21, further comprising: identifying a reference channel metric for determining the channel metric based on the report indicating a difference between the channel metric and the reference channel metric, wherein the reference channel metric comprises a scheduled modulation and coding scheme, an average modulation and coding scheme associated with the first plurality of code block groups, or a metric indicated by the control signaling.

Aspect 23: The method of aspect 22, further comprising: receiving, from the UE, an indication of the reference channel metric.

Aspect 24: The method of any of aspects 15 through 23, wherein the control signaling comprises a bitmap indicating the one or more code block groups associated with the channel metric, the one or more code block groups comprising code block groups associated with a negative acknowledgment or each of the first plurality of code block groups.

Aspect 25: The method of any of aspects 15 through 24, wherein the channel metric comprises a modulation and coding scheme for the first transport block, a channel quality indicator for the first transport block, a set of modulation and coding schemes each of which is associated with a respective code block group of the first plurality of code block groups, a set of channel quality indicators each of which is associated with a respective code block group of the first plurality of code block groups, or any combination thereof.

Aspect 26: An apparatus for wireless communications at a UE, comprising a processor; memory coupled with the processor; and instructions stored in the memory and executable by the processor to cause the apparatus to perform a method of any of aspects 1 through 14.

Aspect 27: An apparatus for wireless communications at a UE, comprising at least one means for performing a method of any of aspects 1 through 14.

Aspect 28: A non-transitory computer-readable medium storing code for wireless communications at a UE, the code comprising instructions executable by a processor to perform a method of any of aspects 1 through 14.

Aspect 29: An apparatus for wireless communications at a base station, comprising a processor; memory coupled with the processor; and instructions stored in the memory and executable by the processor to cause the apparatus to perform a method of any of aspects 15 through 25.

Aspect 30: An apparatus for wireless communications at a base station, comprising at least one means for performing a method of any of aspects 15 through 25.

Aspect 31: A non-transitory computer-readable medium storing code for wireless communications at a base station, the code comprising instructions executable by a processor to perform a method of any of aspects 15 through 25. It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

The term "determine" or "determining" encompasses a wide variety of actions and, therefore, "determining" can include calculating, computing, processing, deriving, investigating, looking up (such as via looking up in a table, a database or another data structure), ascertaining and the like. Also, "determining" can include receiving (such as receiving information), accessing (such as accessing data in a memory) and the like. Also, "determining" can include resolving, selecting, choosing, establishing and other such similar actions.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A method for wireless communications at a user equipment (UE), comprising:
   receiving, from a base station, control signaling identifying a configuration for reporting channel condition metrics for transport blocks that each include a plurality of code block groups, wherein the configuration indicates whether to use transport block level channel condition feedback or code block group level channel condition feedback;
   receiving a first transport block that includes a first plurality of code block groups; and
   transmitting a report indicating a channel condition metric for one or more code block groups of the first plurality of code block groups of the first transport block in accordance with the configuration for reporting channel condition metrics, wherein the channel condition metric is determined based at least in part on reception of the first plurality of code block groups.

2. The method of claim 1, wherein receiving the control signaling identifying the configuration comprises:
   receiving the control signaling identifying the configuration indicating to use the transport block level channel condition feedback, the configuration indicating for the UE to report a single value of the channel condition metric for the first transport block, the report indicating the single value of the channel condition metric for the first plurality of code block groups of the first transport block.

3. The method of claim 1, wherein receiving the control signaling identifying the configuration comprises:
   receiving the control signaling identifying the configuration indicating to use the code block group level channel condition feedback, the configuration indicating for the UE to report a value of the channel condition metric for each code block group of the first plurality of code block groups of the first transport block, the report indicating the value of the channel condition metric for each code block group of the first transport block.

4. The method of claim 1, wherein transmitting the report indicating the channel condition metric comprises:
   transmitting the report, wherein the report includes a difference value between a reference channel condition metric and the channel condition metric associated with the one or more code block groups.

5. The method of claim 1, wherein transmitting the report indicating the channel condition metric comprises:
   transmitting the report, wherein the report includes the channel condition metric for each set of one or more sets of code block groups of the first plurality of code block groups in accordance with the configuration indicating to use the code block group level channel condition feedback.

6. The method of claim 1, wherein transmitting the report indicating the channel condition metric comprises:
   transmitting the report, wherein the report includes an average metric for the first plurality of code block groups, or a threshold metric for one code block group of the first plurality of code block groups, or any combination thereof, wherein the threshold metric for the one code block group is selected from a set of channel condition metrics based at least in part on the threshold metric satisfying a threshold value, each channel condition metric of the set of channel condition metrics corresponding to a respective code block group of the first plurality of code block groups in accordance with the configuration indicating to use the code block group level channel condition feedback.

7. The method of claim 1, wherein transmitting the report indicating the channel condition metric comprises:
   transmitting the report, wherein the report includes an average metric for each code block group of the first plurality of code block groups, or a threshold metric for one code block from each code block group of the first plurality of code block groups, or any combination thereof, wherein the threshold metric for each code block group is selected from a set of channel condition metrics based at least in part on the threshold metric satisfying a threshold value, each channel condition metric of the set of channel condition metrics corresponding to a respective code block of a set of code blocks for each code block group of the first plurality of code block groups in accordance with the configuration indicating to use the code block group level channel condition feedback.

8. The method of claim 1, further comprising:
   identifying a reference channel condition metric for determining a difference between the channel condition metric and the reference channel condition metric, wherein the reference channel condition metric comprises a scheduled modulation and coding scheme, an average modulation and coding scheme associated with the first plurality of code block groups, or a metric indicated by the control signaling; and transmitting, to the base station, an indication of the identified reference channel condition metric.

9. The method of claim 8, wherein:
the reference channel condition metric comprises a channel quality indicator, and
the channel quality indicator is indicated by the control signaling, or the channel quality indicator is indicated by a mapping identified by the configuration that maps the scheduled modulation and coding scheme to the channel quality indicator.

10. The method of claim 1, wherein the control signaling comprises a bitmap indicating the one or more code block groups associated with the channel condition metric, the one or more code block groups comprising code block groups associated with a negative acknowledgment or each of the first plurality of code block groups.

11. The method of claim 1, further comprising:
comparing a quantity of code block groups associated with negative acknowledgements to a threshold, wherein the report indicates the channel condition metric corresponding to the first transport block or a set of channel condition metrics corresponding to each code block group of the first plurality of code block groups based at least in part on whether the quantity of code block groups associated with the negative acknowledgements satisfies the threshold.

12. The method of claim 1, wherein the control signaling indicates one or more valid quantities of bits per code block group of the first plurality of code block groups based at least in part on a type of the channel condition metric, a type of the configuration, or both.

13. The method of claim 1, wherein the channel condition metric comprises a modulation and coding scheme for the first transport block, a channel quality indicator for the first transport block, a set of modulation and coding schemes each of which is associated with a respective code block group of the first plurality of code block groups, a set of channel quality indicators each of which is associated with the respective code block group of the first plurality of code block groups, or any combination thereof.

14. The method of claim 1, wherein:
when the configuration indicates to use the transport block level channel condition feedback, the configuration indicates for the UE to report a single value of the channel condition metric for the first transport block, and the report indicates the single value of the channel condition metric for the first plurality of code block groups of the first transport block; and
when the configuration indicates to use the code block group level channel condition feedback, the configuration indicates for the UE to report a value of the channel condition metric for each code block group of the first plurality of code block groups of the first transport block, and the report indicates the value of the channel condition metric for each code block group of the first transport block.

15. A method for wireless communications at a base station, comprising:
transmitting, to a user equipment (UE), control signaling identifying a configuration for reporting channel condition metrics for transport blocks that each include a plurality of code block groups, wherein the configuration indicates whether to use transport block level channel condition feedback or code block group level channel condition feedback;
transmitting a first transport block that includes a first plurality of code block groups; and
receiving a report indicating a channel condition metric for one or more code block groups of the first plurality of code block groups of the first transport block in accordance with the configuration for reporting channel condition metrics, wherein the channel condition metric is based at least in part on transmission of the first plurality of code block groups.

16. The method of claim 15, wherein transmitting the control signaling identifying the configuration comprises:
transmitting the control signaling identifying the configuration indicating to use the transport block level channel condition feedback, the configuration indicating for the UE to report a single value of the channel condition metric for the first transport block, the report indicating the single value of the channel condition metric for the first plurality of code block groups of the first transport block.

17. The method of claim 15, wherein transmitting the control signaling identifying the configuration comprises:
transmitting the control signaling identifying the configuration indicating to use the code block group level channel condition feedback, the configuration indicating for the UE to report a value of the channel condition metric for each code block group of the first plurality of code block groups of the first transport block, the report indicating the value of the channel condition metric for each code block group of the first transport block.

18. The method of claim 15, wherein receiving the report indicating the channel condition metric comprises:
receiving the report, wherein the report includes a difference value between a reference channel condition metric and the channel condition metric associated with the one or more code block groups.

19. The method of claim 15, wherein receiving the report indicating the channel condition metric comprises:
receiving the report, wherein the report includes the channel condition metric for each set of one or more sets of code block groups of the first plurality of code block groups in accordance with the configuration indicating to use the code block group level channel condition feedback.

20. The method of claim 15, wherein receiving the report indicating the channel condition metric comprises:
receiving the report, wherein the channel condition metric comprises an average metric for the first plurality of code block groups, or a threshold metric for one code block group of the first plurality of code block groups, or any combination thereof, wherein the threshold metric for the one code block group is selected from a set of channel condition metrics based at least in part on the threshold metric satisfying a threshold value, each channel condition metric of the set of channel condition metrics corresponding to a respective code block group of the first plurality of code block groups in accordance with the configuration indicating to use the code block group level channel condition feedback.

21. The method of claim 15, wherein receiving the report indicating the channel condition metric comprises:
receiving the report, wherein the report includes an average metric for each code block group of the first plurality of code block groups, or a threshold metric for one code block from each code block group of the first plurality of code block groups, or any combination thereof, wherein the threshold metric for each code block group is selected from a set of channel condition metrics based at least in part on the threshold metric satisfying a threshold value, each channel condition metric of the set of channel condition metrics corresponding to a respective code block of a set of code blocks for each code block group of the first plurality of code block groups in accordance with the configuration indicating to use the code block group level channel condition feedback.

22. The method of claim 15, further comprising:
identifying a reference channel condition metric for determining the channel condition metric based on the report indicating a difference between the channel condition metric and the reference channel condition metric, wherein the reference channel condition metric comprises a scheduled modulation and coding scheme, an average modulation and coding scheme associated with the first plurality of code block groups, or a metric indicated by the control signaling; and
receiving, from the UE, an indication of the reference channel condition metric.

23. The method of claim 15, wherein the control signaling comprises a bitmap indicating the one or more code block groups associated with the channel condition metric, the one or more code block groups comprising code block groups associated with a negative acknowledgment or each of the first plurality of code block groups.

24. The method of claim 15, wherein the channel condition metric comprises a modulation and coding scheme for the first transport block, a channel quality indicator for the first transport block, a set of modulation and coding schemes each of which is associated with a respective code block group of the first plurality of code block groups, a set of channel quality indicators each of which is associated with the respective code block group of the first plurality of code block groups, or any combination thereof.

25. An apparatus for wireless communications at a user equipment (UE), comprising:
one or more processors;
memory coupled with the one or more processors; and
instructions stored in the memory and executable by the one or more processors to cause the apparatus to:
receive, from a base station, control signaling identifying a configuration for reporting channel condition metrics for transport blocks that each include a plurality of code block groups, wherein the configuration indicates whether to use transport block level channel condition feedback or code block group level channel condition feedback;
receive a first transport block that includes a first plurality of code block groups; and
transmit a report indicating a channel condition metric for one or more code block groups of the first plurality of code block groups of the first transport block in accordance with the configuration for reporting channel metrics, wherein the channel condition metric is determined based at least in part on reception of the first plurality of code block groups.

26. The apparatus of claim 25, wherein the instructions are further executable to receive the control signaling identifying the configuration by being executable by the one or more processors to:
receive the control signaling identifying the configuration indicating to use the transport block level channel condition feedback, the configuration indicating for the UE to report a single value of the channel condition metric for the first transport block, the report indicating the single value of the channel condition metric for the first plurality of code block groups of the first transport block.

27. The apparatus of claim 25, wherein:
when the configuration indicates to use the transport block level channel condition feedback, the configuration indicates for the UE to report a single value of the channel condition metric for the first transport block, and the report indicates the single value of the channel condition metric for the first plurality of code block groups of the first transport block; and
when the configuration indicates to use the code block group level channel condition feedback, the configuration indicates for the UE to report a value of the channel condition metric for each code block group of the first plurality of code block groups of the first transport block, and the report indicates the value of the channel condition metric for each code block group of the first transport block.

28. An apparatus for wireless communications at a base station, comprising:
one or more processors;
memory coupled with the one or more processors; and
instructions stored in the memory and executable by the one or more processors to cause the apparatus to:
transmit, to a user equipment (UE), control signaling identifying a configuration for reporting channel condition metrics for transport blocks that each include a plurality of code block groups, wherein the configuration indicates whether to use transport block level channel condition feedback or code block group level channel condition feedback;
transmit a first transport block that includes a first plurality of code block groups; and
receive a report indicating a channel condition metric for one or more code block groups of the first plurality of code block groups of the first transport block in accordance with the configuration for reporting channel condition metrics, wherein the channel condition metric is based at least in part on transmission of the first plurality of code block groups.

29. The method of claim 1, further comprising:
transmitting, via the report or a second report, feedback indicating which of the first plurality of code block groups were successfully decoded by the UE.

30. The method of claim 4, wherein the reference channel condition metric includes a scheduled modulation and coding scheme, an average modulation and coding scheme associated with the first plurality of code block groups, or a metric indicated by the control signaling.

* * * * *